(12) United States Patent
Bakin et al.

(10) Patent No.: US 12,551,498 B2
(45) Date of Patent: Feb. 17, 2026

(54) TREATMENT OF P53-DEFICIENT CANCERS

(71) Applicant: Health Research, Inc., Buffalo, NY (US)

(72) Inventors: Andrei Bakin, Buffalo, NY (US); Justin Zonneville, Webster, NY (US)

(73) Assignee: Health Research, Inc., Buffalo, NY (US)

( * ) Notice: Subject to any disclaimer, the term of this patent is extended or adjusted under 35 U.S.C. 154(b) by 874 days.

(21) Appl. No.: 17/628,894

(22) PCT Filed: Jul. 27, 2020

(86) PCT No.: PCT/US2020/043750
§ 371 (c)(1),
(2) Date: Jan. 20, 2022

(87) PCT Pub. No.: WO2021/021741
PCT Pub. Date: Feb. 4, 2021

(65) Prior Publication Data
US 2022/0249531 A1    Aug. 11, 2022

Related U.S. Application Data

(60) Provisional application No. 62/879,231, filed on Jul. 26, 2019.

(51) Int. Cl.
*A61K 31/7072* (2006.01)
*A61K 31/502* (2006.01)
(Continued)

(52) U.S. Cl.
CPC ........ *A61K 31/7072* (2013.01); *A61K 31/502* (2013.01); *A61K 31/5025* (2013.01); *A61K 31/513* (2013.01); *A61P 35/00* (2018.01)

(58) Field of Classification Search
CPC .............. A61K 31/7072; A61K 31/502; A61K 31/5025; A61K 31/513; A61P 35/00
See application file for complete search history.

(56) References Cited

U.S. PATENT DOCUMENTS 5,527,676 A   6/1996   Vogelstein et al.
6,090,566 A   7/2000   Vogelstein et al.
(Continued)

FOREIGN PATENT DOCUMENTS

WO    2018085359 A1    5/2018

OTHER PUBLICATIONS

Geng et al. (PLoS ONE, 2011, 6, e28862) (Year: 2011).*
(Continued)

*Primary Examiner* — Scarlett Y Goon
*Assistant Examiner* — Sarah Grace Scrivener
(74) *Attorney, Agent, or Firm* — Hodgson Russ LLP

(57) ABSTRACT

Provided are methods and formulations for the treatment of p53-deficient cancers using a combinational drug strategy which enhances DNA damage in p53 deficient cells while not allowing cells to escape cell death by activation of p53-p21 signaling. Wild-type p53 carriers, on the other hand, respond with activation of p53-p21 signaling and cell-cycle arrest, thereby escaping cell death. The methods involve administering to an individual in need of treatment a combination of one or more poly (ADP ribose) polymerase inhibitors (PARPi) and one or more deoxyuridine analogs. Pharmaceutical formulations comprising PARPi and dU analogs are also provided.

7 Claims, 57 Drawing Sheets

(51) Int. Cl.
  *A61K 31/5025* (2006.01)
  *A61K 31/513* (2006.01)
  *A61P 35/00* (2006.01)

(56) References Cited

U.S. PATENT DOCUMENTS

| | | | |
|---|---|---|---|
| 10,086,010 | B2 | 10/2018 | Matsumoto et al. |
| 2009/0275608 | A1 | 11/2009 | Ossovskaya et al. |
| 2010/0222348 | A1 | 9/2010 | Angibaud et al. |
| 2016/0030424 | A1 | 2/2016 | Pollard et al. |
| 2018/0125875 | A1 | 5/2018 | Ide et al. |

OTHER PUBLICATIONS

Matsuoka et al. (Mol Cancer Ther, 2015, vol. 4, pp. 1004-1013) (Year: 2015).*

Geenen et al. (Clin Pharmacokinet, 2018, vol. 57, pp. 427â437) (Year: 2018).*

Sugimoto et al. (Cell Death Discovery, 2015, article No. 15010) (Year: 2015).*

Ardalan et al. (Clin J Cancer Res Clin Oncol, 2004, vol. 130, pp. 561-566) (Year: 2004).*

Huehls, A.M., et al., Identification of DNA Repair Pathways That Affect the Survival of Ovarian Cancer Cells Treated with a Poly(ADP-Ribose) Polymerase Inhibitor in a Novel Drug Combination, Molecular Pharmacology, Oct. 2021, vol. 82, No. 4, pp. 767-776.

Muvarak, N.E., et al., Enhancing the Cytotoxic Effects of PARP Inhibitors with DNA Demethylating Agents—A Potential Therapy for Cancer, Cancer Cell, Oct. 10, 2016, vol. 30, pp. 637-650.

Liu. J.C., et al., Identification of CDC25 as a Common Therapeutic Target for Triple-Negative Breast Cancer, Cell Reports, vol. 23, pp. 112-126. Apr. 3, 2018.

\* cited by examiner

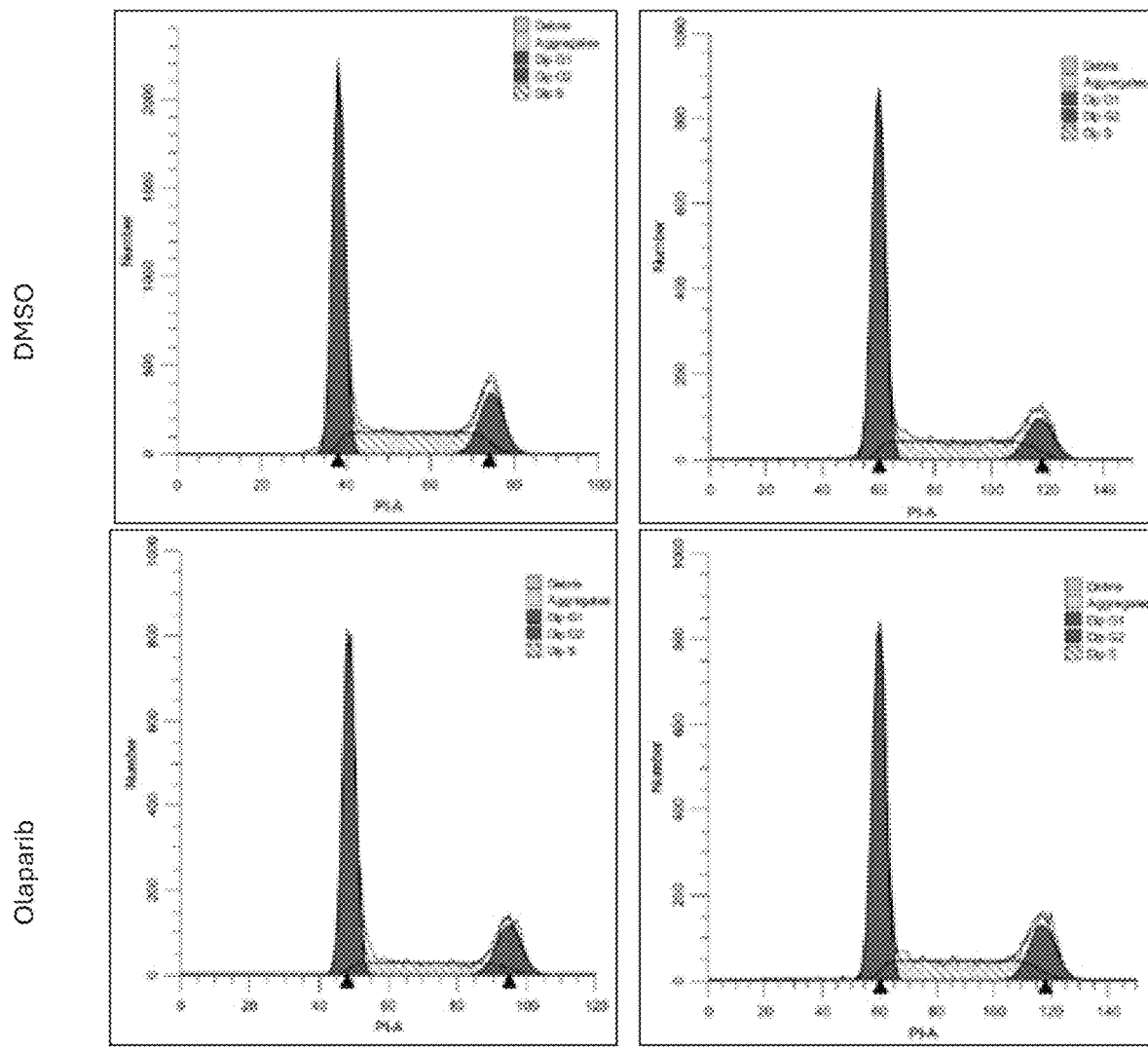

FIG. 3C, continued
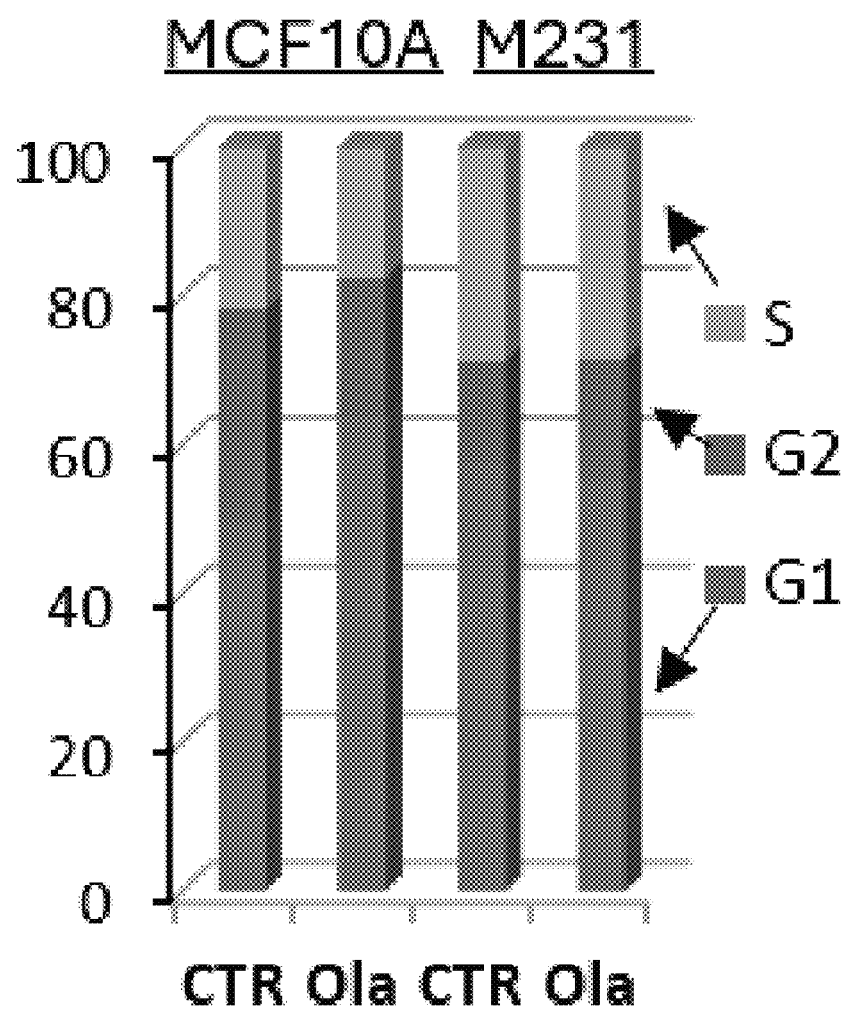

Table 1. IC50 TAS-102 -/+ Olaparib, µM

|  | TAS-102 | TAS+Ola | Ratio |
|---|---|---|---|
| MDA231 | 2.13 | 0.55 | 3.9 |
| StDev | 0.13 | 0.07 | 0.7 |
| MDA468 | 5.68 | 0.80 | 7.1 |
| StDev | 0.82 | 0.00 | 1.0 |
| MCF10A | 3.04 | 4.04 | 0.8 |
| StDev | 0.41 | 0.51 | 0.2 |
| WI-38 | 2.08 | 4.94 | 0.4 |

TREATMENT OF P53-DEFICIENT CANCERS

CROSS-REFERENCE TO RELATED APPLICATIONS

This application claims priority to U.S. Provisional Application No. 62/879,231, filed on Jul. 26, 2019, the disclosure of which is incorporated herein by reference.

FIELD

This disclosure relates generally to cancer therapeutics.

BACKGROUND OF THE DISCLOSURE

Loss of p53 tumor suppressor function is a common feature of several solid cancers including breast and gastrointestinal (GI)-tract cancers. About 20% of breast cancers are negative for estrogen receptor (ER)/progesterone receptor (PR)/HER2 markers and constitute a group of triple-negative breast cancers (TNBCs), which do not have targeted therapy. TNBCs and GI-tract cancers routinely are treated with chemotherapy regimens. Despite high initial response, a significant proportion of cancers relapse and progress to metastatic disease with worse overall survival. Thus, there is a pressing need for better therapeutic options.

p53 is critically involved in the cell-cycle control at the G1→S and intra-S-phase checkpoints in response to DNA damage by regulating expression of or via a direct interaction with DNA repair factors. p53 facilitates recognition of DNA damage, recruitment of repair machinery, control of the repair, and activation of cell death if DNA damage is unrepairable. The role of p53 in DNA damage/repair in TNBCs is unclear.

SUMMARY OF THE DISCLOSURE

The present disclosure provides compositions and methods for treatment of cancer, where the cancer cells are p-53 deficient. The methods and compositions are based, in part, on the surprising observation that p-53 deficient cancers exhibit high expression activity of DNA repair pathways such as Base-Excision Repair (BER), and that deoxyuriding (dU) analogs induced accumulation of DNA damage selectively in p53 mutant cells. Further, inhibitors of poly (ADP-ribose) polymerase (PARPi or PARP inhibitors) enhanced DNA damage in p53 mutant cells, while normal cells were able to escape using the p53-p21 axis and cell cycle arrest. Based on these findings, the present disclosure provides a combination therapy for treatment of p-53 deficient cancers.

In an aspect, the disclosure provides a method for treatment of p-53 deficient cancer comprising administering to an individual (such as a human) in need of treatment, one or more deoxyuridine (dU) analogs, and one or more poly (ADP-ribose) polymerase inhibitors (PARPi). Examples of dU analogs include, 5-fluoro-2'deoxyuridine (FdU) or TAS-102. Examples of PARPi include olaparib or talazoparib. The combination therapy may be carried out as a single formulation or separate formulations for dU and PARPi. The combination therapy described herein can selectively inhibit the growth of cancer cells.

In an aspect, this disclosure provides compositions for combination therapy of p53 deficient cancers. The compositions may comprise one or more dU analogs and one or more PARPi. The dU and PARPi may be present in amounts that results in synergistic inhibition of the growth of cancer cells.

Examples of cancers that may be treated by the present methods and compositions include tumors as well as blood cancers. The present methods can also be used in conjunction with other treatments of cancer.

BRIEF DESCRIPTION OF THE FIGURES

For a fuller understanding of the nature and objects of the invention, reference should be made to the following detailed description taken in conjunction with the accompanying drawings, in which:

FIG. 6. is a representation of Table 1.

DETAILED DESCRIPTION OF THE DISCLOSURE

Figure 1A:
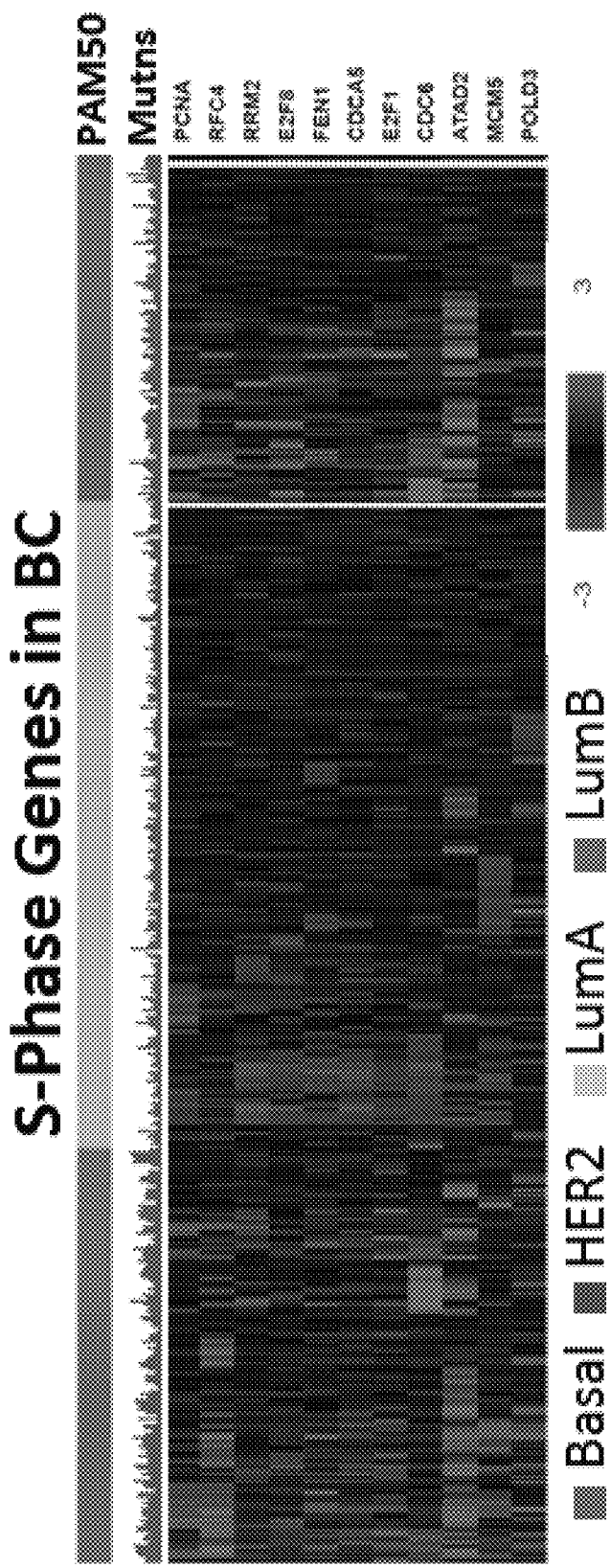
FIG. 1. DNA replication and repair pathways in TNBCs. (A) Expression profiles of S-phase and M-phase genes in breast cancer using TCGA dataset (dbGaP Study phs000178). Gene lists are designed using Cyclebase 3.0 database. (B) Evaluation of the mutational burden in BC subtypes using TCGA data. (C-D) Unsupervised clustering of DNA repair genes in breast cancer TCGA dataset. Gene lists are derived from KEGG. (E) Co-expression data for selected genes in DNA repair and replication pathways were generated using breast cancer TCGA data. (F) Expression of BER and MMR genes is elevated in p53-deficient tumors.
Figure 1A:
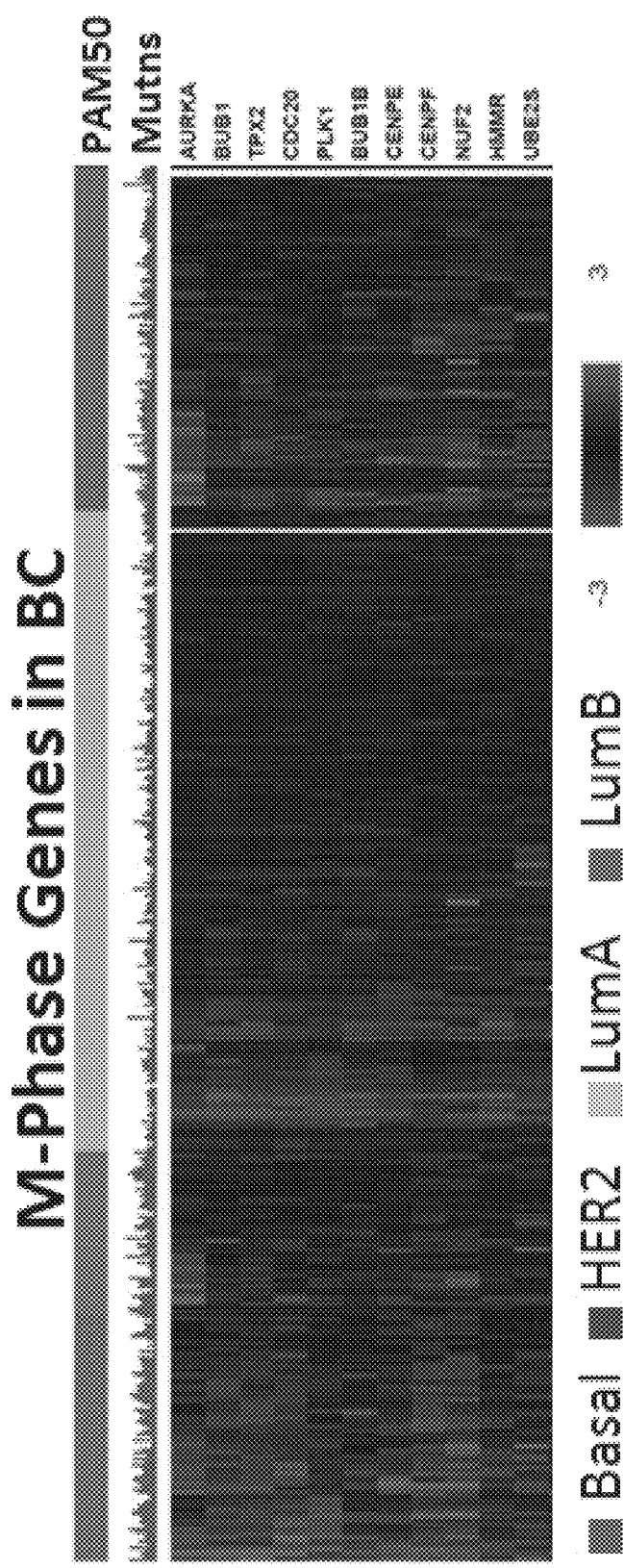
Figure 1:
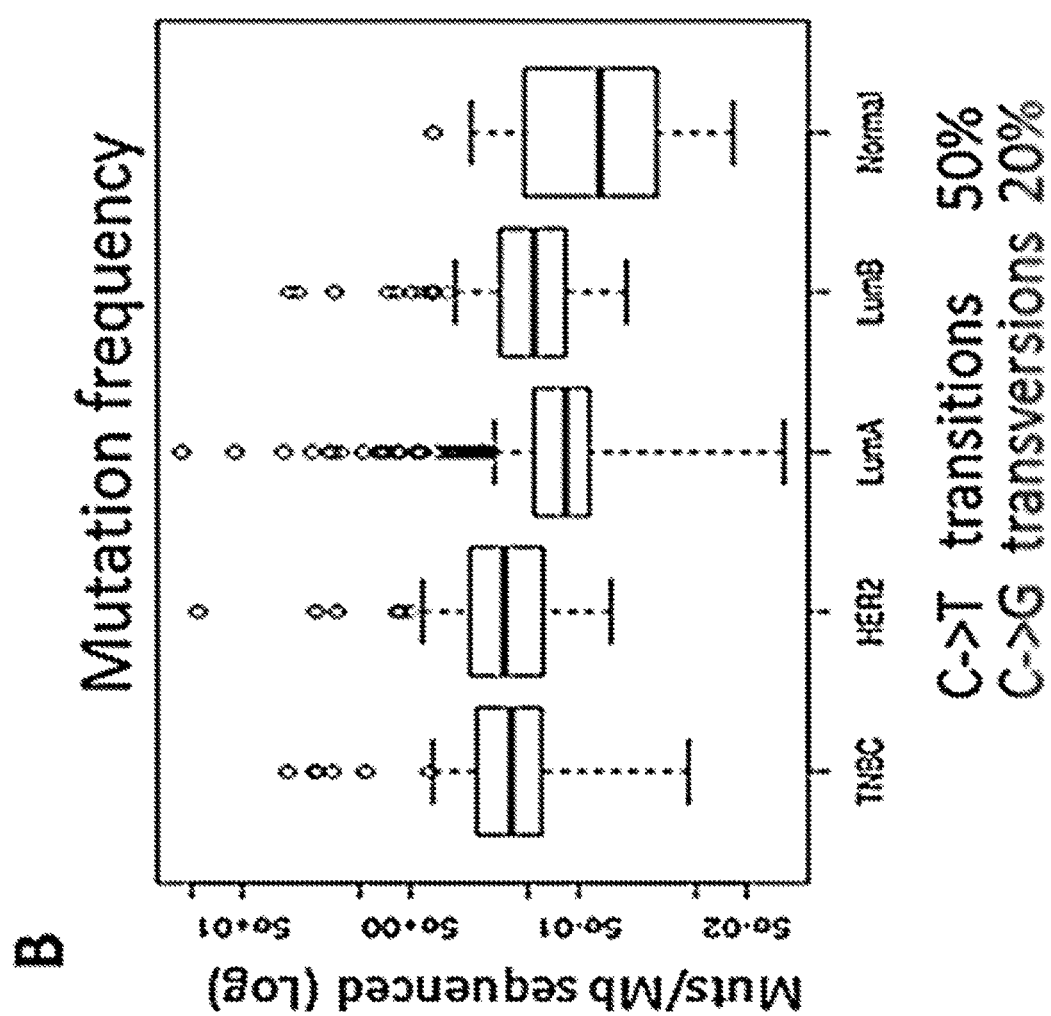

Unless defined otherwise herein, all technical and scientific terms used in this disclosure have the same meaning as commonly understood by one of ordinary skill in the art to which this disclosure pertains.

The term "treatment" as used herein refers to reduction in one or more symptoms or features associated with the presence of the particular condition being treated. Treatment does not necessarily mean complete remission, nor does it preclude recurrence or relapses. For example, treatment of cancer, can refer to reduction of one or symptoms associated with the cancer.

The term "therapeutically effective amount" or an "effective amount" in reference to therapy, as used herein in reference to a single agent is the amount sufficient to achieve, in a single or multiple doses, the intended purpose of treatment, or in reference to a combination, is the amount sufficient for each component of the combination, in a single or multiple doses, administered together or separately, the intended purpose of treatment.

The terms "p53-deficient" and "p-53 mutant" are used interchangeably and as used herein in reference to cells means cells in which there is inactivation of the p53 gene by means of gene deletion or alteration, or in which there are mutations that alter the function of p53. Typically, mutations inactivate p53 protein and lead to stabilization of the inactivated p53 protein increasing inactive p53 protein amount. There are also several other processes that generate p53-deficiency such as virus-driven production of proteins that inactivate p53 through several different routes (typically cause degradation). Thus, p53 deficient cases can be detected by the absence of the protein (due to deletion or degradation) or by the presence of large amounts of inactive p53 protein.

The term "p53 cancer" as used herein means a tumor or blood cancer, wherein the cancer cells in the tumor or the blood cancer are p53 deficient.

Where a range of values is provided in this disclosure, it should be understood that all intervening ranges, and each intervening value, to the tenth of the value of the lower limit, and any other intervening value in that stated range is encompassed within the invention, unless clearly indicated otherwise.

The singular form used in this disclosure includes the plural form and vice versa, unless indicated otherwise.

We observed that p53-deficient TNBCs express high levels of DNA replication and repair pathways such as Base-Excision Repair (BER) and Mismatch repair (MMR), indicating activation of these DNA repair mechanisms. Further, we observed a significant deficiency in BER-mediated DNA repair in p53-deficient cancer cells. This disclosure describes and demonstrates that this defect can be exploited, wherein PARPi can cooperate with dU analogs to induce DNA damage and subsequent cell death in p53-deficient cells; whereas wild-type p53 carriers respond with induction of p53-p21 signaling and G1-phase accumulation, thereby avoiding cell death. The enhanced DNA damage response induced by PARPi and dU combinational therapy was observed in different types of cancers and is thus not limited to a particular cancer type. Based, at least in part, on these data, this disclosure provides a novel combination dU-PARPi therapy for selective treatment of p53-deficient cancers. The therapy may comprise a combination of one or more deoxyuridine (dU) analogs and one or more poly (ADP-ribose) polymerase inhibitors (PARPi). It is considered that proliferating cancer cells will incorporate dU analogs into their DNA. Removal of these dU analogs from the DNA by DNA repair mechanisms in the presence of PARPi leads to accumulative DNA damage and eventual death in cycling cancer cells. Thus, cancer cells deficient for p53 will selectively undergo cell death, whereas non-tumor/normal cells with wild-type p53 will arrest and perform DNA repair. This principle can be translated into the clinic for, primarily, a selected set of patients with p53-deficient cancer. Furthermore, dU-PARPi therapy can also reduce the adverse effects of dU therapy by reducing toxicities of dU towards normal p53-wt tissues of patients in the presence of PARPi.

Examples of PARPi useful for the present methods include, but are not limited to, NU1025; 3-aminobenzamide; 4-amino-1,8-naphthalimide; 1,5-isoquinolinediol; 6(5H)-phenanthriddinone; 1,3,4,5,-tetrahydrobenzo(c)(1,6)- and (c)(1,7)-naphthyridin-6 ones; adenosine substituted 2,3-dihydro-1H-isoindol-1-ones; AG14361; AG014699; 2-(4-chlorophenyl)-5-quinoxalinecarboxamide; 5-chloro-2-[3-(4-phenyl-3,6-dihydro-1 (2H)-pyridinyl)propyl]-4(3H)-quinazolinone; isoindolinone derivative INO-1001; 4-hydroxyquinazoline; 2-[3-[4-(4-chlorophenyl) 1-piperazinyl]propyl]-4-3(4)-quinazolinone; 1,5-dihydroxyisoquinoline (DHIQ); 3,4-dihydro-5 [4-(1-piperidinyl)(butoxy)-1 (2H)-isoquinolone; CEP-6800; GB-15427; PJ34; DPQ; BS-201; AZD2281 (Olaparib); BS401; CHP101; CHP102; INH2BP; BSI201; BSI401; TIQ-A; an imidazobenzodiazepine; 8-hydroxy-2-methylquinazolinone (NU1025), CEP 9722, MK 4827, LT-673; 3-aminobenzamide; Olaparib (AZD2281; ABT-888 (Veliparib); BSI-201 (Iniparib); Rucaparib (AG-014699); INO-1001; A-966492; PJ-34; and talazoparib. In an embodiment, the PARPi may be olaparib, talazoparib or combinations thereof.

Examples of dU analogs useful for the present methods include, but are not limited to, fluoro-deoxyuriding analogs, 5-hydroxymethyl-2'-deoxyuridine, 5-fluoro-2'deoxyuridine (FdU), 5-ethynyl-2'-deoxy-uridine or TAS-102, which contains tri-fluoromethyl-deoxyuridine as the major active component.

In an aspect, this disclosure provides a method for treatment of cancer, wherein the cancer comprises p-53 deficient cells. In an embodiment, the cancer may be a tumor. In an embodiment, the cancer may be blood cancer. The method comprises or consists essentially of administering to an individual in need of treatment a combination of one or more dU analogs and one or more PARPi. In an embodiment, the only anti-cell proliferative agents administered during the combination therapy are dU and PARPi. In an embodiment, the method comprises administering to an individual in need of treatment a combination of olaparib and/or talazoparib, with 5-fluoro-2'deoxyuridine (FdU) and/or TAS-102. The PARPi and the dU may be administered in a single formulation or separate formulations, at the same time or different times, by the same route or different routes, in the same form or different forms, over the same period of time or different periods of time. In an embodiment, the PARPi and dU produce a synergistic effect on inhibition of growth of cancer cells.

In an embodiment, this disclosure provides a method of inhibiting the growth of p-53 deficient cancer cells comprising or consisting essentially of contacting the cells with one or more dU analogs and one or more PARPi. In an embodiment, the only anti-cell proliferative agents contacted with the cells are dU and PARPi. The PARPi and the dU analogs may be contacted with the cells in a single formulation or separate formulations, at the same time or different times, over the same period of time or different periods of time. The PARPi and dU may produce a synergistic effect on inhibition of growth of cancer cells.

In an embodiment, the present method provides a method for treatment of cancer, the method comprising determining if the cancer in the individual comprises cells which are p-53 deficient, and if the cancer is determined to be p53 deficient (i.e., comprising p-53 deficient cancer cells), then administering to the individual a combination of one or more dU analogs and one or more PARPi. p53-deficiency is considered to be a strong indication for selection of patients that will benefit from the present treatment. In an embodiment, the method comprises i) obtaining cancer cells from the individual (such as by collecting blood, plasma or serum, or by a biopsy of the tumor); ii) determining the cancer cells to be p53-deficient; iii) administering to the individual a combination of one or more PARPi and one or more dU analogs. In an embodiment, the method comprises identifying an individual afflicted with cancer to have p53 deficient cancer cells, and administering to the individual a combination of one or more PARPi and one or more dU analogs. In an embodiment, the method comprises administering to an individual in need of treatment for cancer, who has been identified as having p53 deficient cancer, a combination of one or more PARPi and one or more dU analogs. In an embodiment, the only anti-cell proliferative agents administered during the combination therapy are dU and PARPi. The PAPRi may be olaparib and/or talazoparib, and the dU may be 5-fluoro-2'deoxyuridine (FdU) and/or TAS-102. Determination of the presence of p53 deficient cells in the cancer tissue of a patient may be carried out, for example, by Next Generation Sequencing (NGS) of p53 gene, by immunohistochemistry of tumor and normal tissues (the lack of detectable p53 or the presence of high amounts of inactive p53 protein indicates p53 mutation).

In an embodiment, the disclosure provides methods for inhibiting the growth of p53 deficient cancer cells in an individual comprising or consisting essentially of administering to the individual an effective amount of one or more PARPi and effective amount of one or more dU analogs such that growth of the cancer cells is inhibited. The PARPi and dU analogs may be administered after determination that the cancer cells in the individual are p53-deficient. The individual may have developed resistance, or may be at risk of developing resistance to other anti-cancer therapies including, but not limited to, radiation therapy, anti-angiogenic therapy, immunotherapy, and other chemotherapy.

The present compositions and methods can be used for any type of cancer, including tumors and blood cancers. Examples of tumors that may contain p53 deficient cells include breast cancers (including triple-negative breast cancer (TNBC) and luminal B breast cancer), GI tract cancers, lung cancers, ovarian cancers, colon cancers, pancreatic cancer, and head and neck cancers, soft tissue sarcomas, lymphomas including Non-Hodgkin lymphoma etc. Blood cancers include leukemias, such as, acute myeloid leukemia (AML), acute lymphocytic leukemia (ALL), chronic lymphocytic leukemia (CLL) and chronic myeloid leukemia (CML) and the like.

The PARPi and dU may be administered by using known methods in the art. These methods include but are not limited to intradermal, intramuscular, intraperitoneal, intravenous, subcutaneous, oral, intranasal, and intra-tumoral routes. It will be recognized by those skilled in the art that the form and character of the particular dosing regimen employed in the method of the invention will be affected by the route of administration and other well-known variables, such as the size, age and overall health of the individual, and the stage and type of the particular p53-deficient cancer being treated. Based on such criteria, and given the benefit of this disclosure, one skilled in the art can determine an effective amount of a combination of PARPi and dU analog to administer to an individual.

The present compositions may be administered so that PARPi and dU, independently are 1.0 µg/kg/day to about 100 mg/kg and all values and ranges therebetween. In embodiments, the amounts of PARPi and dU administered may be, independently, about 500 µg/kg/day to about 25 mg/kg/day, about 0.1 to about 15 mg/kg/day, about 1 mg to about 10 mg/kg/day and as otherwise described herein. For example, PARPi olaparib may be administered in an amount of about 0.2 to 4 mg/kg/day for a period of time, such as about 30 days and dU analogs may be administered in an amount of 0.25 to 2.0 mg/kg/day for a period of time, such as about 14 days. In an example, Olaparib may be administered 300 mg PO BID, which is about 4 mg/kg/day orally; TAS-102 may be administered 35 mg/m2 dose orally twice daily, which is about 1.78 mg/kg/day in a 28-day cycle comprising 5 treatment days/2 rest days for 2 weeks followed by a rest period of 2 weeks. If talazoparib is used, it can be 0.25-1 mg taken orally once daily. Other variations of these dosages can be made and such variations are within the purview of one skilled in the art.

The administration may be continuous or intermittent, with or without breaks in between the continuous administration and may be over a short period of time (days, weeks, months) or over an extended period of time (months, years) and may be in the form of maintenance therapy. In an example, PARPi can be administered 3-5 days prior to TAS-102 followed by TAS102 administered 5 days-on-2 days off schedule. PARPi can be used continuously as prescribed for monotherapy. The cycles may be repeated. The present data suggest that TAS-102 could be reduced from recommended dose (35 mg/m2 2×/day i.e. 0.9 mg/kg twice daily) by 2-4 times to 0.2-0.45 mg/kg BID (twice daily).

The combination therapy of PARPi and dU may be preceded or followed by administration of one of the two PARPi or dU alone, or by other chemotherapeutic agents.

In an embodiment, this disclosure provides a method for synergistic inhibition of growth of p53 deficient cancer cells comprising contacting the cells, or a method of treatment of p53 deficient cancer in an individual comprising contacting the cells or administration to the individual in need of treatment, one or more PARPi and one or more dU, wherein the PARPi and dU are used at dosages or regimens where synergistic inhibition of growth of p53 cancer cells is achieved. Synergism was observed at the wide-range of concentrations, for example, at which PARPi inhibit the PARP activity, while having no effect on the cancer cell growth. For example, in an embodiment, for talazoparib 10-200 nM, and for olaparib 100-1000 nM may be used, while their IC50 for cancer cells are 2-4 µM and 16-24 µM respectively.

In embodiments, inhibition of p53-deficient cancer growth comprises a reduction in tumor size, cancer cell number, cancer cell marker, and/or an inhibition of metastasis and/or the formation of metastatic foci, and/or an extension of the life span of an individual diagnosed with a p53-deficient cancer relative to an individual who does not receive the combination treatment.

The methods provided in this disclosure can be performed in conjunction with conventional anti-cancer therapies. Such therapies can include, but are not limited to, surgeries, chemotherapies, hormone therapies, immunotherapies, anti-angiogenic therapies, and radiation therapies. The combination of the dU analog and PARPi could be administered prior to, concurrently, or subsequent to such anti-cancer therapies. Likewise, the combination can be administered prior to, or subsequent to, or concurrently with any other anti-cancer therapy or anti-cancer agent. Administering the combination comprises administering each agent so that they are both present in the individual at the same time for at least some part of the treatment and can exert their mutual functions on the cancer cells. In an embodiment, the two may not be present in the individual at the same time during treatment. It will thus be recognized that the agents can be administered concurrently or sequentially, so long as the desired effect is achieved. In certain embodiments, the combination of the dU analog and PARPi is administered to an individual who has been previously and unsuccessfully treated with other anti-cancer agents or modalities whether chemically or surgically performed. In embodiments, the dU analog and PARPi are administered with and/or to enhance the effect of another chemotherapeutic or anti-cancer agent.

In an aspect, this disclosure provides compositions comprising synergistic amounts of a PARPi and a dU analog, wherein the combination of the PARPi and dU has a synergistic effect in inhibiting the growth of cancer cells. The PARPi and dU may be present in a single formulation or in separate formulations. The PARPi and dU may be present in a ready-to-use form (such as in solution or suspension) or may be provided in a powdered or dry form, optionally along with a reconstitution medium (such as saline or buffer).

In an aspect, this disclosure provides pharmaceutical formulations comprising or consisting essentially of one or more deoxyuridine (dU) analogs and one or more poly (ADP-ribose) polymerase inhibitors (PARPi). In an embodiment, the dU analog is 5-FdU or TAS-102, and the PARPi is talazoparib or olaparib. The components may be present in pharmaceutically acceptable carriers. The components may be present as a synergistic combination. Based on the teachings of the present disclosure, and information known in the art, the amount of each agent required for a particular use can be identified by one skilled in the art (such as a clinician).

The dU analog and the PARPi may be prepared as a single formulation or separate formulations. Formulations comprising dU and/or PARPi can be prepared by using pharmaceutical carriers. The agents of the present disclosure, or pharmaceutically acceptable salts thereof (such as, but not limited to, hydrochloride), can be provided in pharmaceutical compositions for administration by combining them with any suitable pharmaceutically acceptable carriers, excipients and/or stabilizers. Examples of pharmaceutically acceptable carriers, excipients and stabilizer can be found in Remington: *The Science and Practice of Pharmacy* (2005) 21st Edition, Philadelphia, PA. Lippincott Williams & Wilkins. For example, suitable carriers include excipients, or stabilizers which are nontoxic to recipients at the dosages and concentrations employed, and include buffers such as acetate, Tris, phosphate, citrate, and other organic acids; antioxidants including ascorbic acid and methionine; preservatives such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol; amino acids such as glycine, glutamine, asparagine, histidine, arginine, or lysine; monosaccharides, disaccharides, and other carbohydrates including glucose, mannose, or dextrins; chelating agents such as EDTA; tonicifiers such as trehalose and sodium chloride; sugars such as sucrose, mannitol, trehalose or sorbitol; surfactant such as polysorbate; salt-forming counter-ions such as sodium; and/or non-ionic surfactants such as Tween or polyethylene glycol (PEG). The pharmaceutical compositions may comprise other therapeutic agents.

The formulations of the present disclosure (combination or individual) may be formulated into a variety of forms and administered using a suitable route. For example, the formulations may be administered orally, rectally, or parenterally. The term "parenteral" as used herein includes subcutaneous, intravenous, intramuscular, intraperitoneal, or intratumoral injection and infusion techniques. In an embodiment, the formulation is administered orally such as, for example, in the form of a tablet, capsule, pill, powder, paste, granules, elixir, solution, suspension, dispersion, gel, syrup or any other ingestible form. The components may be delivered via liposomes, microparticles, microcapsules or any other delivery agent. The formulations may comprise conventionally acceptable carriers, adjuvants, and vehicles as desired.

In an aspect, this disclosure provides kits for the treatment of p53-deficient cancers comprising a dU analog and a PARPi, comprising separate, individual dosages of each. The two may be present as a single formulation. The components may be present in dried/powdered form and suspension solutions (such as saline or buffers) e.g., reconstitution media, may be included in the kit. Instructions for preparing and using the components/formulations may also be included. The packaging material optionally comprises a label or other printed material which provides an indication that the agents can be used in methods as described herein, such as for treating a p53-deficient cancer. In an embodiment, the kit contains one or more containers, each containing a dU analog or a PARPi, in a dried form, or in a physiological carrier (such as saline or phosphate buffered saline, or other suitable buffers). In an embodiment, the kit may contain the dU analog and PARPi in the same container in a dried form or in saline or buffer. When in a dried form, the appropriate amount of suspension solution (such as, saline of buffer) may be included in a separate container to provide easy-to-use or ready-to-use pharmaceutical formulation.

This novel combinational therapy takes advantage of dysregulation in DNA repair pathways found in p53-deficient cancers, including triple negative breast cancer (TNBC) and GI tract cancers, where DNA damage accumulates as a result of the combination of a dU analog and a PARPi which prevents cell cycle arrest and activates cellular death pathways. The disclosure is illustrated in certain embodiments using the PARPi olaparib and talazoparib and the dU analogs 5-fluoro-2'deoxyuridine (FdU) or TAS-102, but other PARP inhibitors and dU analogs may be substituted. The following Examples are intended to illustrate various embodiments of the disclosure, but are not intended to be limiting.

Example 1

This example describes dysregulation in the DNA repair process in p53-deficient TNBCs and GI-tract cancers and the effect of dU analogs and PARPi.

Results

Activation of DNA repair pathways in triple-negative breast cancer (TNBC).

Figure 1C:
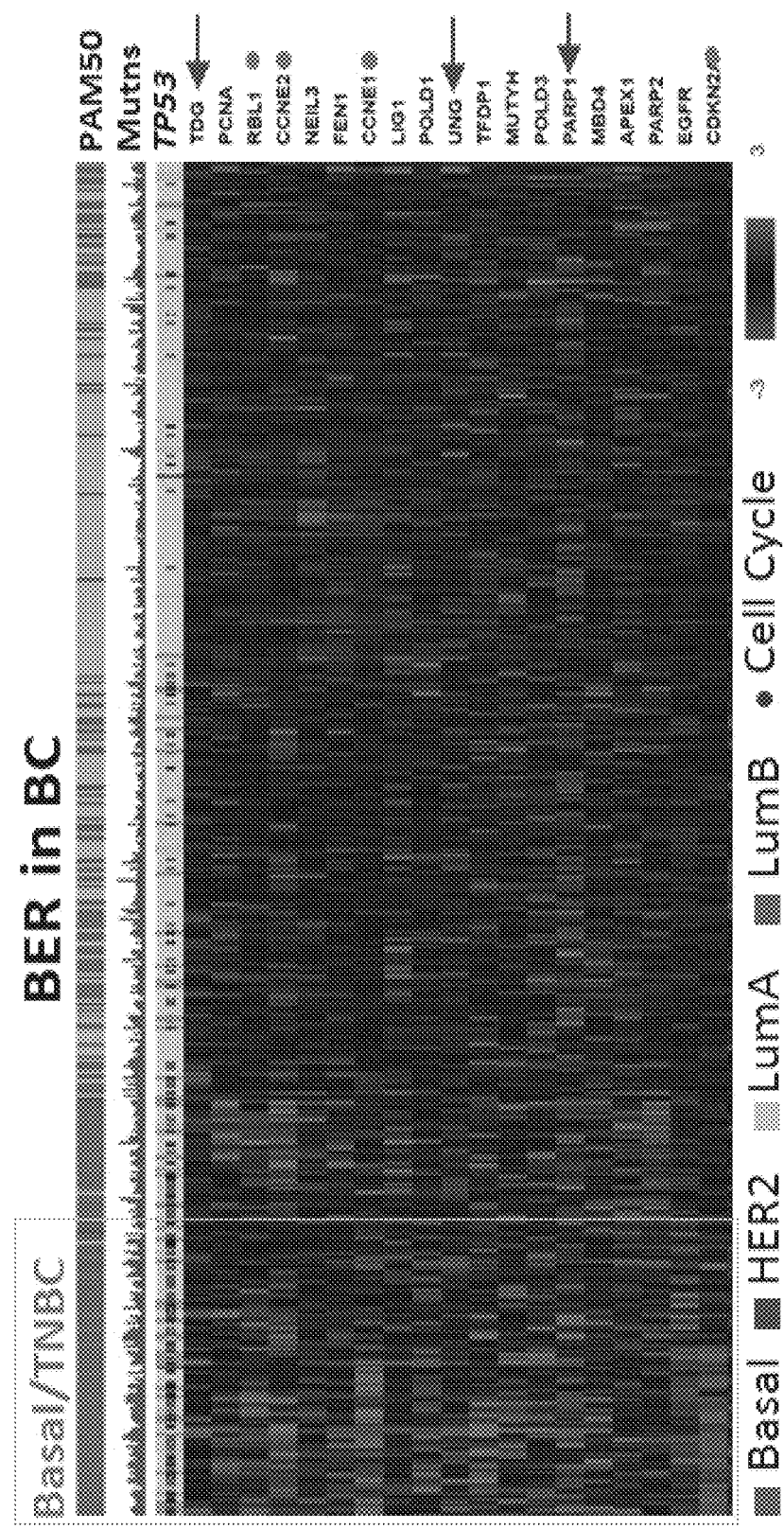
Figure 1:
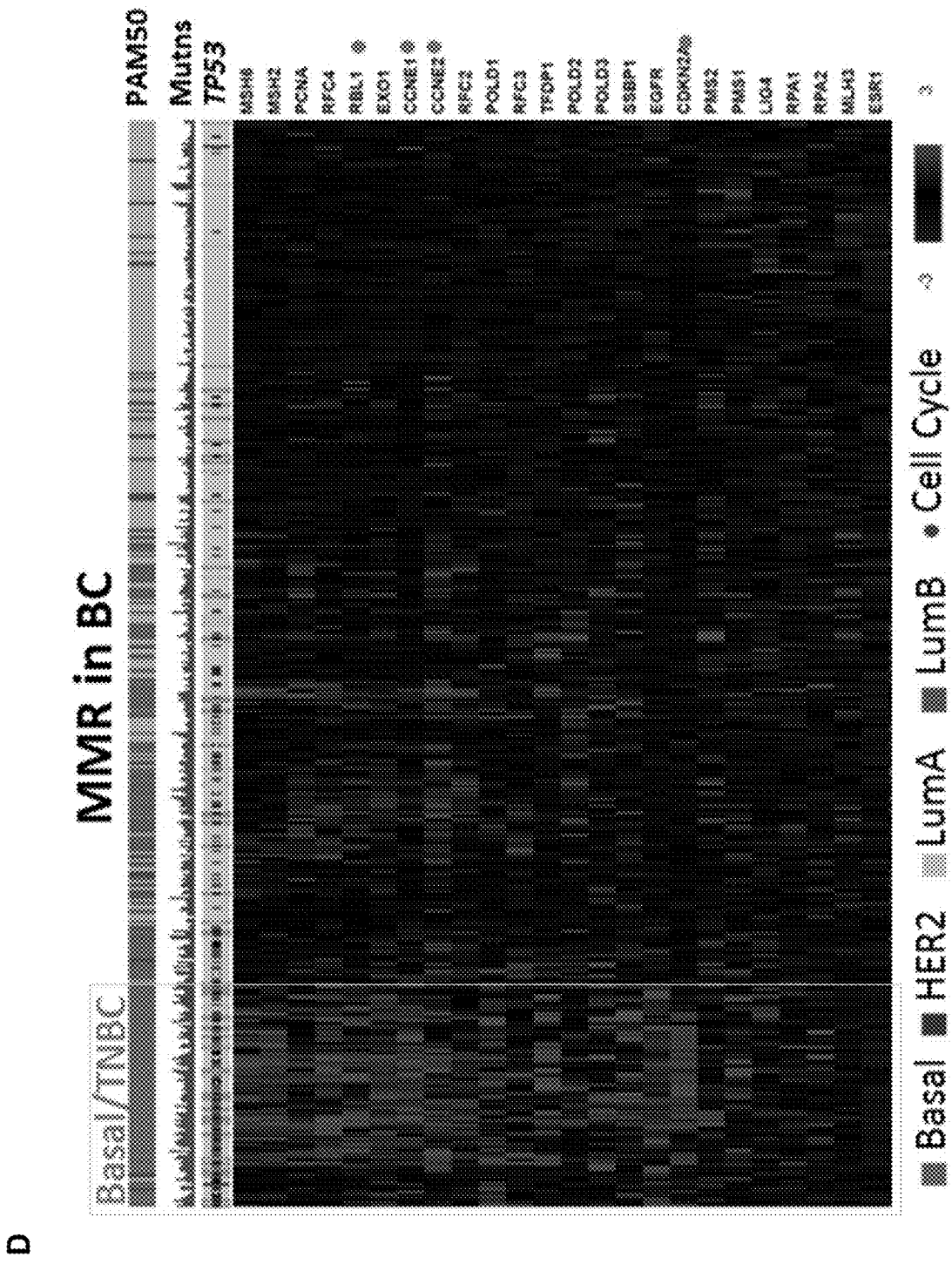
Figure 1:
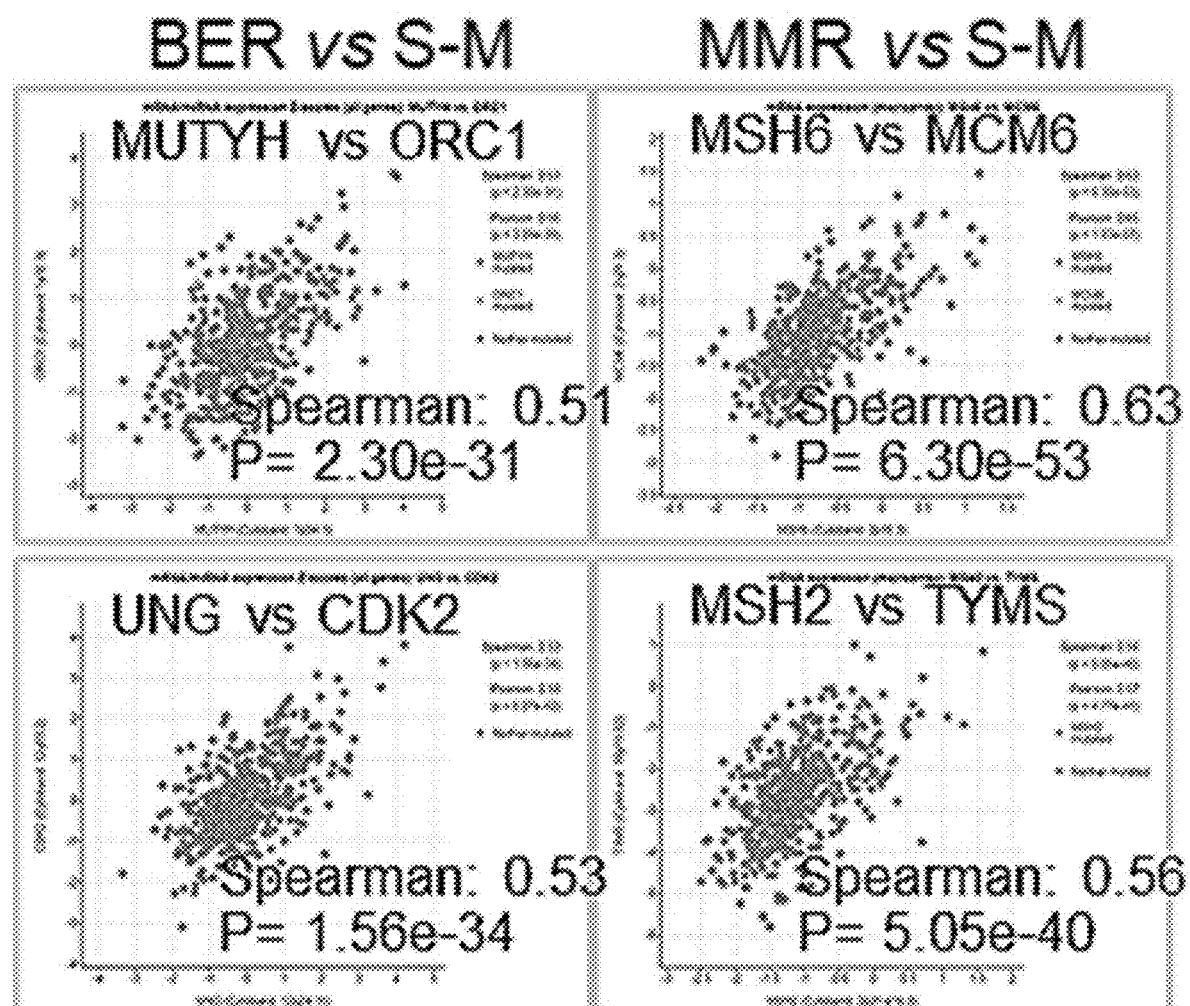
Figure 1:
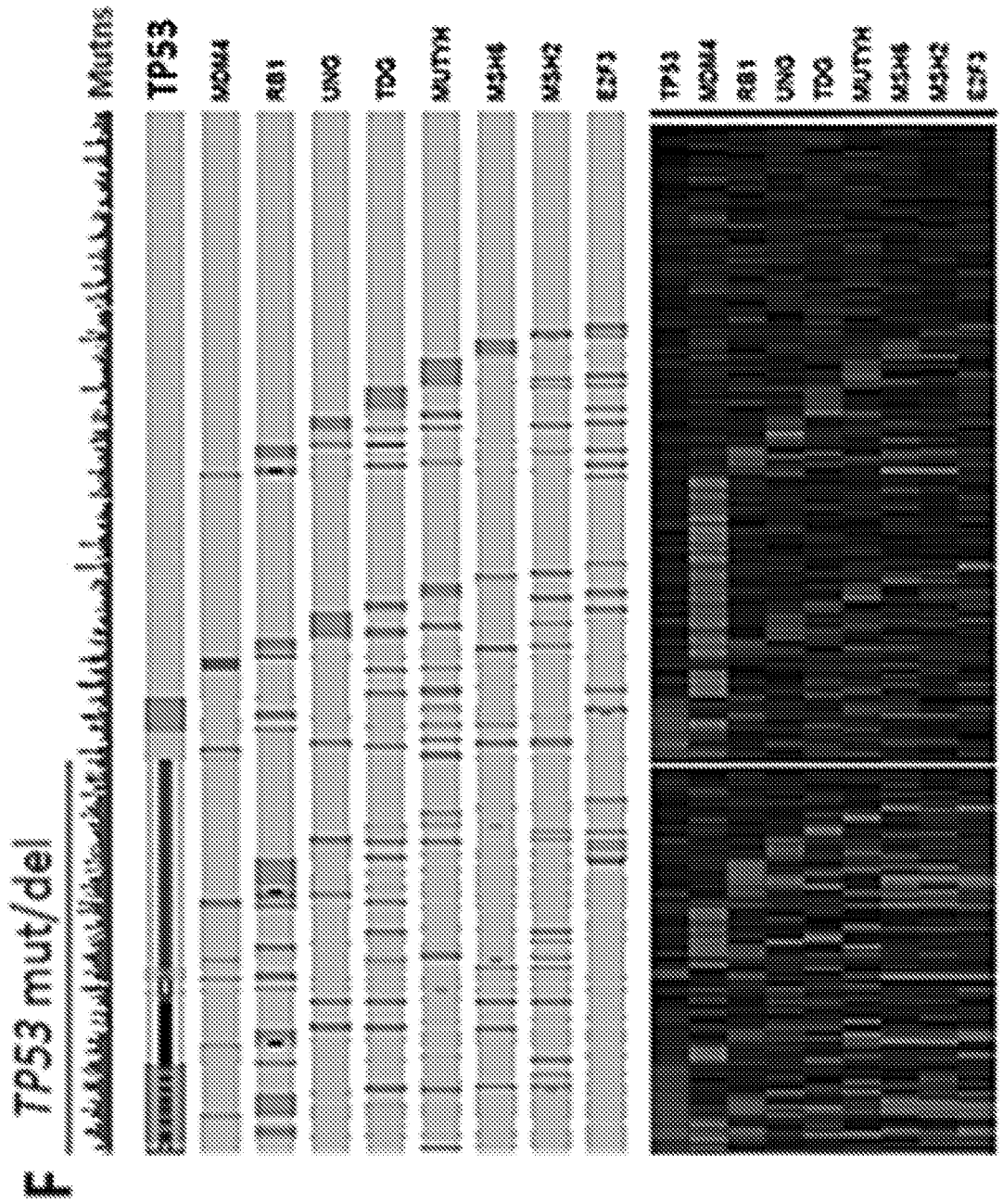

The Cancer Genome Atlas (TCGA) data for breast carcinomas was searched in order to identify genetic-based vulnerabilities in TNBCs that are suitable for therapeutic intervention. The TCGA data revealed high expression levels of replication-related genes (RRGs) involved in S and M phases of the cell cycle in TNBC, HER2, and luminal B breast cancer (BC) subtypes (FIG. 1A). Significant replicative activity in TNBCs is consistent with the expression profiles of the replication-related periodic genes in BC subtypes. Remarkably, the mutational burden in BC subtypes exhibited a similar pattern (FIG. 1A-B), suggesting an increase in the DNA replication stress. The mutational landscape has been linked to dysregulation in DNA damage repair (DDR) pathways such as mismatch repair (MMR) genes, base-excision repair (BER), and nucleotide-excision repair (NER). Therefore, we asked whether the DDR gene expression correlates with the expression pattern of replication-related genes. Unsupervised clustering revealed that TNBCs express elevated mRNA levels of MMR genes such as MSH2 and MSH6, and BER pathway genes UNG, TDG, and MUTYH (FIG. 1C-D). The co-expression data showed a significant correlation in the expression of replication-related and the DDR genes (FIG. 1E). Notably, TNBCs express high levels of DNA glycosylases such as UNG and TDG that mediate removal of uracil (FIG. 1C). Further, high levels of BER and MMR genes correlated with p53-deficient tumors (FIG. 1F). Thus, the TCGA data revealed that TNBCs exhibit a marked elevation in the replicative activity along with increased expression of DNA repair genes of BER and MMR pathways. Alongside, TNBCs carry p53 mutation/deletion and high burden of mutations.

BER-mediated DNA repair in p53-deficient triple-negative breast cancer.

Figure 2:
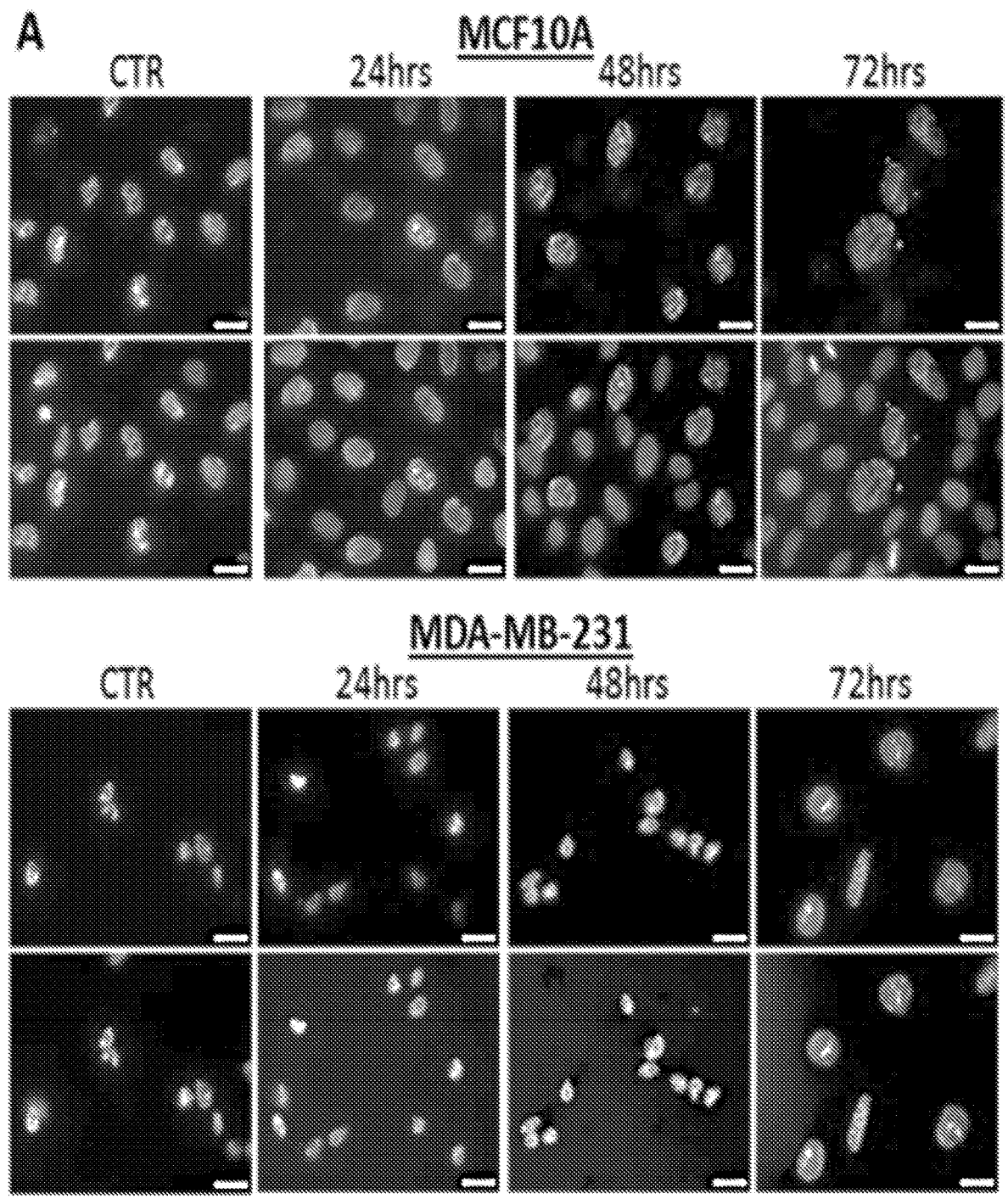
FIG. 2. BER-mediated uracil removal and response to FdU. (A-B) Normal MCF10A and breast cancer p53-mutant MDA-MB-231 cell lines were pulse-labeled with 5-Ethynyl-2'-deoxy-uridine (EdU) for 2 hrs followed by wash and incubation for indicated time. Cells were fixed and stained for EdU using click-it chemistry. Images were taken with 60× lens, bar=20 µm. EdU-positive cells were scored relative to a total number of cells. (C) EdU removal assay in MCF10A control and shRNA-UNG cells. Insert shows depletion of UNG relative to empty-vector control. (D) Immunoblots from cells incubated with 5 µM FdU for indicated time.
Figure 2:
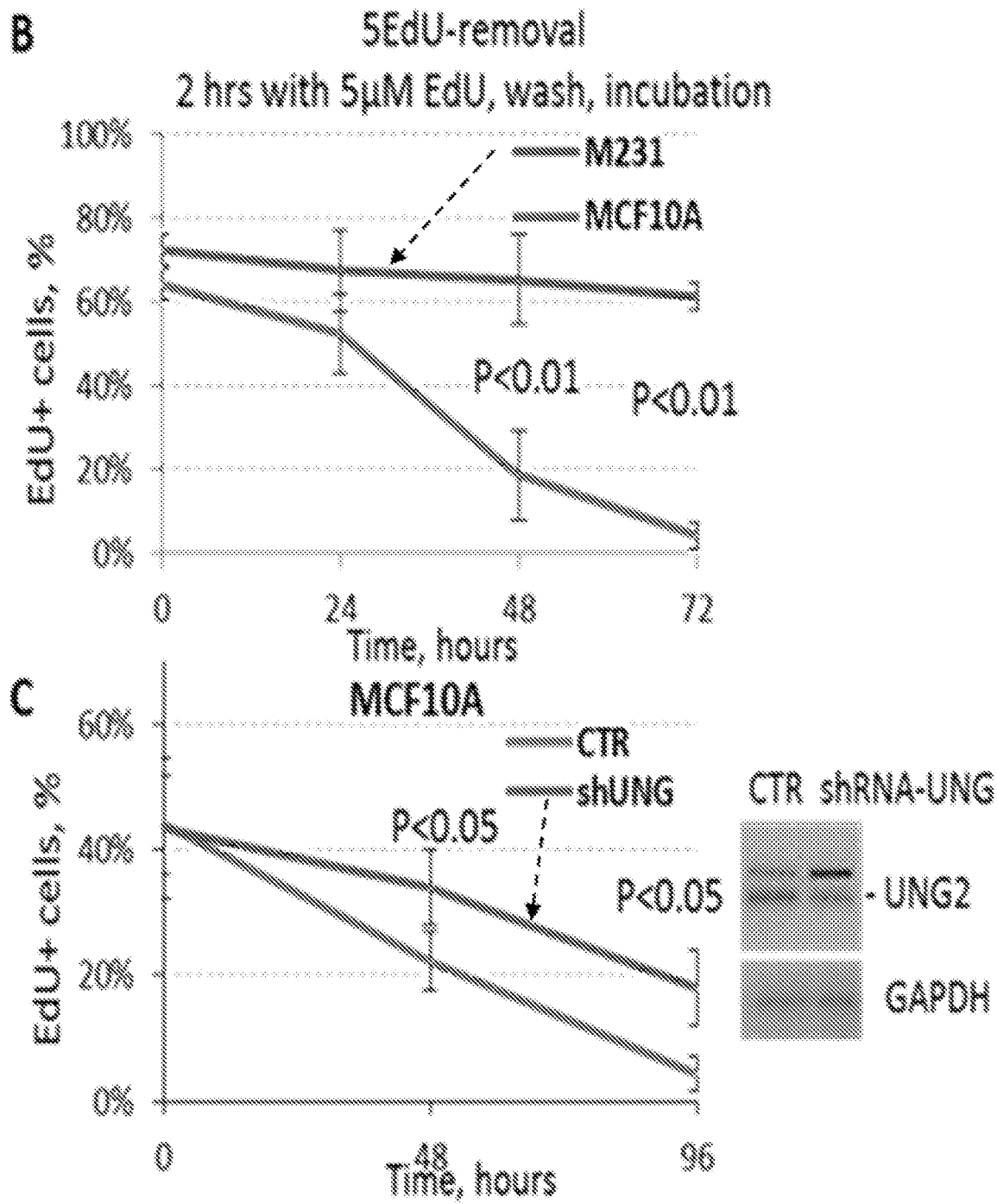
Figure 2:
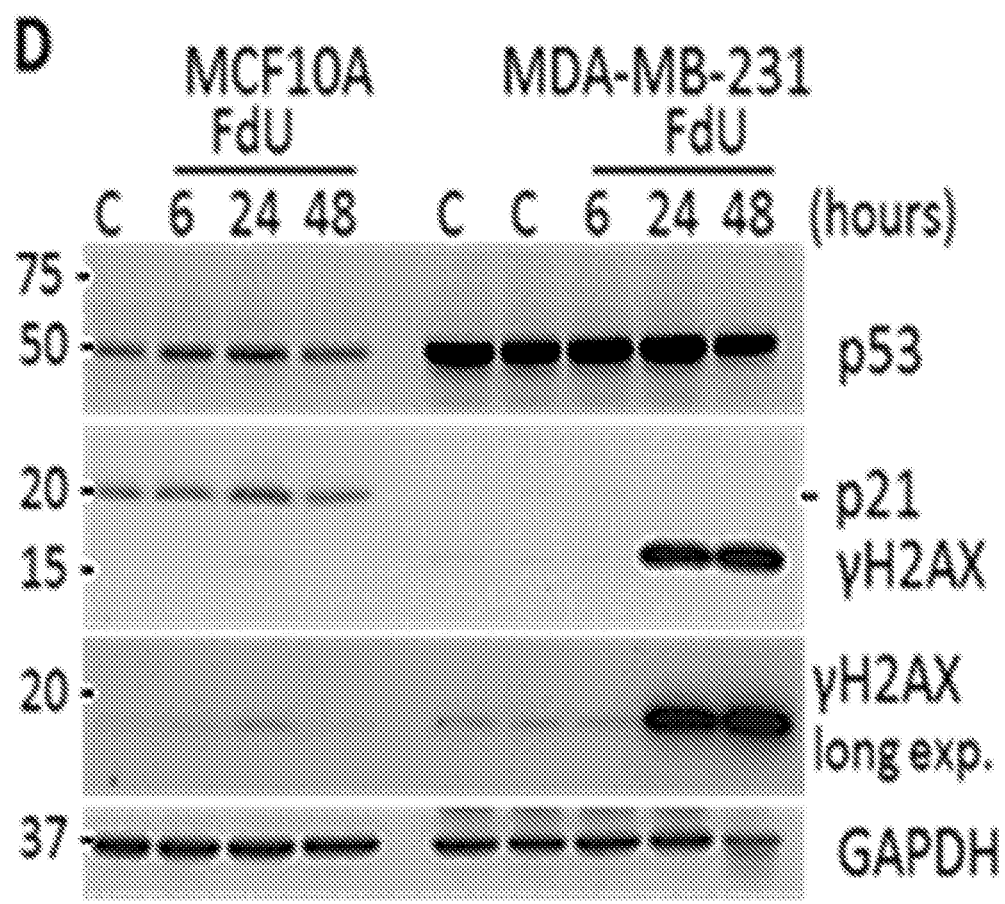

We examined BER-mediated DNA repair capacity in TNBC cells and non-tumor counterparts by evaluating removal of uracil analogue incorporated into DNA using TNBC cell line carrying mutant p53-R280K (MDA-MB-231) and normal breast MCF10A cell line with wild-type p53. Cells were incubated for 2 hrs with 5-ethynyl-2'-deoxyuridine (EdU) followed by incubation in EdU-free medium, and scoring EdU-positive cells using click-it chemistry (FIG. 2A). The fraction of EdU-positive cells was significantly reduced in MCF10A cultures over a period of 72 hrs, whereas MDA-MB-231 populations retained a significant presence of EdU-positive cells at 72 hrs (FIG. 2B). Thus, MCF10A cells efficiently removed uracil from DNA, whereas this process is defective in MDA-MB-231 cells.

To verify involvement of BER mechanism, uracil DNA glycosylase (UNG) was depleted in MCF10A cells using shRNA, and then subjected to the EdU-removal assay. The data showed a significant delay in the removal of uracil analogue in UNG-depleted cells compared to control, confirming a role of UNG in the uracil removal (FIG. 2C). mRNA levels of the BER and MMR genes were not reduced in MDA-MB-231 cells compared to MCF10A, while TCGA data did not show genetic alterations in BER genes in MDA-MB-231 (data not shown). Finally, we tested whether uracil analogues are sensed in the cell lines. As both uracil analogues EdU and 5-fluoro-2'-deoxyuridine (FdU) activate DNA damage response, we examined DNA damage (DD) response to FdU (FIG. 2D). In non-tumor MCF10A cells, FdU induced p53-p21 signaling, while γ-H2AX, a DD response marker, was induced transiently at 6 hrs of FdU exposure and declined by 48 hrs (FIG. 2D). In tumor MDA-MB-231 cells, γ-H2AX level was induced by 24 hrs and remained at high levels at 48 hrs (FIG. 2D). Comparable results were found in TNBC cell line MDA-MB-468 carrying mutant p53-R273H and non-tumor WI-38 stromal cells with wild-type p53 (data not shown). Together, these findings demonstrate that the removal of DNA-incorporated uracil analogue is significantly delayed in p53-deficient tumor cells, whereas normal cells with p53-wt effectively remove uracil analogue. The data indicate that the uracil removal is mediated, at least in part, by the BER pathway, while the differences in the response are not associated with genetic alteration or under-expression of the BER factors. Incorporation of uracil analogue is sensed in both p53-deficient and p53-wt cells, however normal cells exhibit a transitory DD response, whereas p53-deficient cells accumulate DD markers over time, which is consistent with deficiency in uracil removal by tumor cells.

Inhibition of PARP activates p53-p21 signaling.

The identified defect in the repair of DNA-incorporated uracil analogue in p53-deficient cells for a selective intervention was further studies. The BER mechanism repairs modified nucleotides, including FdU and EdU analogues, in cellular and mitochondrial DNA. DNA glycosylases such as UNG recognize and excise modified bases, initiating a repair process (FIG. 3A). The generated apurinic-pyrimidinic site (AP-site) in DNA is then cleaved by AP-endonuclease APE introducing single-strand DNA breaks that are subsequently bound by PARP, which initiates recruitment of enzymes restoring the original DNA sequence (FIG. 3A). Inhibition of PARP can interrupt DNA repair and lead to double-strand breaks (DSBs) and cell death. We asked whether PARP inhibitor (PARPi) will affect removal of uracil analogue in p53-wt cells. We examined DD signaling in response to PARPi olaparib. Treatment of MCF10A cells with 0.2-0.5 μM PARPi induced p53-p21 signaling, while no response was observed in MDA-MB-231 cells (FIG. 3B). Consistent with this finding, PARPi increased G1-population in MCF10A cells but not in MDA-MB-231 (FIG. 3C). Thus, PARPi induces p53-dependent G1-checkpoint in p53-wt cells, while this response is compromised in p53-mutant cells. Next, the EdU-removal assay showed that PARPi significantly delayed removal of EdU in MCF10A cells while had no effect in MDA-MB-231 (FIG. 3D), confirming the role of BER pathway in uracil removal and further emphasizing impairment of this process in p53-deficient tumor cells.

Inhibition of PARP enhances DNA damage response in p53-deficient tumor cells.

Figure 4:
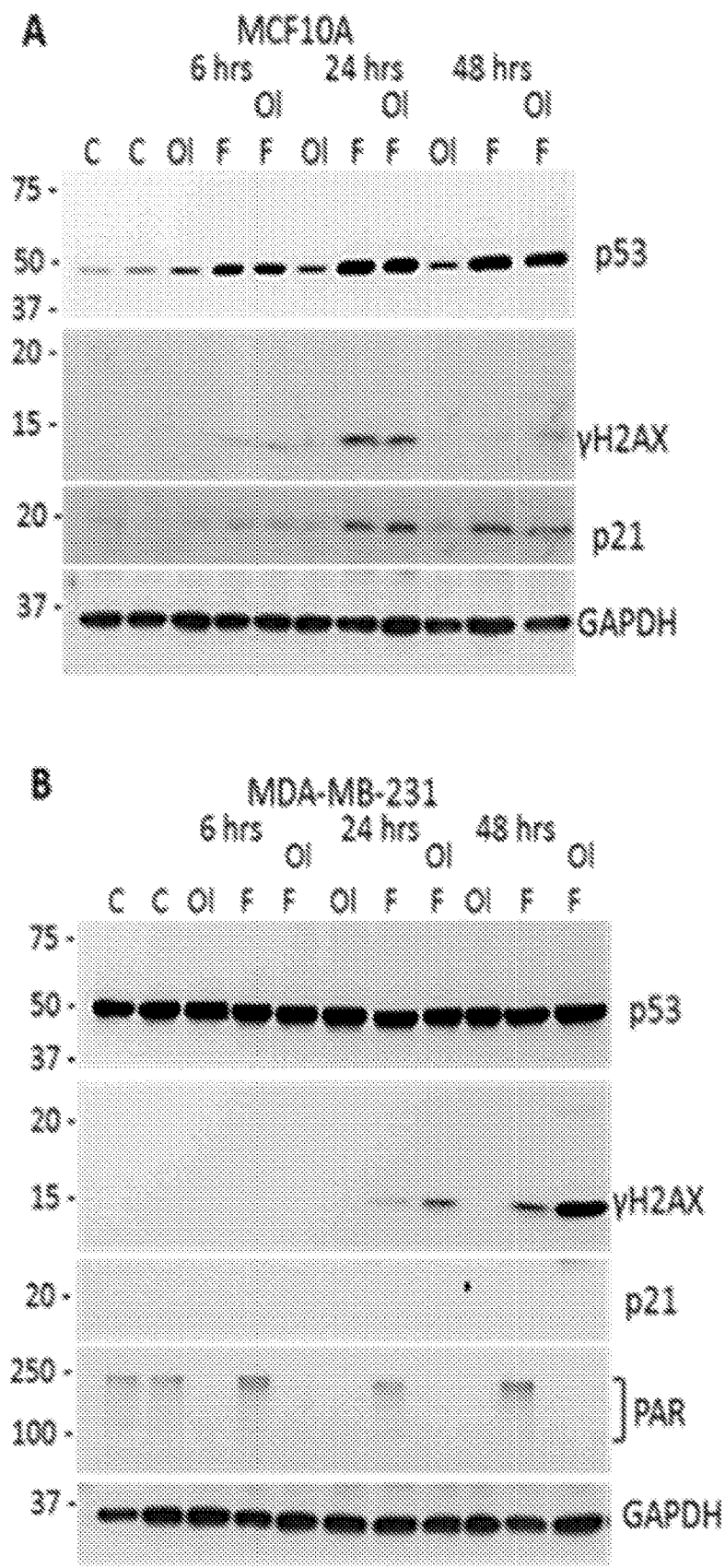
FIG. 4. PARP1-Inhibitor enhances DNA damage induced by FdU in p53-deficient cells. (A-C) Immunoblots of whole-cell extracts of wt-p53 (MCF10A), p53-mutant (MDA-MB-231; MDA-MB-468), and p53-deleted HCT-116 cell lines treated with 0.5 olaparib (O), 5 µM 5-fluoro-2'-deoxy-uridine (FdU, F) or their combination.
Figure 4:
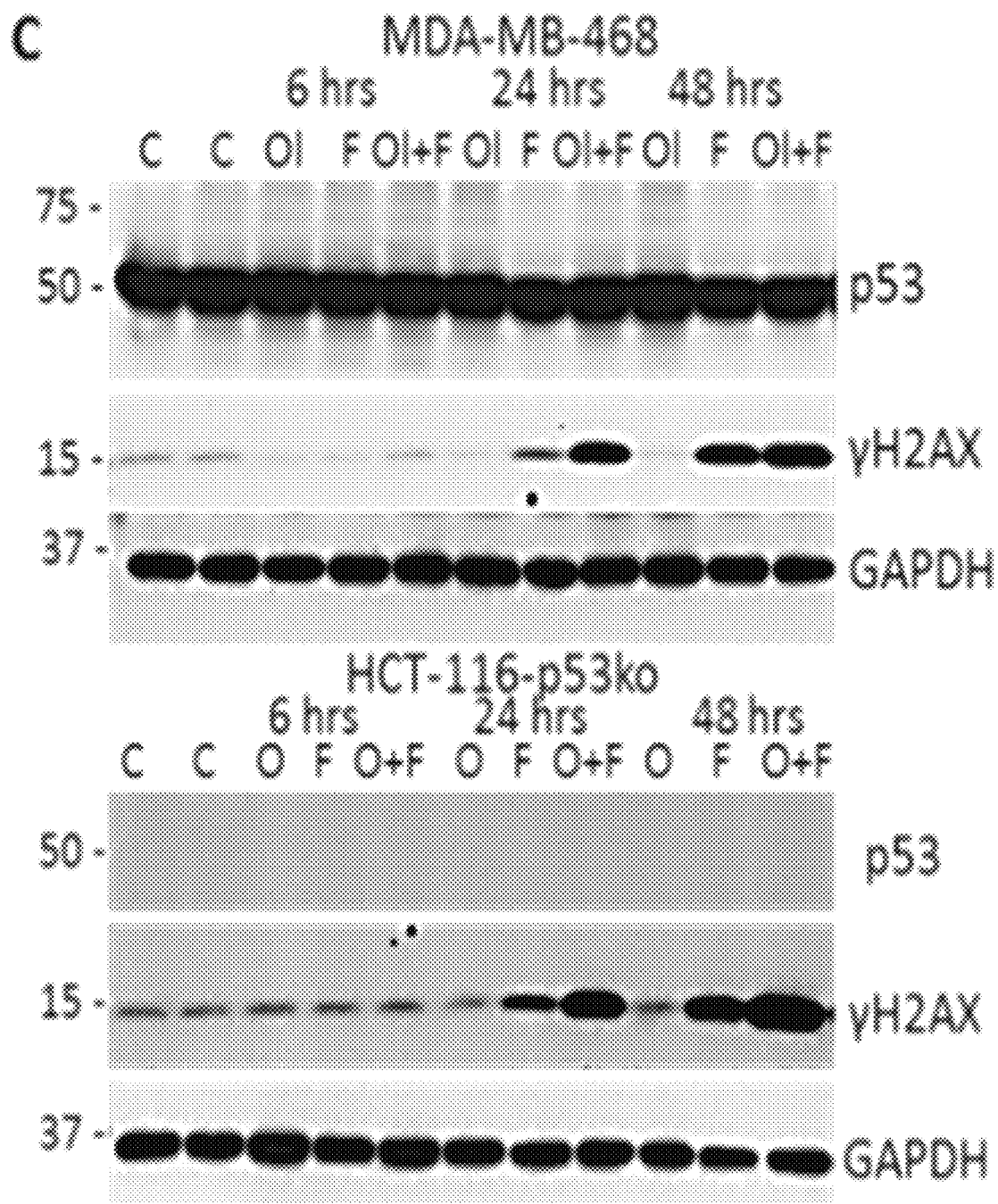

We determined if inhibition of PARP in combination with a uracil analogue FdU will enhance p53-p21 signaling and G1-population in p53-wt cells, whereas in p53-mutant cells PARPi will enhance DNA damage. Cells were treated with PARPi and FdU alone and in combination for various times. In p53-wt cells PARPi alone moderately increased p53-p21 signaling but did not induce appreciate levels of γ-H2AX (FIG. 4A); FdU activated the p53-p21 axis and induced a transient increase in γ-H2AX, while these responses were attenuated by a PARPi/FdU combination. In p53-mutant cell lines, neither of treatments activated p53-p21 signaling (FIG. 4B-C); note 0.5 μM PARPi reduced PARylation activity. Notably, γ-H2AX was strongly induced in p53-deficient cells co-treated with PARPi and FdU, demonstrating enhanced DD-response in all tested p53-deficient lines, including colon cancer HCT116-p53ko (FIG. 4B-C). Thus, PARPi cooperates with FdU in induction of DD-response in p53-deficient cells, while activating p53-p21 signaling in p53-wt cells.

Inhibition of PARP sensitizes p53-deficient tumor cells to FdU.

To determine the significance of cooperative DD-response by PARPi and FdU, we examined cytotoxicity of the drug combination in cell lines that do not carry BRCA defects. Cytotoxic assays with PARPi olaparib revealed comparable the IC50 values for MDA-MB-231 (17.4 μM) and MCF10A (15.3 μM) cell lines, which were significantly higher than IC50 values for BRCA1-deficient cell lines (<1 μM) and also markedly exceeded the inhibitory EC50 (1-10 nM) for poly-ADP-ribosylation (PARylation) (Murai et al., Cancer Res 2012, 72(21):5588-5599) and concentrations that inhibited PARylation activity in MDA-MB-231 (FIG. 4B) or activated p53-p21 signaling (200 nM) in MCF10A (FIG. 3B).

Figure 3:
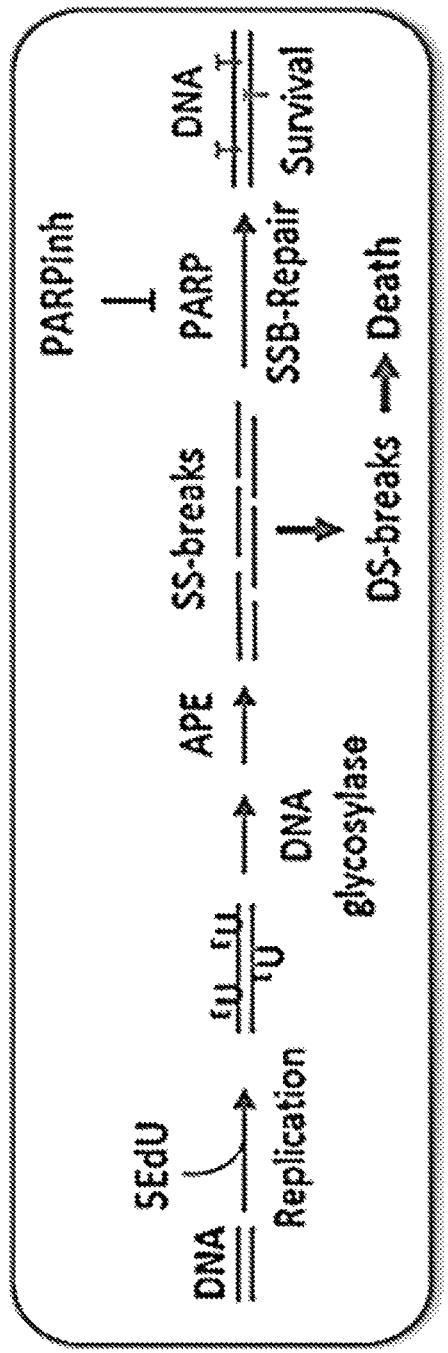
FIG. 3. PARP1-Inhibitor induces G1-arrest and attenuates removal of Uracil in MCF10A but not in MDA-MB-231 cells. (A) Schematic presentation of BER-mediated removal of EdU and the role of PARP1/2. (B) Immunoblots of whole-cell extracts from p53-wt MCF10A and p53-deficient MDA-MB-231 cells treated with PARPi olaparib for 24 hrs at indicated concentrations. (C) Cell cycle histograms of MCF10A and MDA-MB-231 cells treated with PARPi or vehicle-control for 48 hrs. (D) Cells were pulse-labeled with 5-ethynyl-2-deoxy-uridine (EdU) for 2 hrs followed by wash and incubation in the absence or presence of 0.5 µM Olaparib. Graphs show amount of cells labelled with EdU relative to a total number of cells.
Figure 3:
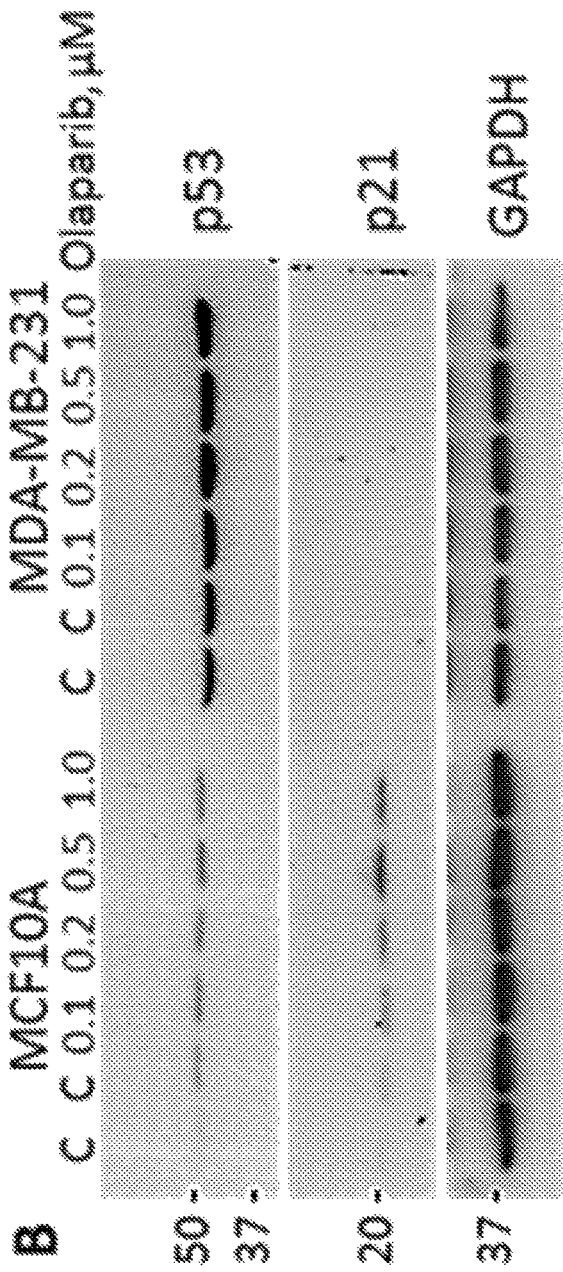
Figure 3:
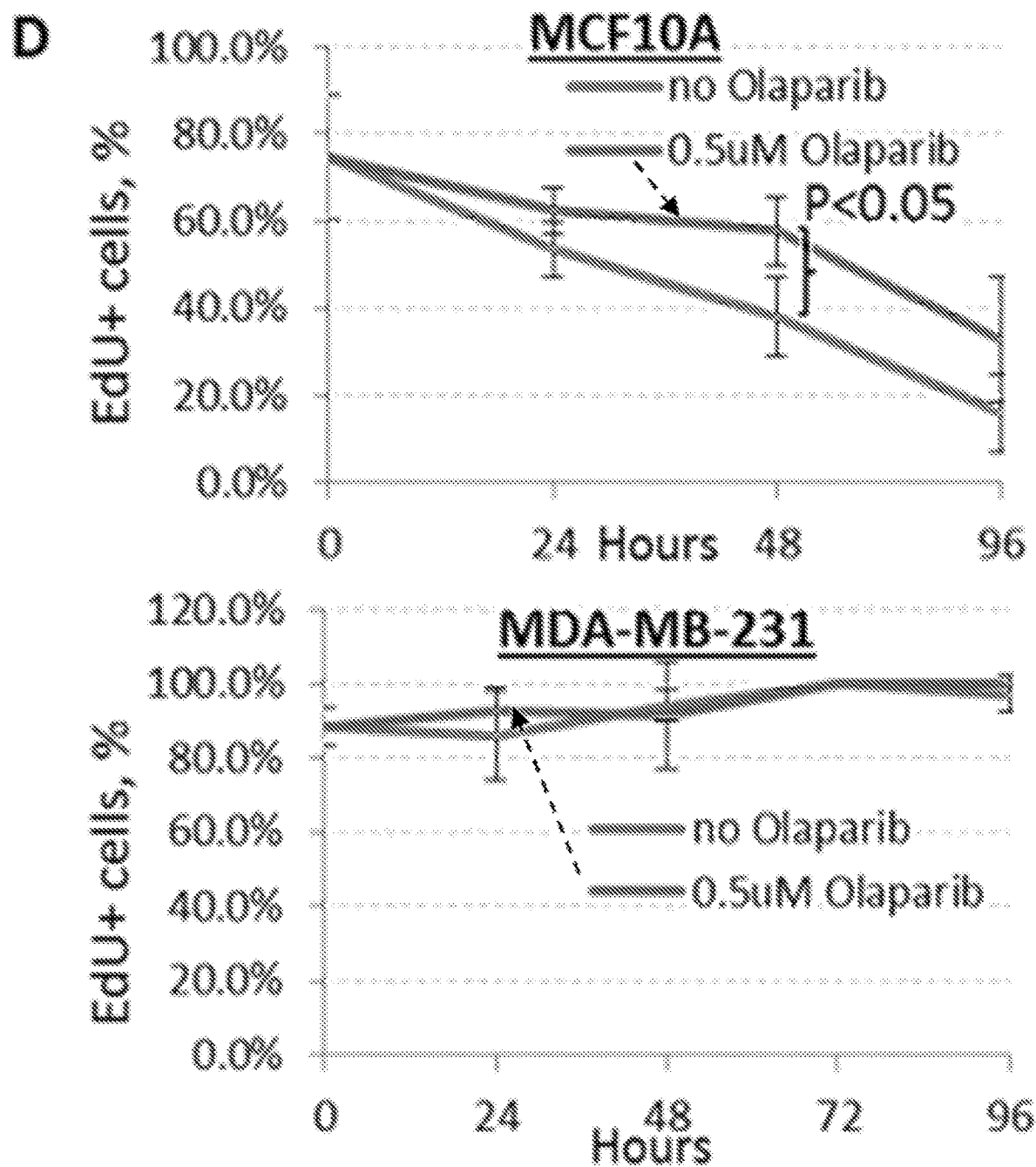
Figure 5:
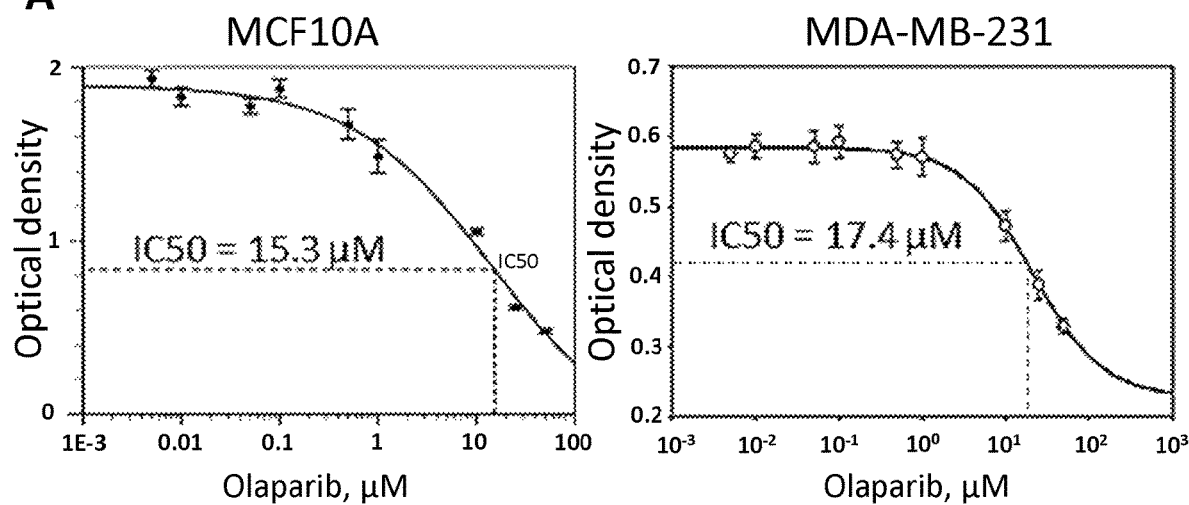
FIG. 5. PARP inhibitor enhances cytotoxicity of FdU and TAS-102 in p53-deficient cells. (A) Cytotoxicity curves for normal MCF10A cells and p53-deficient MDA-MB-231 cells treated with PARPi olaparib. (B) Cells were treated with 5-fluoro-2-deoxyuridine (FdU) alone or in combination with 500 nM PARPi (Ola). (C) Summary of IC50 values (µM) for FdU and FdU+Olaparib combination. Ratio shows changes in IC50 values relative to a combination treatment.
Figure 5:
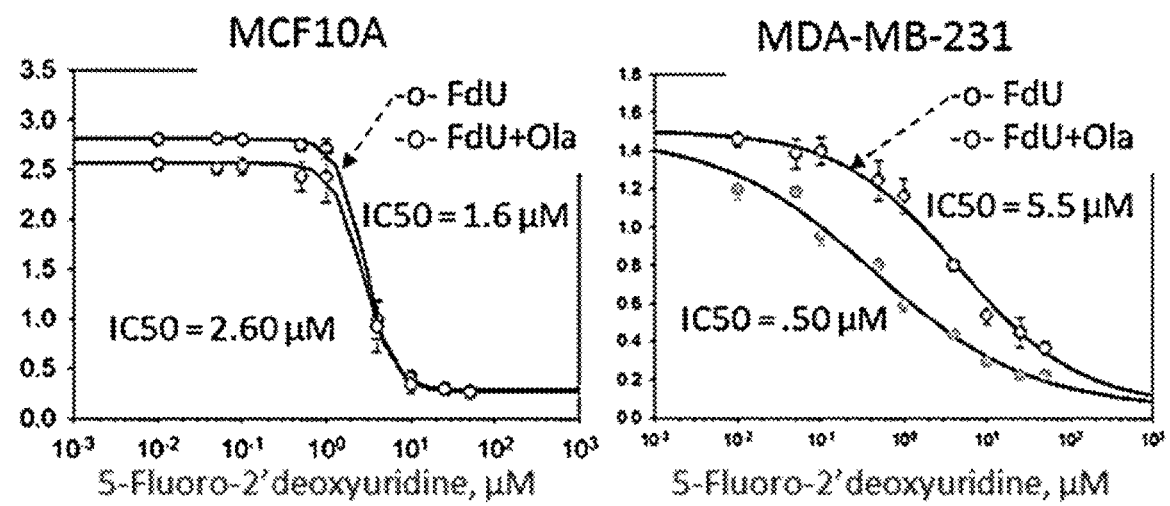
Figure 5:
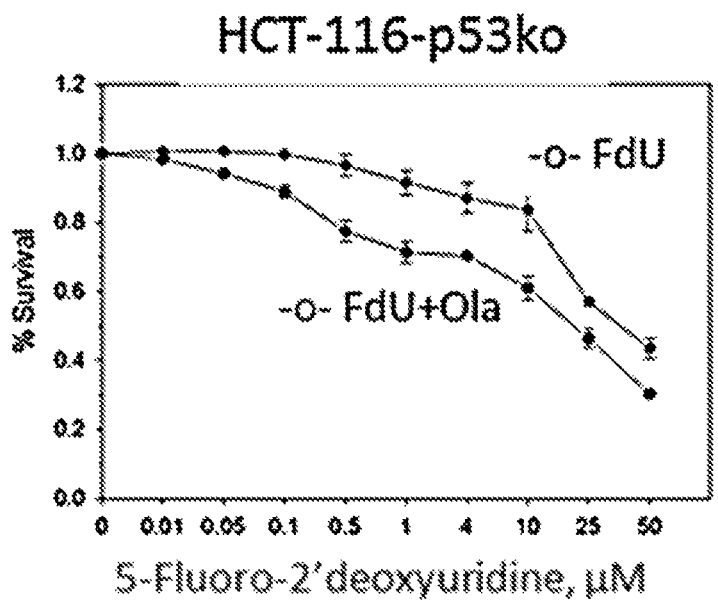

Cytotoxicity assays with FdU revealed that addition of 500 nM olaparib (<IC10) significantly sensitized to FdU p53-deficient TNBC and colon cancer cell lines, by nearly 10-fold (FIG. 5B-C). In contrast, PARPi actually reduced sensitivity to FdU of p53-wt cell lines MCF10A and WI-38 (FIG. 5B-C), which is consistent with induction of p53-p21 signaling by PARPi (FIG. 3). These data show that PARPi selectively sensitized p53-deficient tumor cells to cytotoxic effects of FdU, while reducing FdU toxicity in p53-wt cells.

PARPi enhances response to TAS102 in p53-deficient cells.

Recently, a novel oral cytotoxic chemotherapy TAS-102 (trifluridine/tipiracil; Lonsurf) was FDA approved for treatment of advanced gastric cancers. (taihooncology.com/us/prescribing-information). TAS-102 includes a uracil analogue trifluridine and tipiracil, a thymidine phosphorylase inhibitor (TPI) that prevents trifluridine degradation by thymidine phosphorylase, increasing trifluridine bioavailability. In phase 3 trials TAS-102 significantly improved survival and was well tolerated in patients with advanced GI-tract cancer (Shitara et al., The Lancet Oncology 2018, 19(11):1437-1448; Mayer et al., The New England journal of medicine 2015, 372(20):1909-1919.

We examined whether TAS-102 cooperates with PARPi in cytotoxicity against p53-deficient cells. TAS-102 alone showed comparable IC50 values in cytotoxicity assays with p53-deficient and p53-wt cell lines (FIG. 6). Remarkably, PARPi at 500 nM significantly enhanced cytotoxicity of TAS-102 against p53-deficient cells (0.5-0.8 μM) while reducing toxicity for p53-wt cell lines, 4-5 μM (FIG. 6). Consistent with this result, PARPi enhanced DD response to TAS-102 in p53-deficient cells (data not shown). These data demonstrate a strong potential for a TAS-102/PARPi combination therapy for treatment of patients with breast or GI-tract cancers.

Example 2

This example further describes that p53-deficient cancer cell lines and preclinical breast cancer models display sensitivity to a combinational therapy comprising a dU analog and a PARPi.

Methods

Cell lines and culture conditions.

All human cell lines were authenticated using short tandem repeat profiling by ATCC or the Roswell Park Core within the last three years. All studies were made using mycoplasma-free cells. Human non-tumor breast epithelial MCF10A (RRID: CVCL_0598), metastatic breast cancer MDA-MB-231 (RRID:CVCL_0062) and MDA-MB-468 (RRID: CVCL_0419), and human embryonic fibroblast WI-38 (RRID:CVCL_0579) cell lines were obtained from American Type Culture Collection (ATCC, Manassass, VA, USA), and cultured as recommended by ATCC. Human colon cancer HCT-116 and HCT-116-p53ko cell lines were from Dr. Bert Vogelstein; human breast epithelial MCF10A-p21ko cell lines were from Dr. Ben Ho Park and are described elsewhere [16].

PARP inhibitors, Antibodies and Other Reagents.

Details on reagents, antibodies, and immunoblot analysis can be found in Supplementary Information.

Mice.

Female SCID/CB17 mice (6-7-week-old) were obtained from a colony of SCID/CB17 mice bred and maintained at the Animal Facility of the Roswell Park Comprehensive Cancer Center (RP). Animals were kept in microinsulator units and were provided with food and water ad libitum according to a protocol and guidelines approved by the Institute Animal Care and Use Committee (IACUC). The facility is certified by the American Association for Accreditation of Laboratory Animal Care (AAALAC) and is in accordance with current regulation and standards of the US Department of Agriculture and the US Department of Health and Human Services.

Mice were inoculated into the 4th mammary fat pad with exponentially growing MDA-MB-231 tumor cells ($1\times10^6$/mouse). Tumor growth was monitored by measuring tumor diameters with electronic calipers twice/week. Volumes were calculated using the formula (length)×(width)2/2. Mouse weights were measured twice/week. Once tumor volume reached 100 mm3, mice were randomly divided into four groups: vehicle-control, olaparib, TAS102, and TAS102+olaparib (n=8 mice/group). PARP inhibitor olaparib and TAS102 were dissolved in 12% HPCD, (2-Hydroxypropyl)-β-cyclodextrin, in Dulbecco's Phosphate Buffered Saline (DPBS). Drugs were given at 50 mg/kg by oral gavage on schedule 5-days-on and 2-days-off. At the endpoint, mice were euthanized and subjected to necropsy and organ collection. Tumor tissues were collected for RNA and protein analyses by snap-freezing in liquid nitrogen. Blood was collected for CBC by cardiac puncture.

Complete Blood Counts.

At the endpoint, blood was collected by cardiac puncture into EDTA-containing tubes to prevent coagulation. Analysis was performed using the HemaTrue Analyzer and HeskaView Integrated Software version 2.5.2.

Cytotoxicity Assay.

Cells were plated at a density of 5,000 cells/well in a 96 well-plate and then treated with the appropriate drugs at varying concentrations for 24 hours. Media was replenished with media with or without PARP inhibitors and cell were incubated for 96 hours. Cells were stained with 1% Methylene Blue for 30 minutes, rinsed with water, dried and then solubilized in 5% SDS in PBS, and read at 650 nm. IC50 values were generated using GraphPad Prism8 (Version 8.4.2).

Immunohistochemistry (IHC).

Tumors and organ tissues were fixed in 10% (v/v) formalin, before embedding in paraffin by the Pathology Core. H&E and other stains were carried out by the Pathology Core as described in [17]. Details of antibodies and reagents, and expanded methodology for immunohistochemistry, blood vessel and Ki-67 index evaluation, and statistical analysis can be found in the Supplementary Information.

Flow Cytometry.

All samples were analyzed on an LSRFortessa Cytometer (BD Biosciences) running FACSDiva (Version 6.1.3), and the data were processed using FCS Express 7 (Version 7.04.0016). For the EdUrd pulse experiments, 300,000 cells per well were seeded in a 6-well plate, and the following day media was replaced with base media containing 5% dialyzed FBS. Cells were then incubated with 10 µM EdUrd for two hours, while untreated cells served as the negative control. Following the two-hour pulse, cells were washed twice with DPBS and the media was replenished. Collection of cells began at t=0 hr up to t=72 hr post EdUrd-pulse. Cells were collected using standard trypsinization, washed in 1% BSA in DPBS, and fixed in 4% paraformaldehyde for 15 minutes. Cells underwent two more washes in 1% BSA/DPBS before being permeabilized in 1× saponin buffer. To label the incorporated EdU, cells were subjected to 'click-it' reaction with Cu(II)SO4, Tris-pH 8.5, THTPA, ascorbic acid, and either Cy3 azide or AFDye 488 azide for 30 minutes. DNA content was labeled with either Hoechst 33342 or Propidium Iodide containing 1 µg/mL of RNAse A. All samples were subsequently washed in 1% BSA/DPBS, resuspended in 1× saponin buffer, and transferred to polystyrene tubes. Experiments were repeated three times and representative histograms and dot-plots shown. For cell cycle analysis, cells were seeded at 300,000 cells/well in 6-well plates and then treated with various amounts of olaparib and talazoparib for 24 hours. Collected cells were fixed for 2 hrs in ice-cold 70% ethanol and stained for 2 hrs at 4° C. in Krishan DNA Buffer (propidium iodide, sodium citrate, RNase A, NP40, and 0.1 mM HCl). Samples were sorted using a BD LSRFortessa cytometer running FACSDiva (Version 6.1.3), and the data were analyzed using ModFit Lt software (Version 5.0.9). Experiments were repeated twice with representative histograms shown.

Immunofluorescence Microscopy.

Cells were grown on glass coverslips (22×22 mm) and treated with inhibitors for various times, then fixed with 4% PFA and permeabilized with 0.05% Triton X-100. For γH2AX staining samples were blocked with 3% milk in PBS for 30 min at room temperature (RT), and then incubated for 1 h with antibodies to γH2AX (1:400) in 1% milk/PBS followed by incubation with Texas red-conjugated secondary antibody (1:500) for 30 min at RT. For evaluation of genomic EdU, cells were grown on glass coverslips, and then pulse-labeled with EdUrd as described for flow cytometry. Cells were fixed at various times with 4% PFA and permeabilized with 0.05% Triton X-100, and then EdU was labeled with Cy3 azide using 'click-it' reaction as described above. DNA was labeled with Hoechst 33342 before mounting on glass slides. Fluorescence images were taken with a Plan Apochromat 60×/1.40 NA oil objective at ambient temperature using Nikon TE2000-E inverted microscope equipped with a charge-coupled device camera (CoolSNAP HQ; Photometrics). The images were acquired using MetaVue imaging software (v7.7.3, Molecular Devices). Experiments were repeated twice with representative images shown.

Metadata analysis: Heat-map of expression profiles was generated using the TCGA Breast Cancer dataset, Project ID: TCGA-BRCA, dbGaP Study Accession: phs000178. Expression Z-scores and mutation data were downloaded via the cBioPortal tool https://www.cbioportal.org/.

Gene lists for cell-cycle related genes are generated using Cyclebase_3.0 database http://www.cyclebase.org [18]. DNA repair gene lists were derived from KEGG database http://www.genome.jp/kegg/[19]. Supporting exploratory heatmaps are provided in Supplemental figure. Plots throughout are sample means±1 sd. Expression of DNA repair and replication-related genes in MDA-MB-231 and MCF10A were derived from gene expression profiles reported previously [20].

Statistics.

Statistical significance of data comparisons were determined using the Student's unpaired t-test with a two-tailed distribution. Statistical significance was achieved when $P<0.05$. Survival was evaluated using the Kaplan-Meier estimator with the log rank test, based on time-to-arrive at a tumor volume of 1 cm3 using GraphPad Prism 7.

Results

Activation of DNA repair pathways in triple-negative breast cancer (TNBC).

Figure 7:
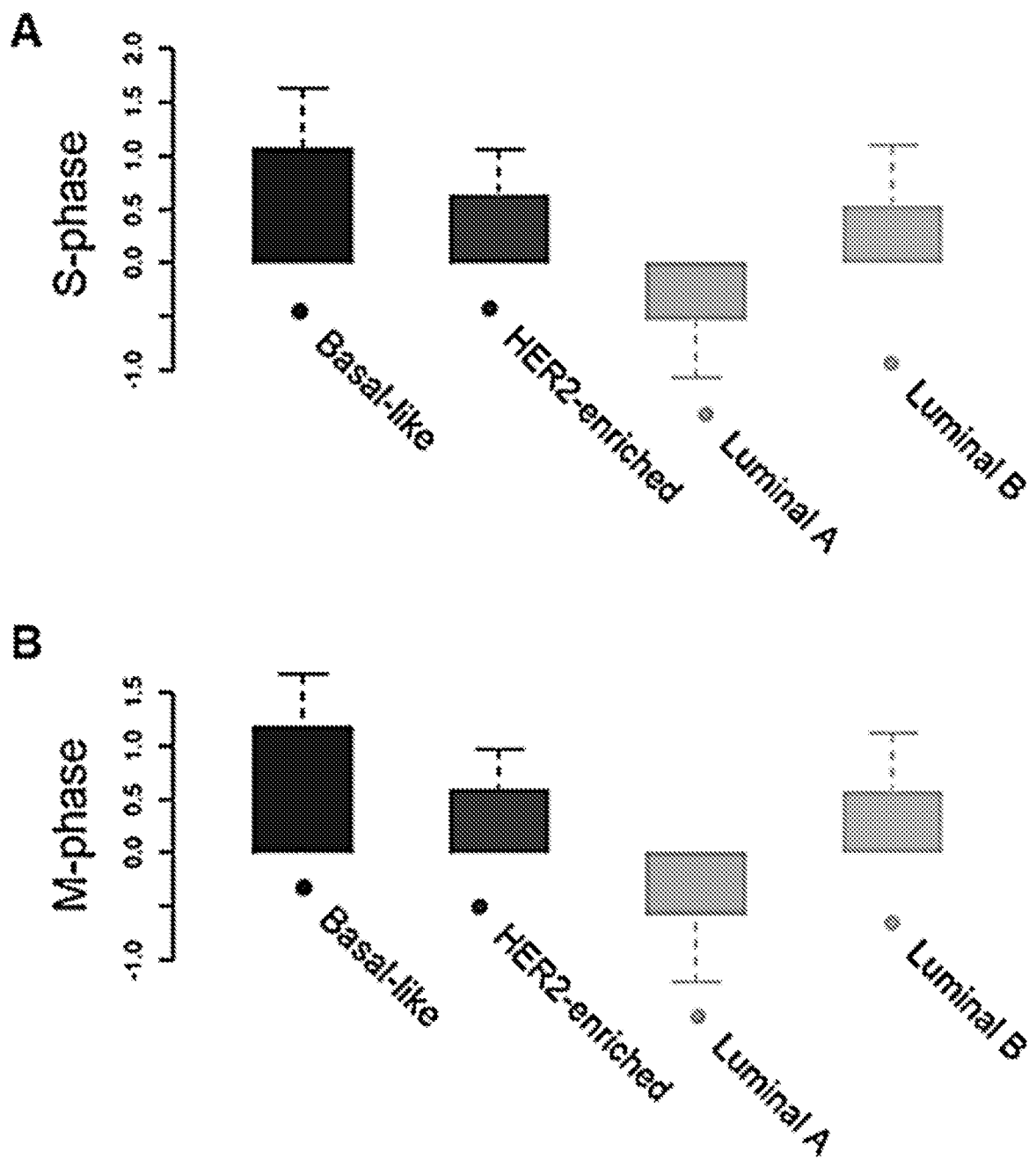
FIG. 7. Activation of DNA replication and DNA repair pathways in TNBCs. (A-B) Expression of replication-related genes (S-phase and M-phase) in Breast Cancer subtypes (TCGA BC dataset). Gene lists are designed using Cyclebase 3.0 database. (C) Tumor mutational burden in Breast Cancer subtypes (TCGA BC dataset). (D) MMR and BER pathway scores stratified by PAM50 classification. Gene lists are derived from KEGG. (E) Expression of individual genes in BER and MMR pathways is elevated in p53-deficient tumors in predominantly TNBC/Basal-like cancer cases.
Figure 7:
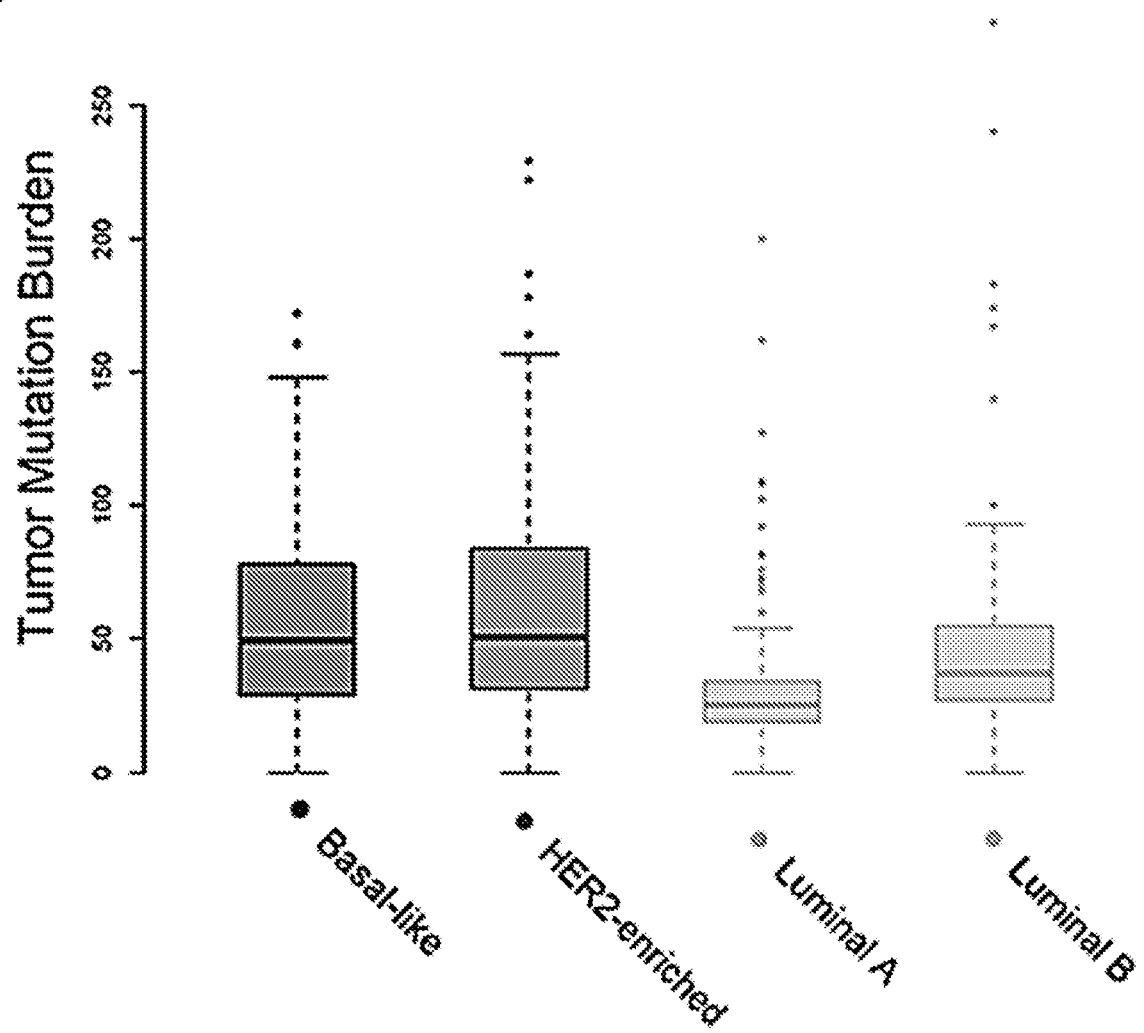
Figure 7:
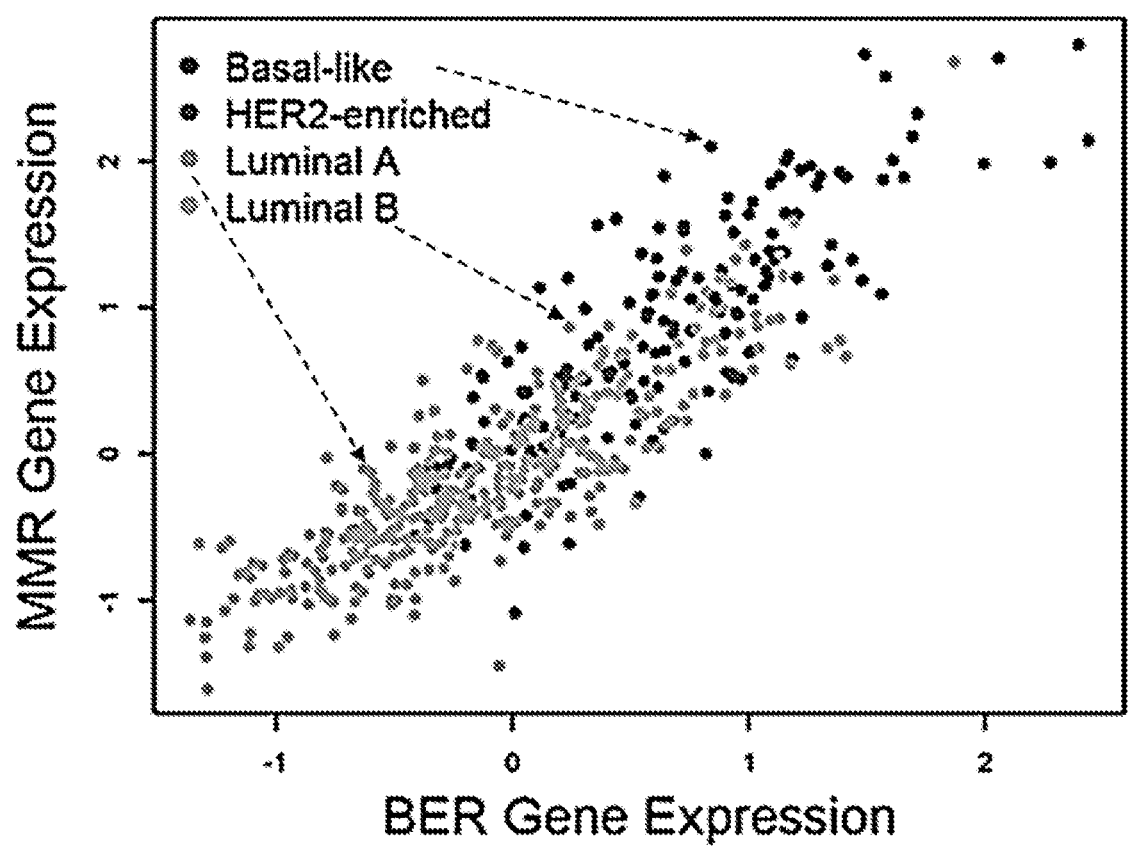
Figure 7:
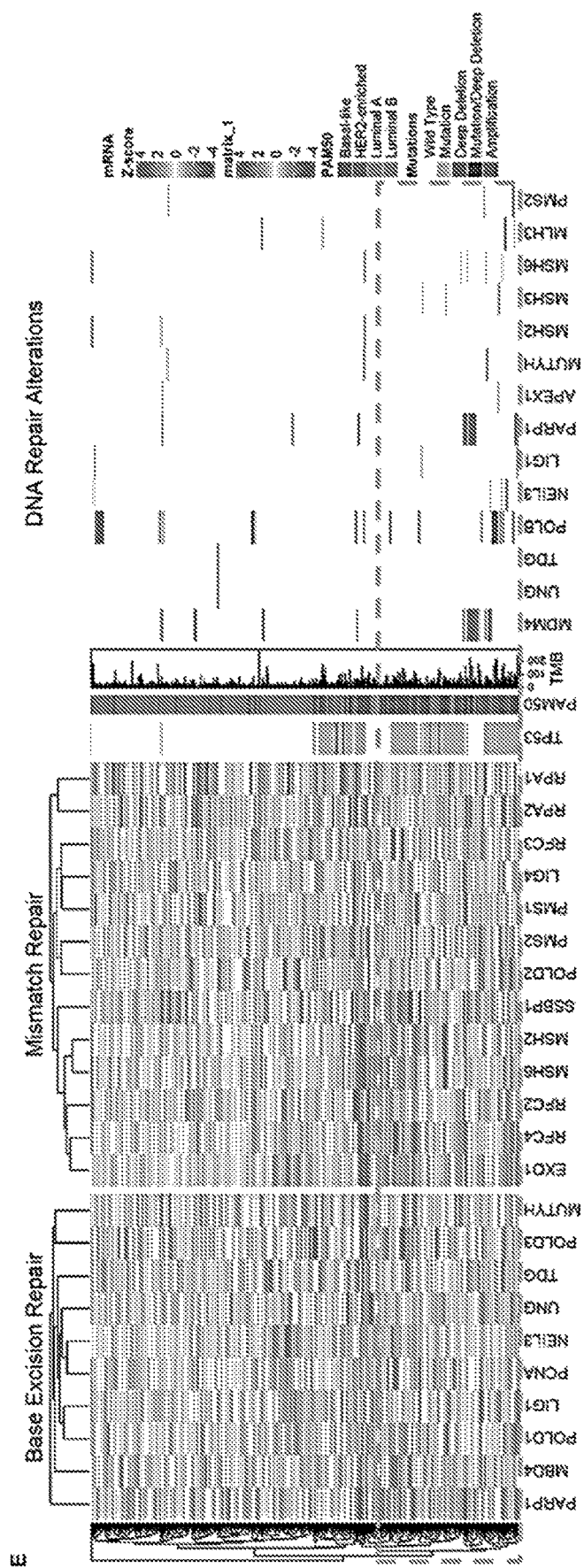
Figure 14:
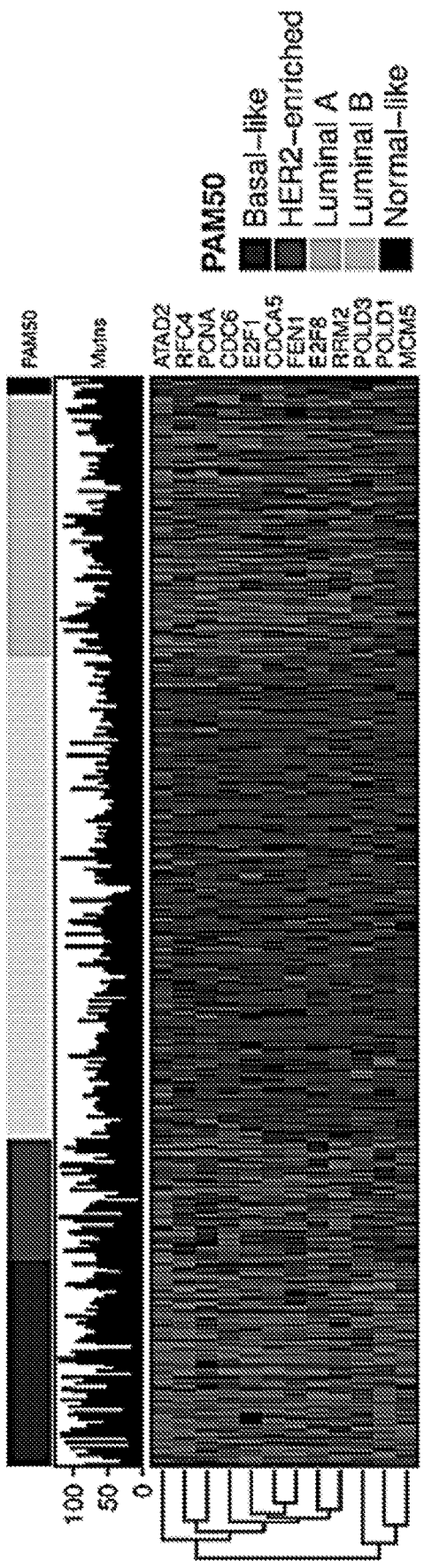
FIG. 14. Genomics of replication-related and DNA repair (BER/MMR) genes in breast cancer. (A) Expression profiles of replication-related genes (S-phase and M-phase) in Breast Cancer subtypes (TCGA BC dataset). Gene lists are designed using Cyclebase_3.0 database. (B) Clustering analysis of BER and MMR Gene lists are derived from KEGG. (C) Expression of individual genes in BER, MMR, and cell cycle pathways in p53wt MCF10A and p53-mutant MDA-MB-231 cell lines.
Figure 14:
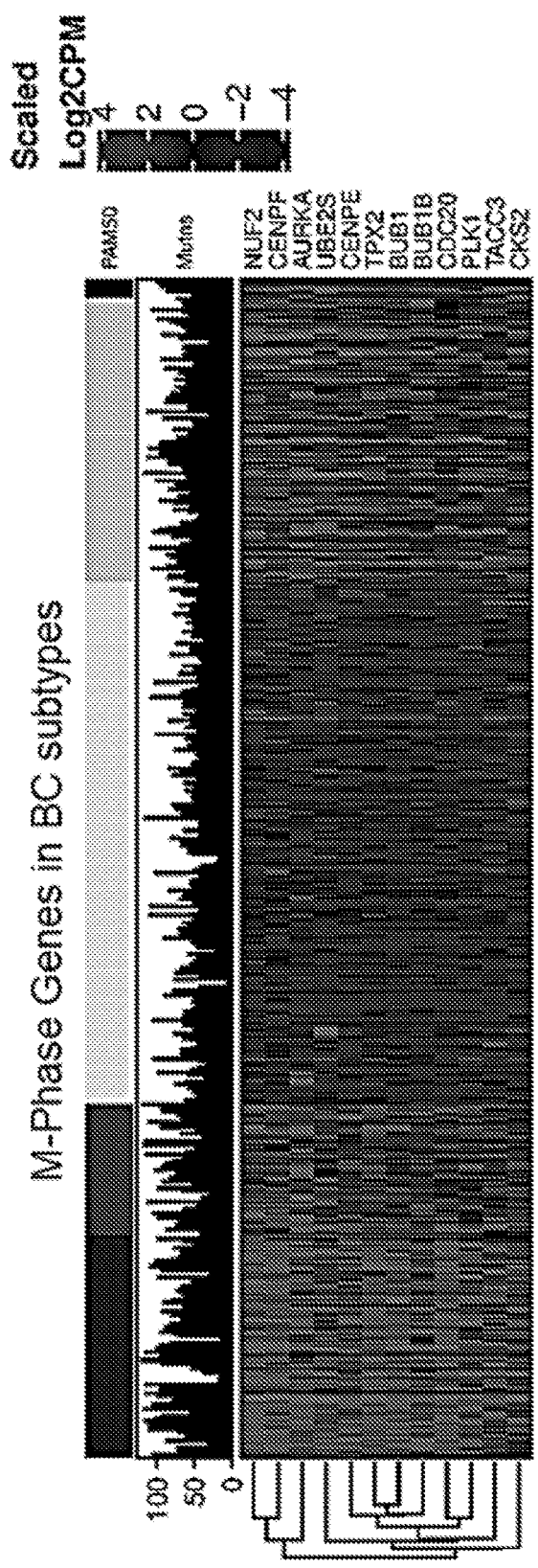
Figure 14:
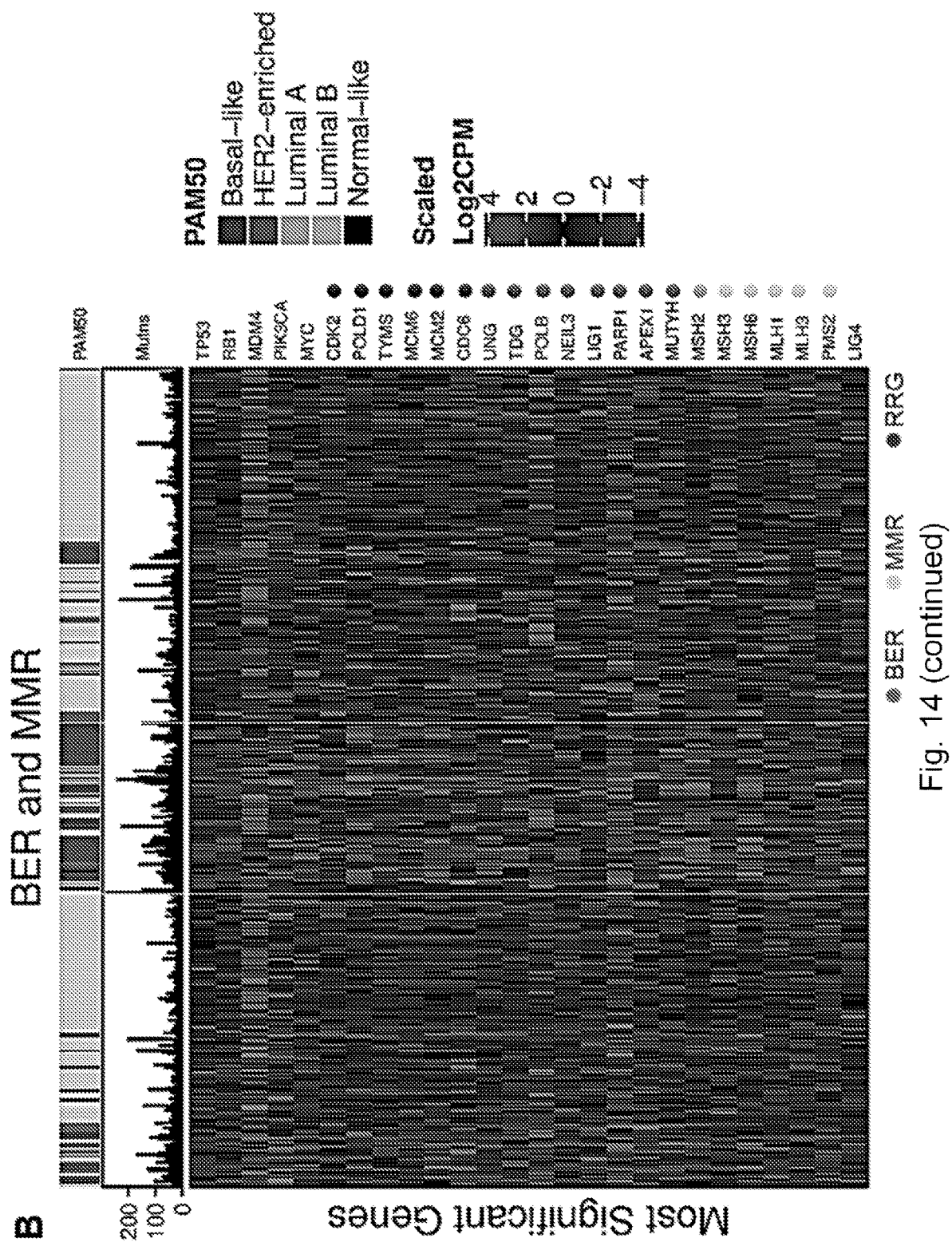
Figure 14:
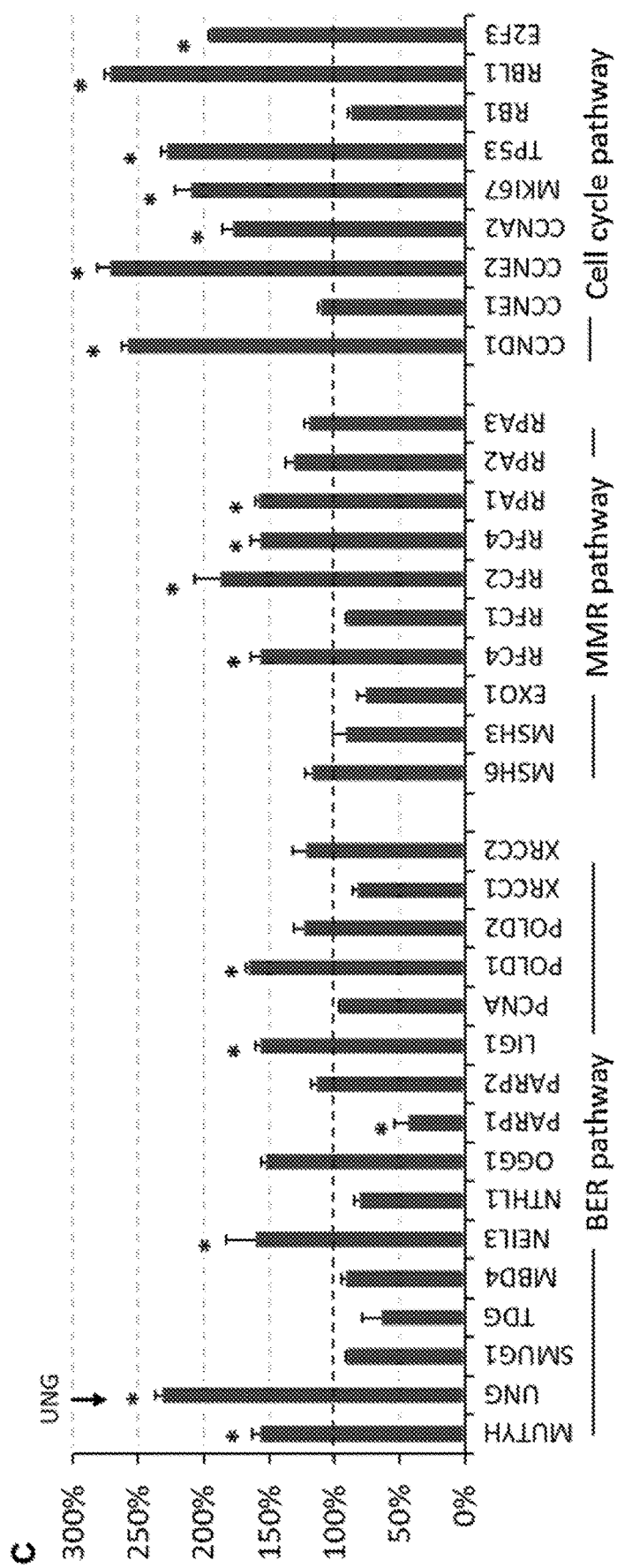

Clinical behavior of breast cancers has been linked to high proliferative index and mutational burden. We explored the expression of replication-related genes (RRGs) in breast cancer (BC) subtypes using The Cancer Genome Atlas (TCGA) data. Genomic data showed that TNBC/Basal-like cancers (TNBC thereafter, see Introduction) exhibit high expression of S- and M-phase cell cycle genes (t-test $P<0.001$), indicating elevated replication activity (FIG. 7A-B and FIG. 14A). DNA replication consumes substantial energy and nucleotide resources, and may imbalance the pool of nucleotides, causing replication stress and increasing mutational burden. Consistent with this notion, TNBCs showed high mutational burden, while only luminal A cases had a distinctly low tumor mutation burden (FIG. 7C, t-test $P<0.001$). TNBCs had a prevalence of C-to-T transition, typically associated with mis-incorporation or modification of nucleotides. Metastatic TNBCs also had higher mutational burden compared to other BC subtypes.

Mis-incorporated or modified nucleotides are normally removed by DNA repair mechanisms such as mismatch repair (MMR) and base-excision repair (BER), while inadequate activity or genetic alterations in these mechanisms may increase the mutational burden. To address this idea, we assessed genomic data for BER and MMR genes. Unsupervised clustering revealed that TNBCs expressed both BER and MMR genes at the highest level compared to other subtypes (FIG. 14B), with high correlation between MMR and BER gene sets (p=0.88, FIG. 7D). These findings indicated that TNBCs exhibit elevated replicative activity along with increased expression of BER and MMR pathways. Importantly, expression of BER and MMR genes was highly elevated in p53-deficient cancers, while genetic alterations in these repair genes were infrequent events (FIG. 7E). Notably, DNA glycosylases involved in the repair of uracil and base-modified nucleotides, i.e. UNG, TDG, and MUTYH, were highly expressed in TNBC (FIG. 7E). These findings suggested that p53 mutant (p53mt) cancers may experience dysregulation or impediment in BER and MMR mechanisms even in the absence of genetic alterations in DNA repair genes, supported by high mutational burden in p53mt cancers (FIG. 7E) and a critical role of p53 in DNA repair.

BER-mediated DNA repair in p53-deficient breast cancer cells.

The mutation signature of MMR-deficient cancers is characterized by microsatellite instability, a result of indel repair deficiency; conversely, tumors with compromised p53 function are characterized by increased levels of C-to-T transitions. Mismatched nucleotides and indels both arise during DNA replication and can be removed by MMR mechanisms. The BER system removes DNA base lesions leading to C-to-T transition such as deamination (uracil), oxidation (e.g., 8-oxoguanine), or alkylation (e.g., 3-methyladenine and 6-ethyl-guanine). Based on this rationale, we examined BER repair capacity in a breast cancer MDA-MB-231 cell line carrying mutant p53 (R280K) and a normal breast epithelial MCF10A cell line with wild-type (wt) p53. Neither cell lines carry genetic alterations in the BER or MMR pathways, based on genomic data; while MDA-MB-231 cells do express high levels of UNG and RRGs (FIG. 14C).

Figure 8:
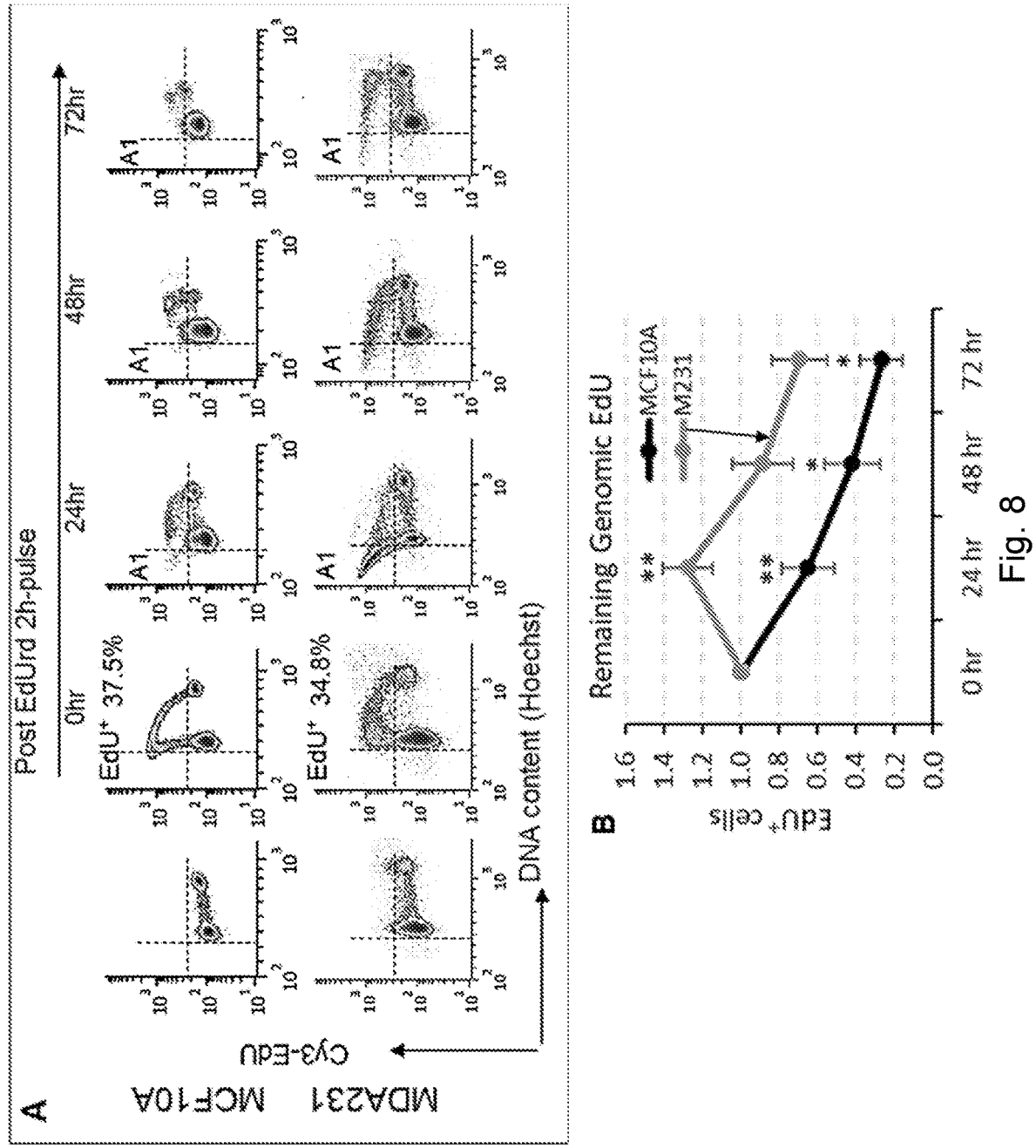
FIG. 8. Removal of genomic ethynyl-deoxyuracil (EdU) by BER in non-tumor and tumor cells. (A-B) Breast epithelial p53wt MCF10A and breast cancer p53mt MDA-MB-231 cell lines were pulse-labeled with 5-ethynyl-2'-deoxy-uridine (EdUrd) for 2 hrs followed by wash and incubation for indicated time. Cells were fixed and EdU was stained using click-it chemistry, and analyzed by flow cytometry with Hoechst for DNA content. EdU-positive populations were scored relative to initial levels. (C) Cell cycle data for cells treated as in (A). (D) EdU+ cells with reduced Hoechst fluorescence (upper-left quartile). Comparison was made using the Log rank test (*, $P<0.05$; **, $P<0.01$). (E) Scheme illustrates the model of EdUrd-induced futile cycle of BER-mediated DNA repair and the role of p53. (F) Immunoblot data in MCF10A and MDA-MB-231 cell lines after 2 hr EdUrd-pulse (P), and 24-48 hours after wash and incubation in EdUrd-free media.
Figure 8:
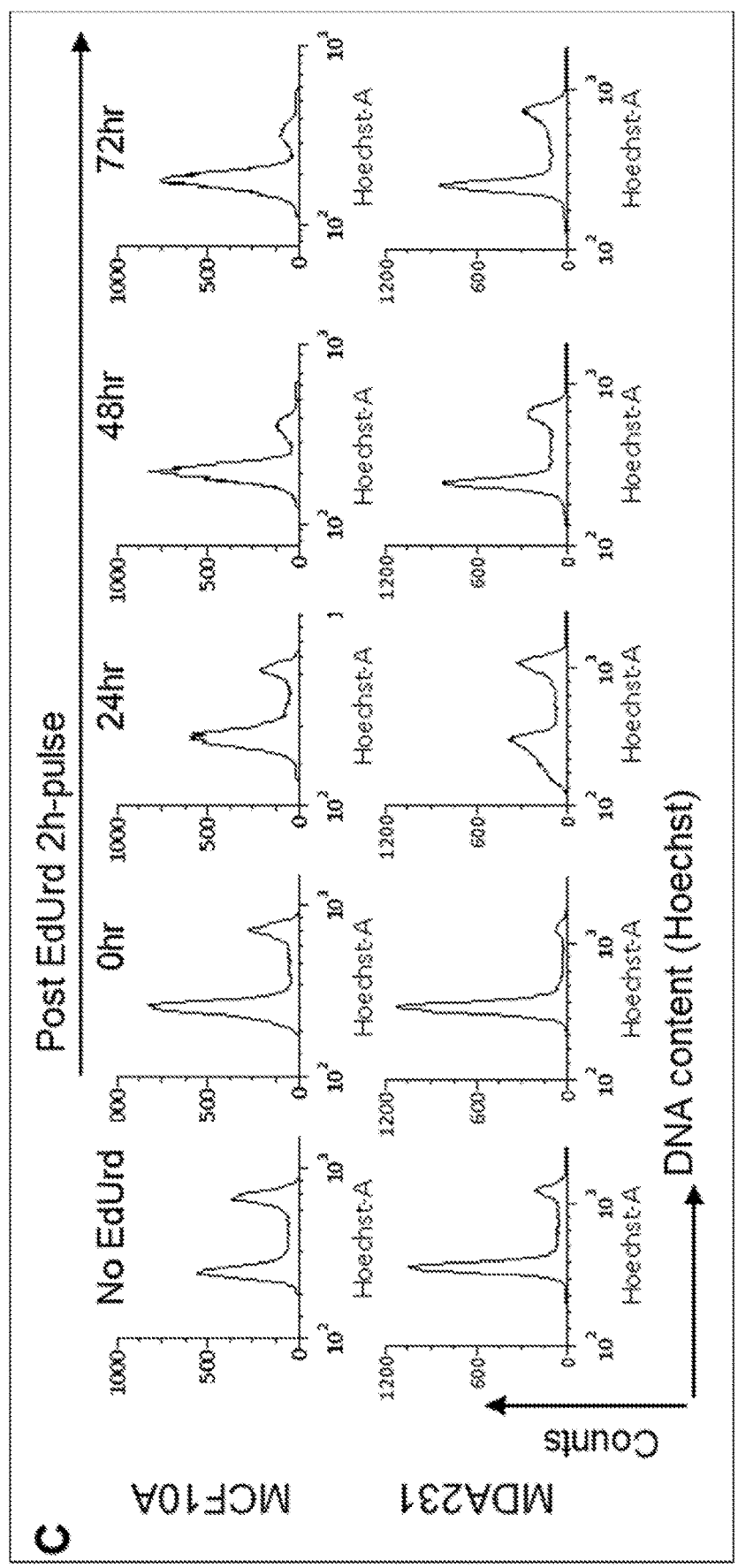
Figure 8:
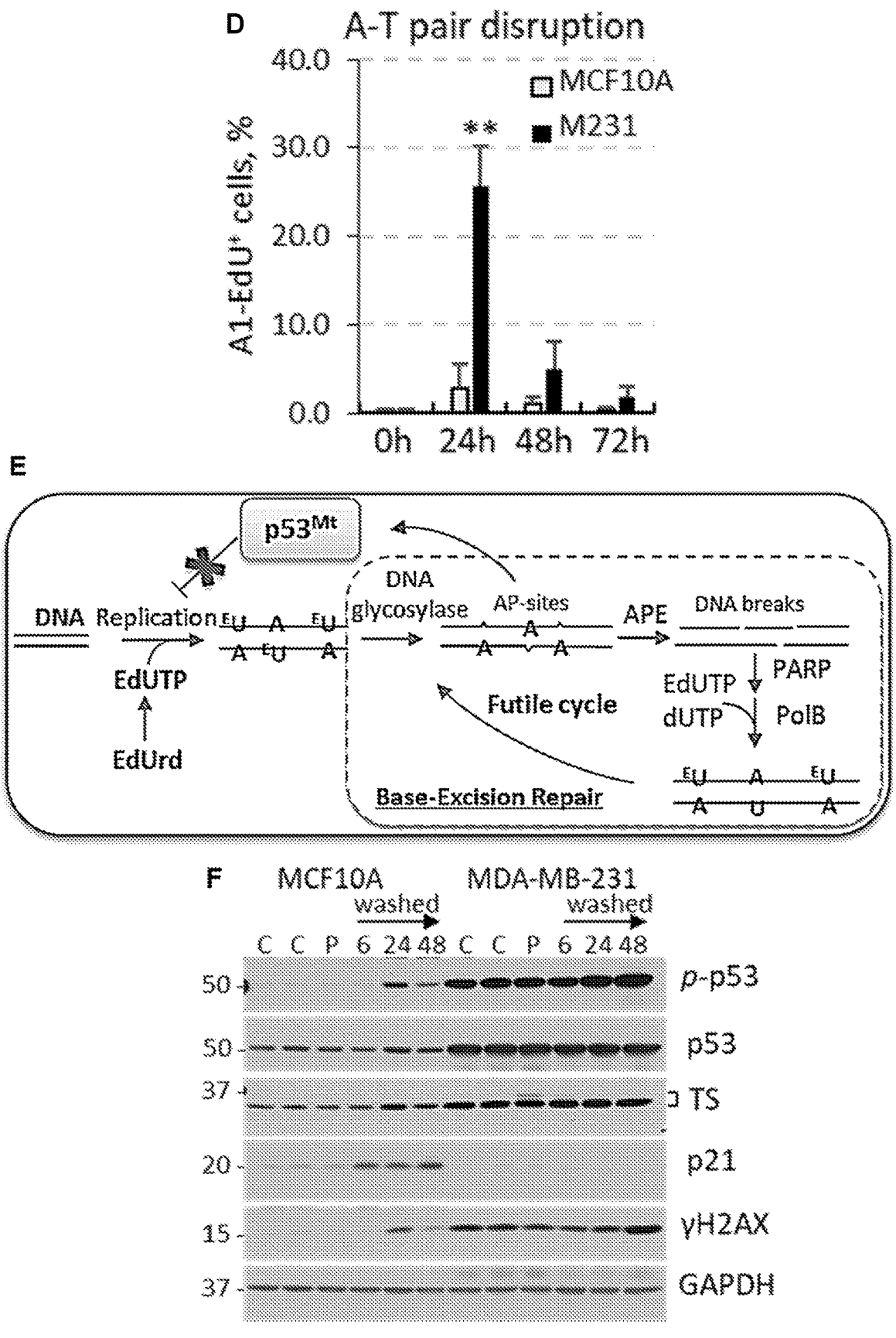
Figure 15:
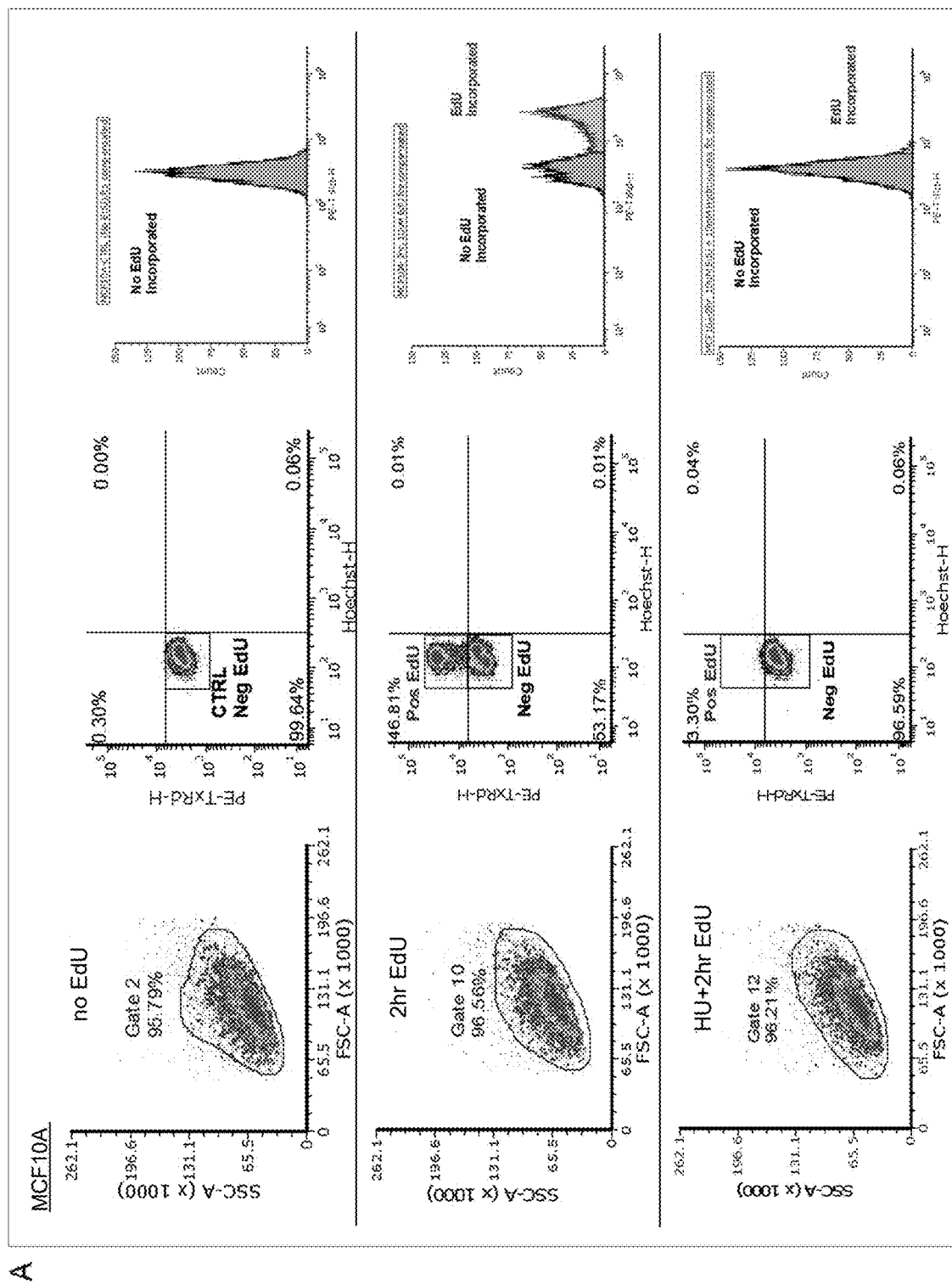
FIG. 15. Assessment of ethynyl-deoxyuracil (EdU) incorporation in cell lines. (A) Flow Cytometry of p53wt MCF10A and p53mt MDA-MB-231 cells which were pulse-labeled with 10 µM 5-ethynyl-2'-deoxy-uridine (EdUrd) for 2 hrs–/+hydroxyurea (HU). (B) Fluorescence microscopy images: cells were pulse-labeled with 10 µM EdUrd for 2 hrs followed by wash and incubation for indicated time. Cells were fixed and stained for EdU using click-it chemistry. Images were taken with 60× lens, bar=20 µm. (C) Quantification of EdU-positive cells from (B) relative to a total cell number.
Figure 15:
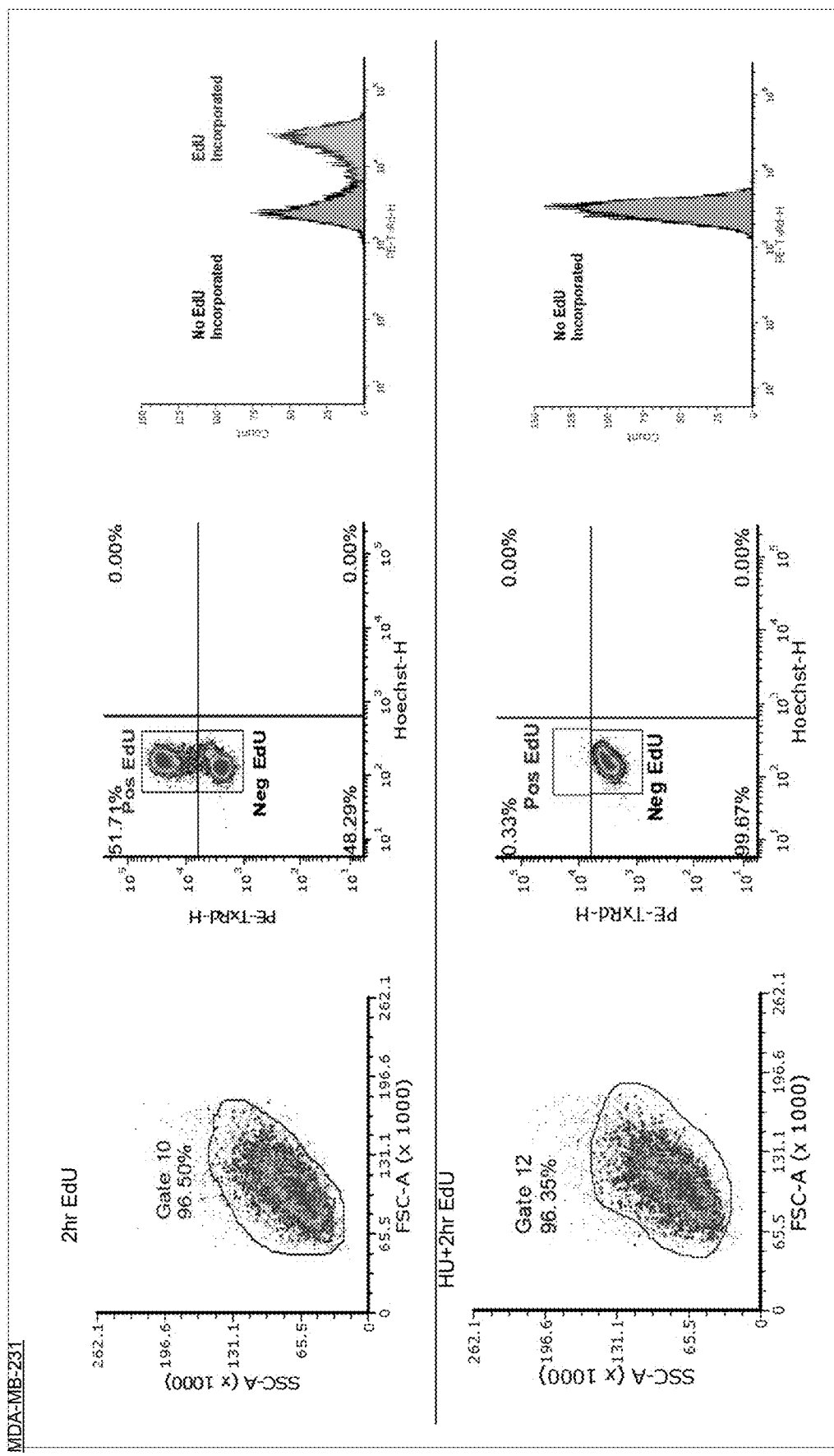
Figure 15:
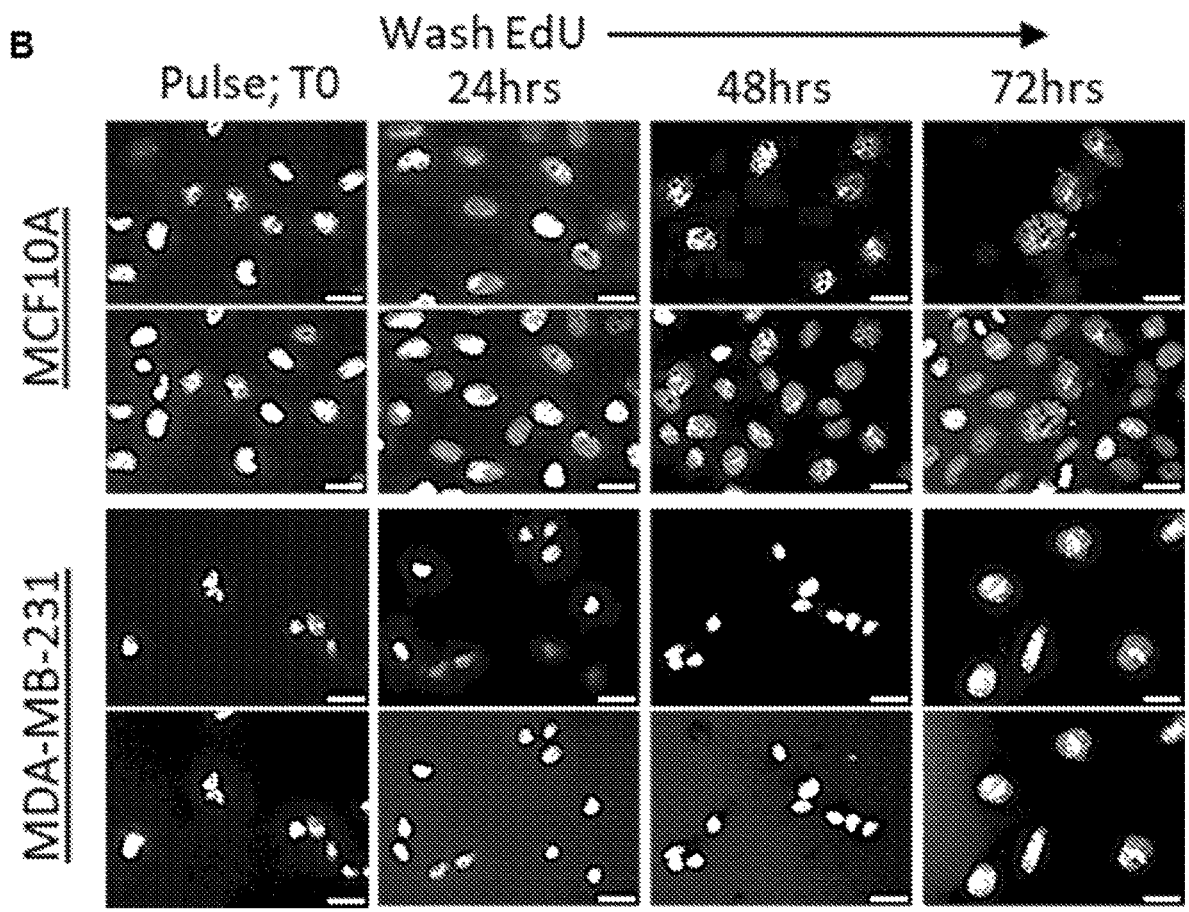
Figure 15:
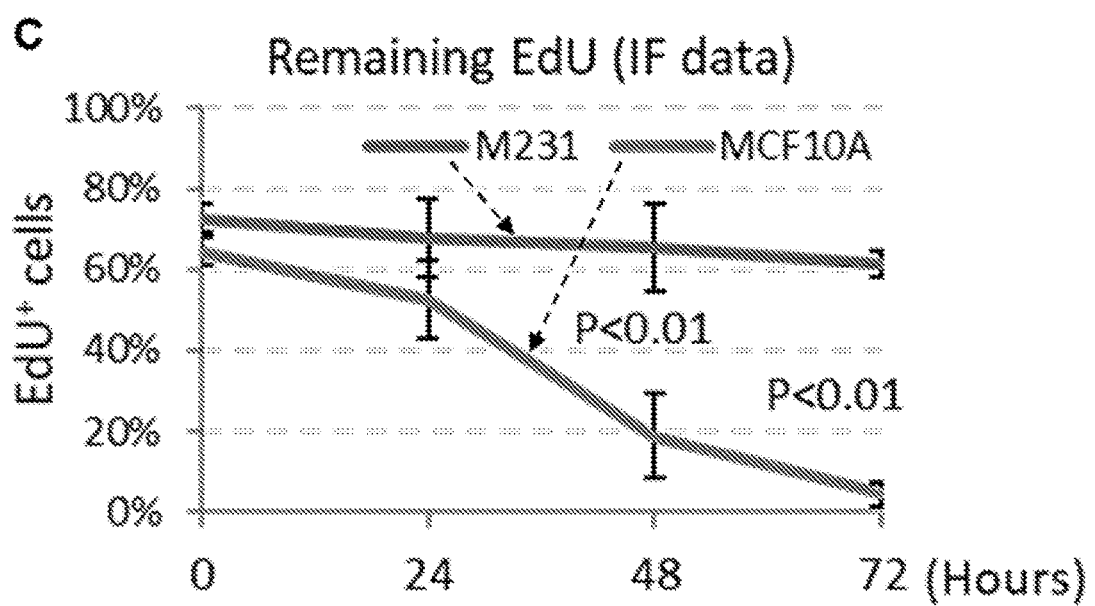

BER-mediated repair was assessed by measuring genomic 5-ethynyl-2'-deoxyuracil (EdU) at various washout timepoints following a pulse of 5-ethynyl-2'-deoxyuridine (EdUrd) (FIG. 8). Genomic EdU was labeled with fluorophore using click-it chemistry and then scored by flow cytometry or microscopy. Both p53wt and p53mt cell lines incorporated comparable levels of EdU and incubation with hydroxyurea, a ribonucleotide reductase inhibitor, blocked EdU incorporation into DNA (FIG. 15A). Flow cytometry revealed that the fraction of EdU+ cells was reduced at 24 hrs in MCF10A cells, whereas MDA-MB-231 cells retained the EdU+ fraction for a prolong time (FIG. 8A-B). This finding was also confirmed by fluorescence microscopy (FIG. 15C-D). Thus, both methods indicated that non-tumor p53wt cells efficiently removed uracil analogue from DNA, while this activity was diminished in p53mt cancer cells.

We noted that the EdU+ fraction in p53mt cell line was increased by ~25% ($P<0.05$) at 24 hrs after EdUrd-pulse (FIG. 8A-B), while DNA replication was not paused as it was observed in p53wt MCF10A cells, based on the cell cycle data (FIG. 8C). The increase in genomic EdU in p53mt cells might be caused by cycles of futile BER-mediated repair, a well-known phenomenon for fluorinated uridine analogues. Monophosphate metabolites of both EdUrd and fluorinated analogues (EdUMP and FdUMP) inhibit thymidylate synthase, thereby stimulating incorporation of uridine analogues into DNA and, subsequently, activating BER repair. Multiple cycles of BER repair lead to accumulation of apyrimidinic sites (FIG. 8E), disruption of A-T pairs, and DNA breaks. This notion was validated using Hoechst dye that selectively binds to A-T rich regions. Flow cytometry revealed expansion of the EdU+ fraction with low Hoechst fluorescence in p53mt MDA-MB-231 cells at 24 hrs (FIG. 8A, D), indicating a reduction in Hoechst binding to DNA in agreement with disruption of A-T pairs.

DNA damage was validated by examining phosphorylation of H2AX at Ser139 ($\gamma$H2AX) that marks DNA double-strand breaks (DSBs). In p53wt MCF10A cells, EdUrd-pulse caused a transient increase of $\gamma$H2AX levels, whereas p53mt MDA-MB-231 cells accumulated DNA damage at 48 hrs (FIG. 8F). In p53wt cells, EdUrd-pulse activated p53 (phospho-Ser15) and increased levels of cell-cycle inhibitor p21, a transcriptional target of p53, while p21 was not induced in p53mt cells. Consistent with finding, EdUrd-pulse interrupted replication in p53wt MCF10A cells, while p53mt MDA-MB-231 cells persisted in S phase (FIG. 8C). Notably, EdUrd-pulse caused a transient formation of the TS inhibitory complex in MDA-MB-231 cells, indicated by a shift in TS mobility, and this was declined at 6 hrs thereafter (FIG. 8F). The TS inhibition was temporally separated from the DNA damage signal (γH2AX) and p53 activation, suggesting that activation of p53 is mediated by DNA damage response (DDR).

Taken together, these data indicated that p53wt cells effectively remove genomic ethynyl-uracil through the BER mechanism. Concurrently, EdUrd-pulse induced the p53-p21 axis and G1 arrest in p53wt cells. In contrast, p53mt cancer cells did not stop DNA replication in response to EdUrd, and this resulted in accumulation of genomic uracil analogue and increased DNA damage, based on the flow cytometry and γH2AX data (FIG. 8A, F). The Hoechst flow cytometry data suggested that this response is associated with futile DNA repair and persistence of DNA replication due to inactive the p53-p21 axis.

Figure 9:
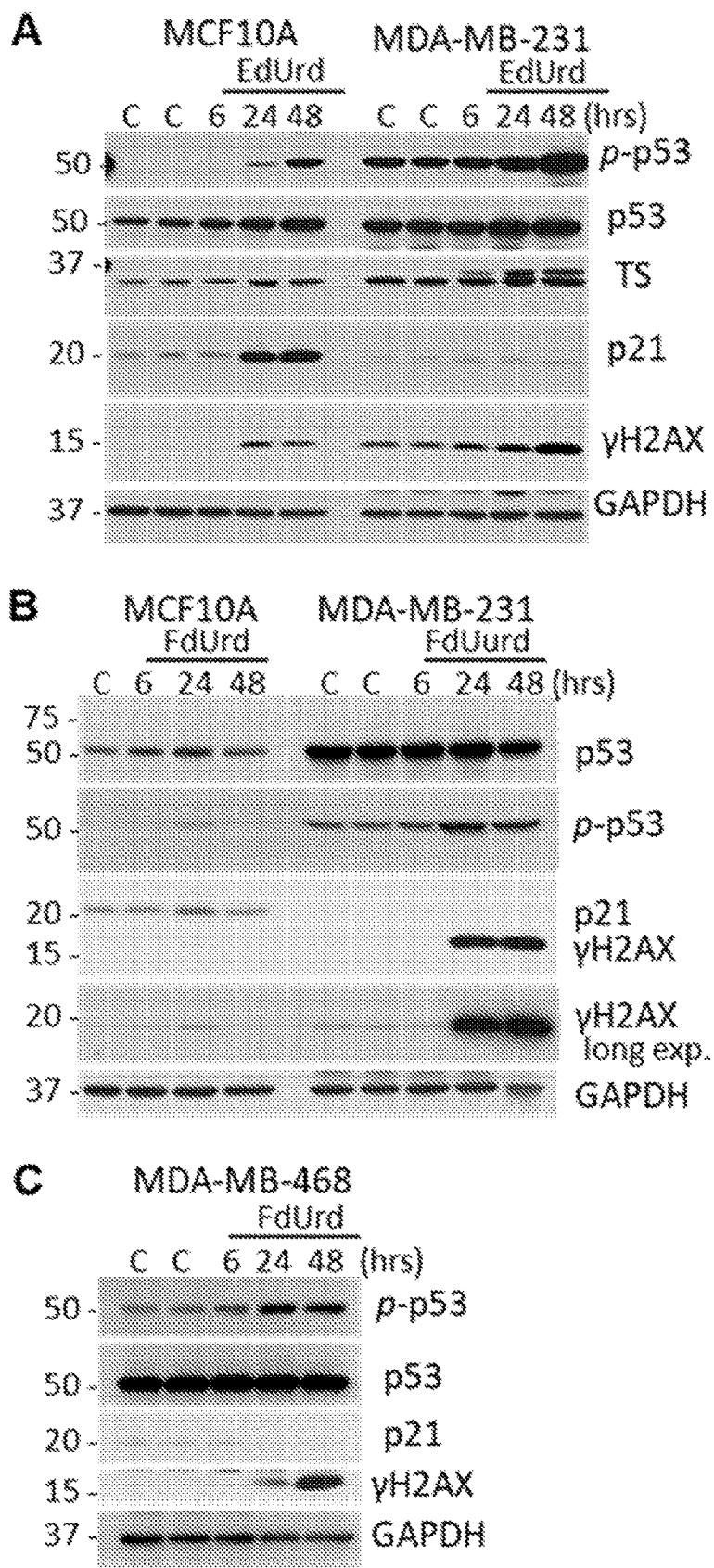
FIG. 9. Cyclin-dependent kinase (CDK) inhibitor p21 controls DNA damage in response to deoxyuridine analogues. (A-C) Immunoblot analysis of the response to ethynyl-deoxyuridine (EdUrd; 5 µM) (A) or to 5-fluoro-2'-deoxyuridine (FdUrd, 5 µM) (B-C) in MCF10A and breast cancer MDA-MB-231 and MDA-MB-468 (C) cell lines. (D-E) Induction of γH2AX foci by 5 µM FdUrd at 24 hours. Cells were stained for γH2AX (red) and DNA (Hoechst, blue) and images were taken at 600× magnification. The fractions of cells containing >10 foci were determined from three random fields with at least 20 cells per field. Comparison was made using the Log rank test (***, $P<0.001$). (F) Treatment with 5-fluoro-2'-deoxy-uridine (FdUrd, 2 µM; 24 hrs) induces DNA damage (γ-H2AX) in MCF10A cells carrying deletion of p21 (p21-ko) but not in control MCF10A cells. Nutlin-3A induced MDM2 in control and p21-ko cell lines while FdUrd (2 µM) induced DNA damage (γ-H2AX) in p21-ko MCF10A cell line but not in control MCF10A cells. (G) MCF10A p21-wt and p21-ko cell lines were pulse-labeled with 5-ethynyl-2'-deoxy-uridine (EdUrd) for 2 hrs followed by wash and incubation for indicated time. Cells were stained for EdU using click-it chemistry and DNA with Hoechst. EdU-positive cells were scored relative to total population in 4 fields per sample using microscopy. Comparison was made using the Log rank test (*, $P<0.05$).
Figure 9:
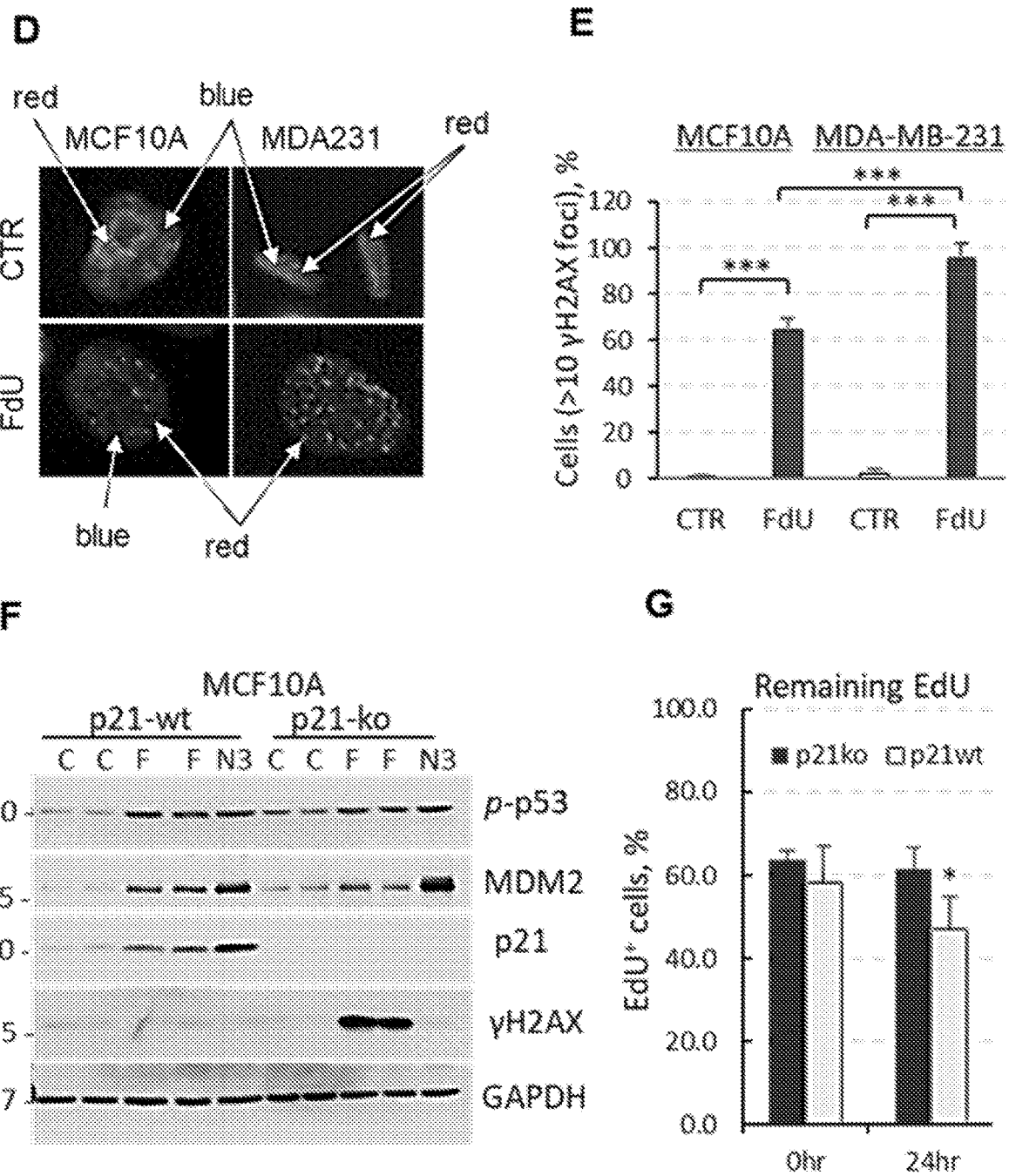

Next, we examined whether continuous treatment with EdUrd or clinical deoxyuridine analogues will induce DNA damage selectively in p53mt cells. EdUrd induced the p53-p21 axis and γH2AX level at 24 hrs in MCF10A cells, and the γH2AX level began to decline at 48 hrs (FIG. 9A), while p53mt cancer cells responded to EdUrd with continued accumulation of DNA damage signal (FIG. 9A). EdUrd treatment induced activation and stabilization of p53 irrespective of p53 status (FIG. 9A), while the TS-inhibitory complex was induced only in p53mt MDA-MB-231 cells (FIG. 9A). Treatment with floxuridine (FdUrd), a clinically relevant deoxyuridine analogue, induced a transitory DNA damage and activation of the p53-p21 axis in p53wt cells, while p53mt cancer cells accumulated DNA damage signal as it was observed for EdUrd (FIG. 9B). Likewise, breast cancer MDA-MB-468 cell line carrying mutant p53-R273H also accumulated DNA damage in response to FdUrd (FIG. 9C). Formation of DNA breaks in response to FdUrd was confirmed by microscopy, based on FdUrd-induced γH2AX foci formation, marking DSBs, in p53mt MDA-MB-231 cells while the response was attenuated in p53wt MCF10A cells (FIG. 9D).

Then we asked whether inactivation of the p53-p21 axis underlies accumulation of DNA damage observed in p53mt cells. p53 contributes to multiple aspects of DNA repair, including BER, while CDK inhibitor p21 mediates G1 and intra-S arrest in response to DNA damage by binding to the proliferating cell nuclear antigen (PCNA) and inhibiting DNA replication. In addition, p21 may regulate cell cycle and DNA repair pathways. To address the role of p21 in the observed responses, we utilized p21 knock out (ko) MCF10A cell lines. Treatment with FdUrd induced phosphorylation and total p53 levels in control and in p21ko cells, while, as expected, p21 was induced only in control cells (FIG. 9F). FdUrd induced accumulation of DNA damage in p21ko cells but not in control p21wt cells (FIG. 9F). We then validated the ability of p53 to regulate transcriptional targets such as MDM2 in p21ko cells. Treatment with Nutlin-3A, which disrupts p53-MDM2 interactions, activated p53 (phospho-Ser15) and increased MDM2 levels in both p21wt and p21ko cell lines (FIG. 9F), while Nutlin-3A did not induce DNA damage γH2AX marker (FIG. 9F). Further work showed that genomic EdU removal was significantly delayed in p21ko cells compared to p21wt cells (FIG. 9G). Thus, the data indicated that p21 loss in p53wt non-tumor cells recapitulated the DNA damage response to deoxyuridine analogues observed in p53mt cancer cells.

Inhibition of PARP activates p53-p21 signaling.

Next, we questioned whether interference in the DNA repair process could further enhance a selective accumulation of DNA damage induced by deoxyuridine analogues in p53mt cells. The BER mechanism removes modified nucleotides, including ethynyl- and fluoro-deoxyuridine analogues, in cellular and mitochondrial DNA. DNA glycosylases (e.g. UNG) recognize and excise damaged bases, initiating a repair process (FIG. 10A). The generated a-pyrimidinic sites (AP-sites) are then cleaved by AP-endonuclease APE introducing single-strand DNA breaks that are subsequently bound by poly (ADP-ribose) polymerase (PARP), which initiates recruitment of enzymes restoring the original DNA sequence (FIG. 10A). Inhibition of PARP interrupts DNA repair and can lead to double-strand breaks and cell death.

Figure 16:
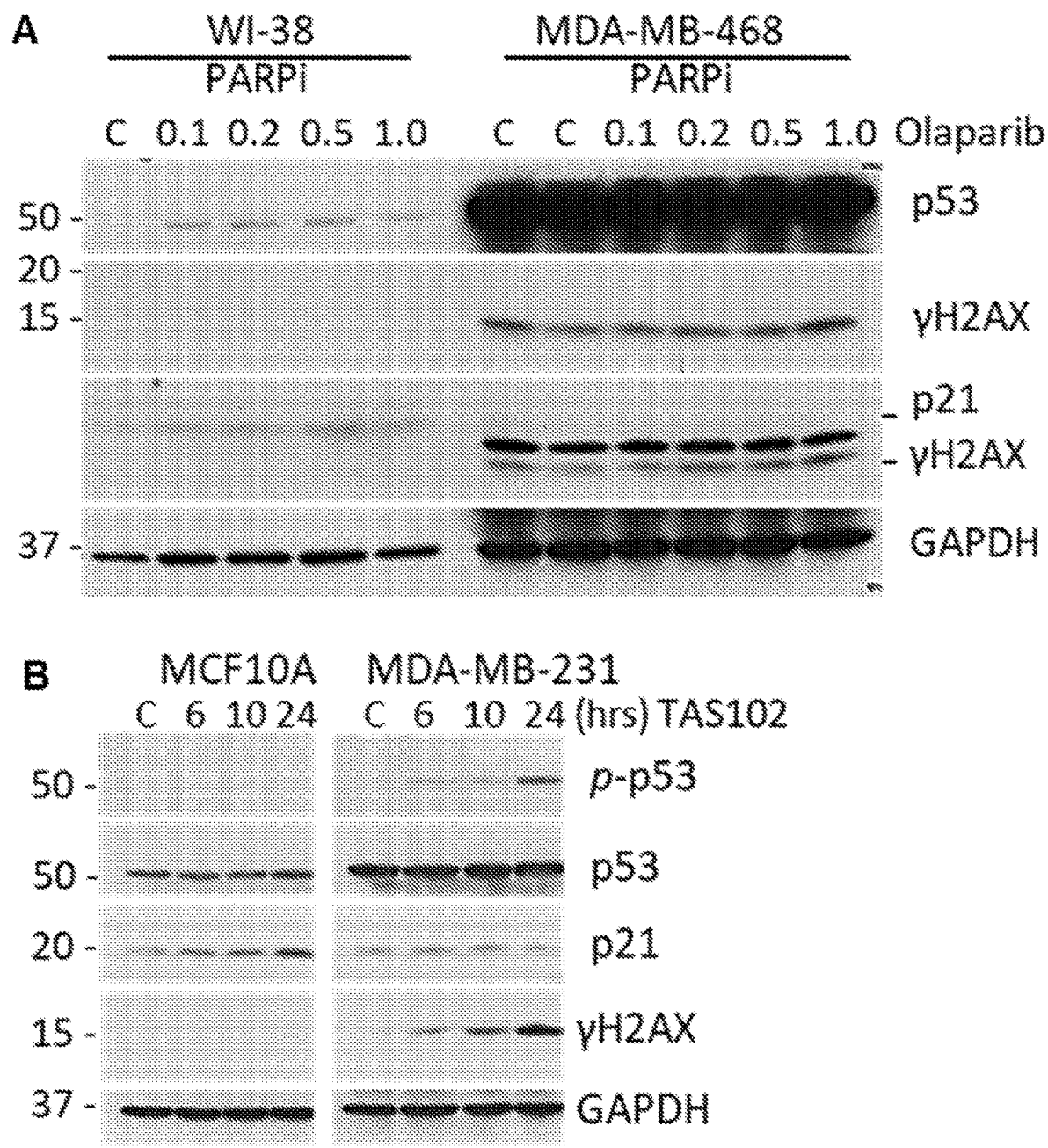
FIG. 16. Immunoblots of whole-cell extracts from p53wt MCF10A and WI-38 cell lines and breast cancer p53mt MDA-MB-231 and MDA-MB-468 cell lines. (A) Cells were treated with olaparib (100-1000 nM) for 24 hours. (B) Cells were treated with 2 µM TAS102 for indicated time.

First, we asked whether p53mt cells exhibit a differential response to PARP inhibitor (PARPi) compared to p53wt cells. Treatment with PARPi, olaparib, inhibited poly-ADP-ribosylation (PARylation) activity at 100-500 nM in both cell types (FIG. 10B). Notably, PARPi induced p53-p21 signaling in MCF10A cells, while p21 was not regulated in p53mt MDA-MB-231 cells (FIG. 10B). These findings were validated with a highly potent, but structurally different, PARPi talazoparib. Talazoparib inhibited PARylation activity at 50 nM and effectively induced phosphorylation of Ser15-p53 in both cell lines irrespective of p53 status, whereas p21 induction was observed only in p53wt cells (FIG. 10C). The induction of the p53-p21 axis by PARPi was confirmed in p53wt WI-38 cell line (FIG. 16A). Both PARP inhibitors did not increase DNA damage in p53wt and p53mt cells, based on the assessment of γH2AX levels (FIG. 16A). The cell-cycle data showed that PARPi increased G1 fraction in p53wt cell line (FIG. 10D), consistent with activation of the p53-p21 axis (FIG. 10B-C). In p53mt cancer cells, both PARPi (olaparib and talazoparib) increased G2 fraction at the expense of S phase, suggesting cell cycle arrest at G2 by PARPi in p53mt cancer cells (FIG. 10D). Thus, the data showed that PARPi activated the p53-p21 axis and increased G1 population in p53wt cells, while this response is compromised in p53mt cells, which instead are arrested in G2.

Inhibition of PARP enhances DNA damage in p53-deficient cancer cells.

Figure 11:
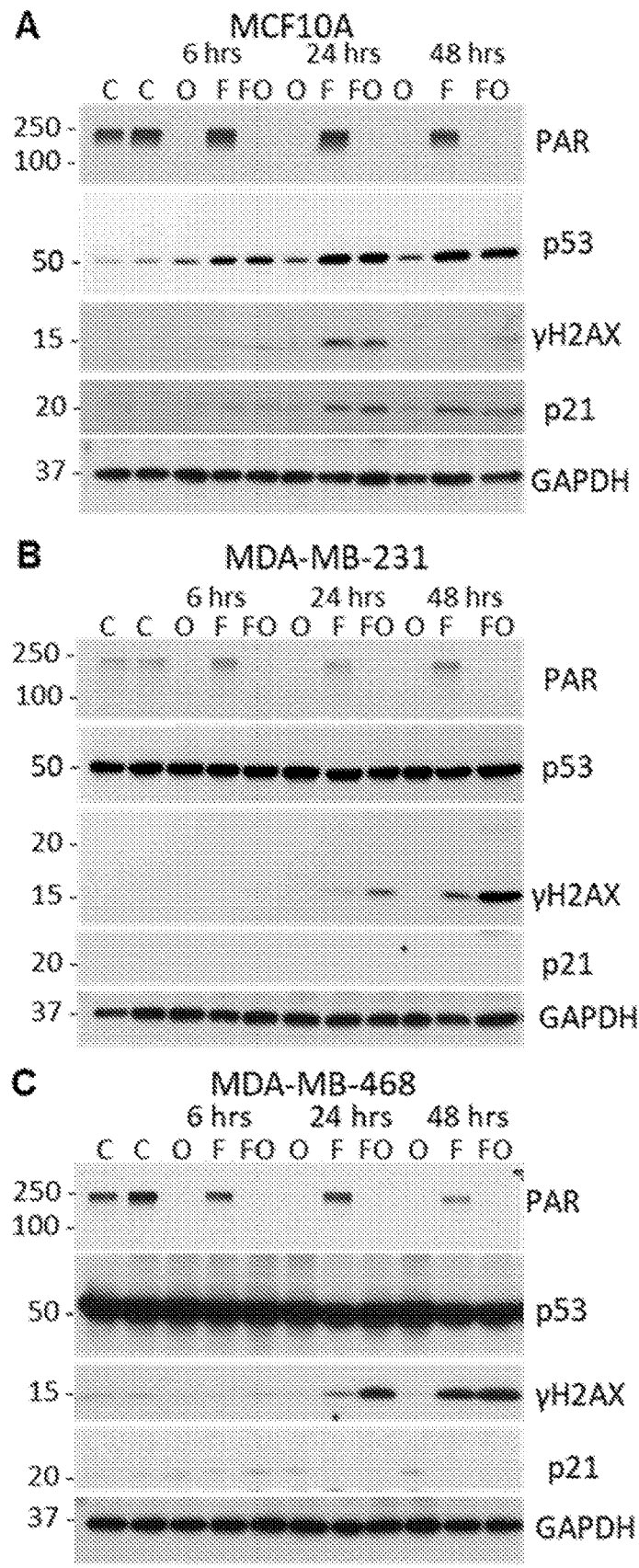
FIG. 11. PARP1 inhibitor enhances DNA damage induced by FdUrd in cells deficient for p53-p21 signaling. (A-E) Immunoblots of whole-cell extracts of p53wt (MCF10A; WI-38), p53mt (MDA-MB-231; MDA-MB-468), and p21-deleted MCF10A cell lines treated with 0.5 µM olaparib (Ola or O), 5 µM 5-fluoro-2'-deoxy-uridine (FdUrd, F), 100 nM talazoparib (T) or their combinations (FO or FT). (F-G) Detection of γH2AX foci by immunostaining of cells treated as described above for 24 hours.
Figure 11:
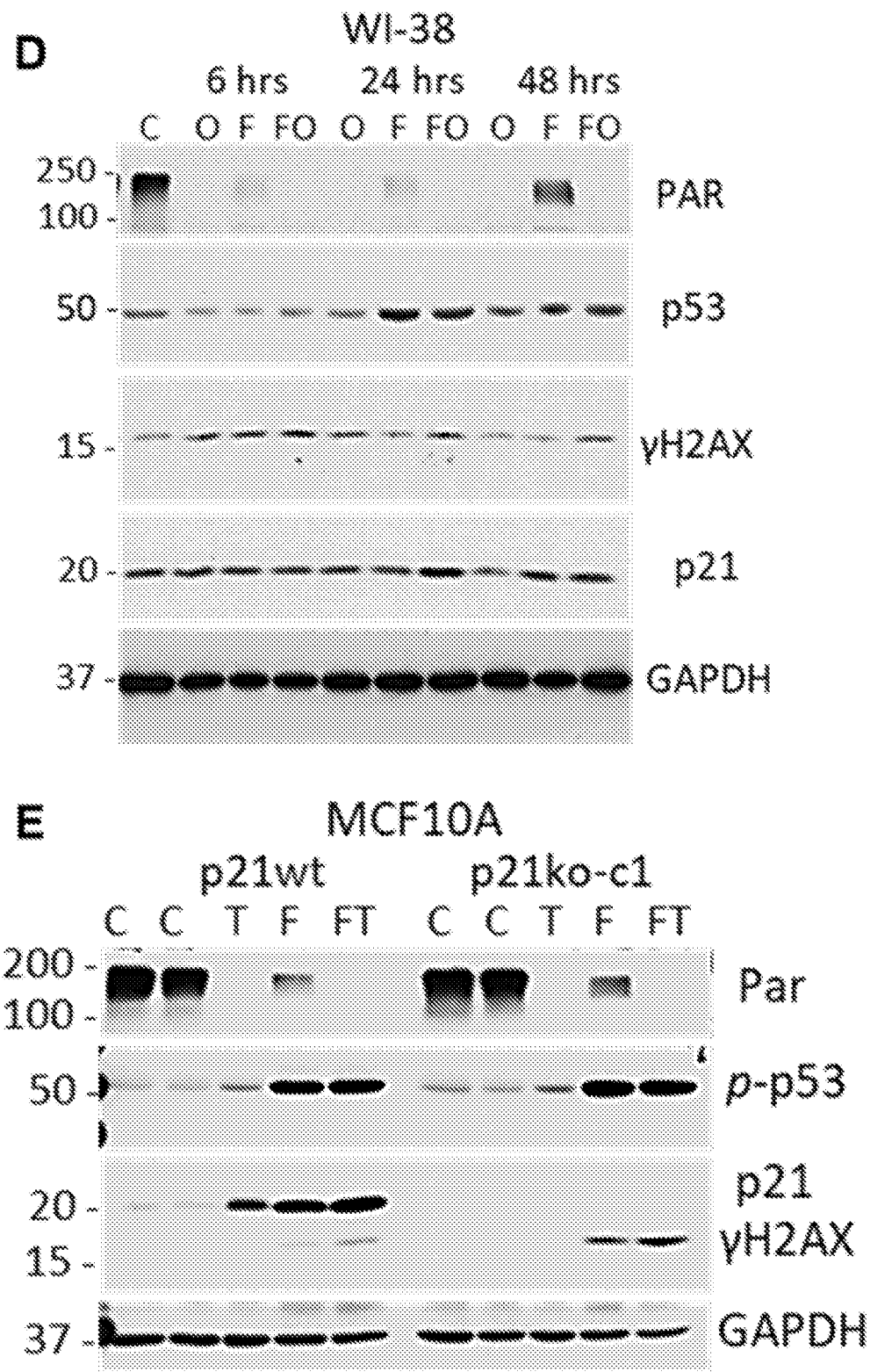
Figure 11:
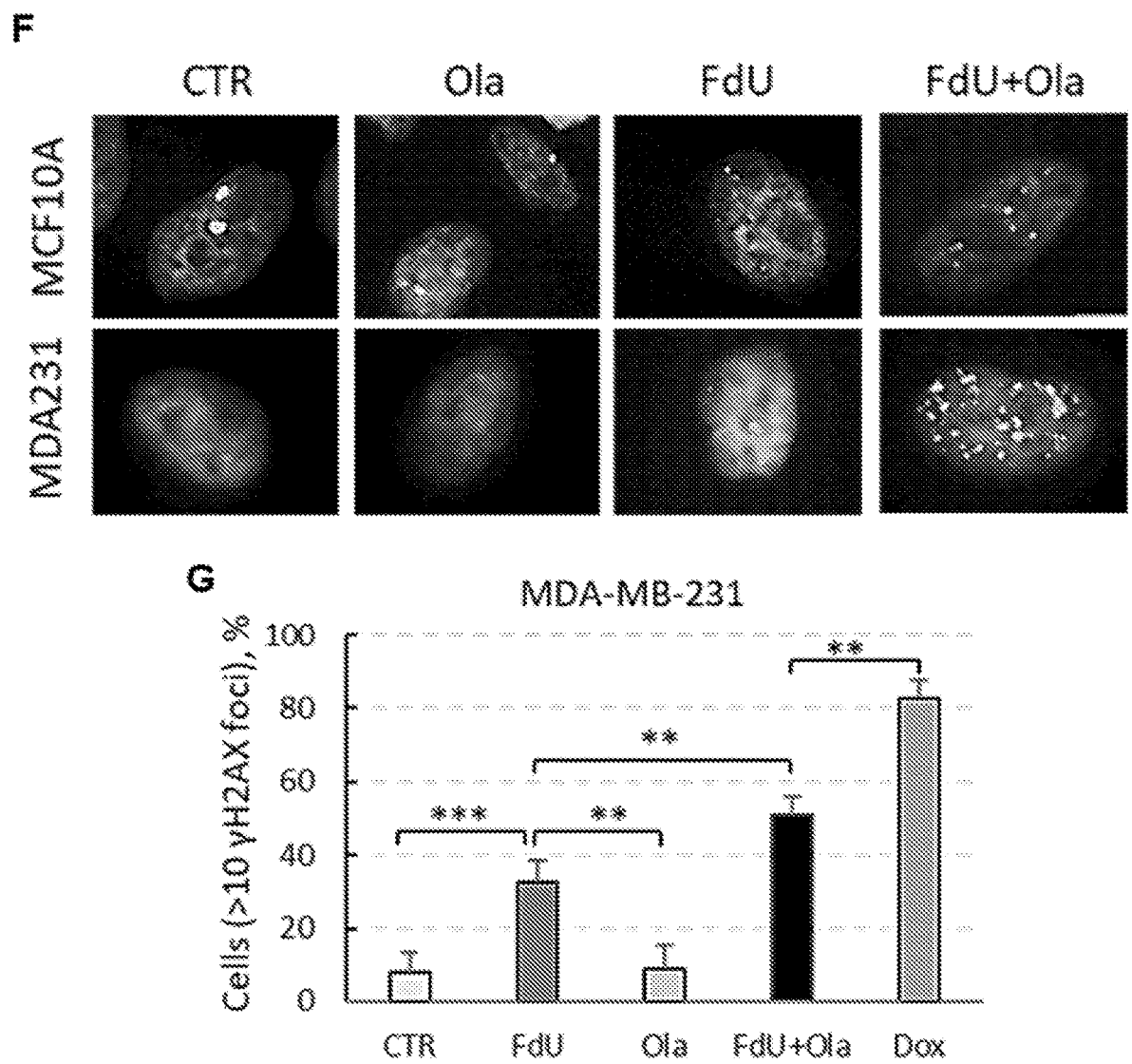

Then, we examined whether PARP inhibition enhances DNA damage induced by uridine analogues in p53mt cells, while induction of p53-p21 signaling in p53wt cells may attenuate this response. To test this idea, cells were treated with FdUrd alone or in combination with PARPi at the concentrations blocking the PARylation activity. In p53wt cell lines, PARPi alone increased p53-p21 signaling but did not induce appreciable levels of γH2AX (FIG. 11A, D), while FdUrd activated the p53-p21 axis and induced a transient increase in γH2AX levels, and these responses were attenuated by a PARPi-FdUrd combination at 48 hrs (FIG. 11A, D). In p53mt cell lines, MDA-MB-231 and MDA-MB-468, FdUrd induced γH2AX and this response was strongly enhanced by PARPi (FIG. 11B-C). As expected, neither of treatments increased p21 in p53mt cell lines (FIG. 11B-C).

Next, we examined the response to the drug combination in p21ko MCF10A cell line. Talazoparib, FdUrd, or their combination markedly induced p53-p21 signaling in control MCF10A cells, while having a limited effect on γH2AX levels (FIG. 11E). In p21-deleted MCF10A cells, the drug combination induced γH2AX levels, while each drug alone activated p53 at the level comparable to control MCF10A cells (FIG. 11E).

Microscopic assessment of γH2AX foci confirmed induction of DNA damage by the drug combination (FIG. 11F). FdUrd induced γH2AX foci in p53mt cells, while PARPi alone had a limited effect (FIG. 11F). The PARPi-FdUrd combination further increased γH2AX foci in p53mt but not in p53wt cells (FIG. 11F). Together, the data indicated that PARP inhibition cooperates with deoxyuridine analogues in induction of DNA damage in p53mt cells, while promoting p53-p21 signaling in non-tumor p53wt cells.

Synergistic toxicity of deoxyuridine analogues and PARP inhibitors in p53mt cancer cells.

Figure 10:
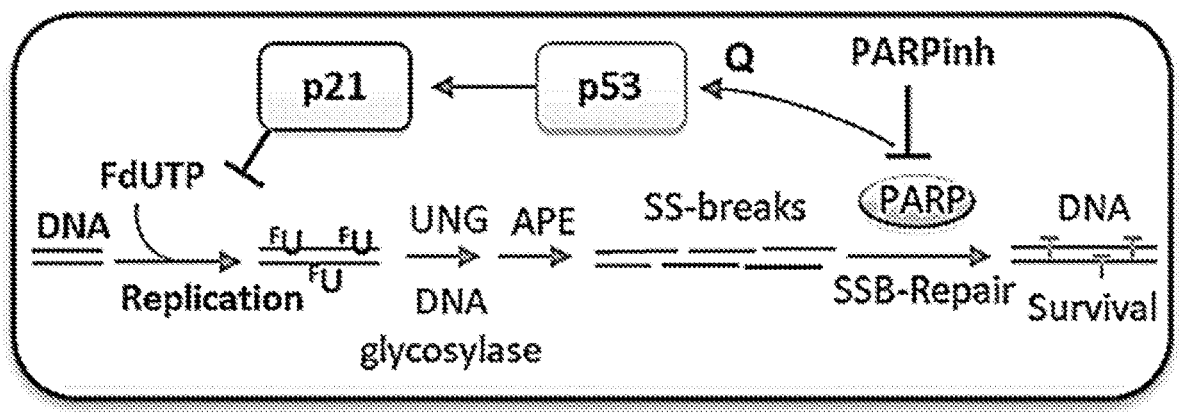
FIG. 10. PARP1-inhibitor induces the p53-p21 axis and cell cycle arrest in p53wt cells. (A) Schematic presentation of BER-mediated removal of the uracil analogue and the role of PARP1. PARP inhibition may activate p53. (B-C) Immunoblots of whole-cell extracts from MCF10A (p53wt) and MDA-MB-231 (p53mt) cell lines treated with PARP inhibitors olaparib (B) or talazoparib (C) for 24 hrs at indicated concentrations. (D) Cell cycle data for MCF10A and MDA-MB-231 cells treated with PARPi, talazoparib (10-100 nM), olaparib (100-1000 nM), or vehicle-control for 48 hrs.
Figure 10:
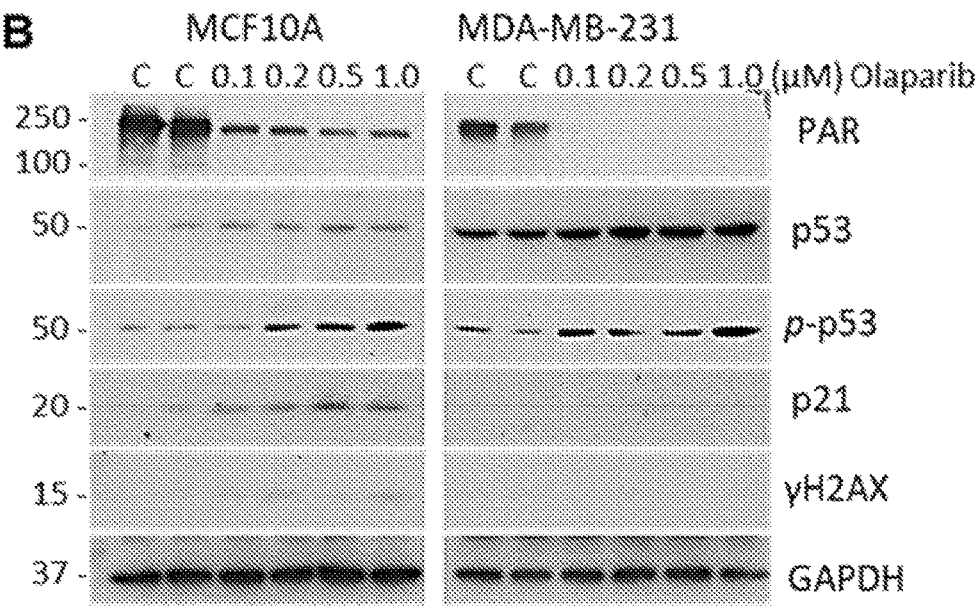
Figure 10:
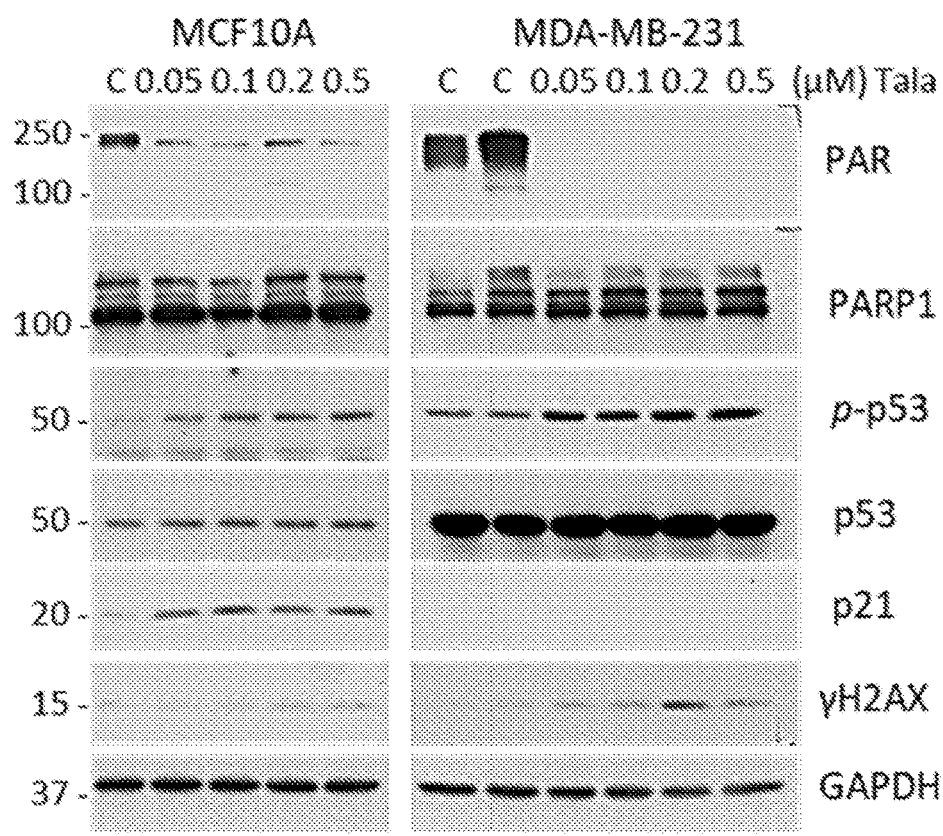
Figure 10:
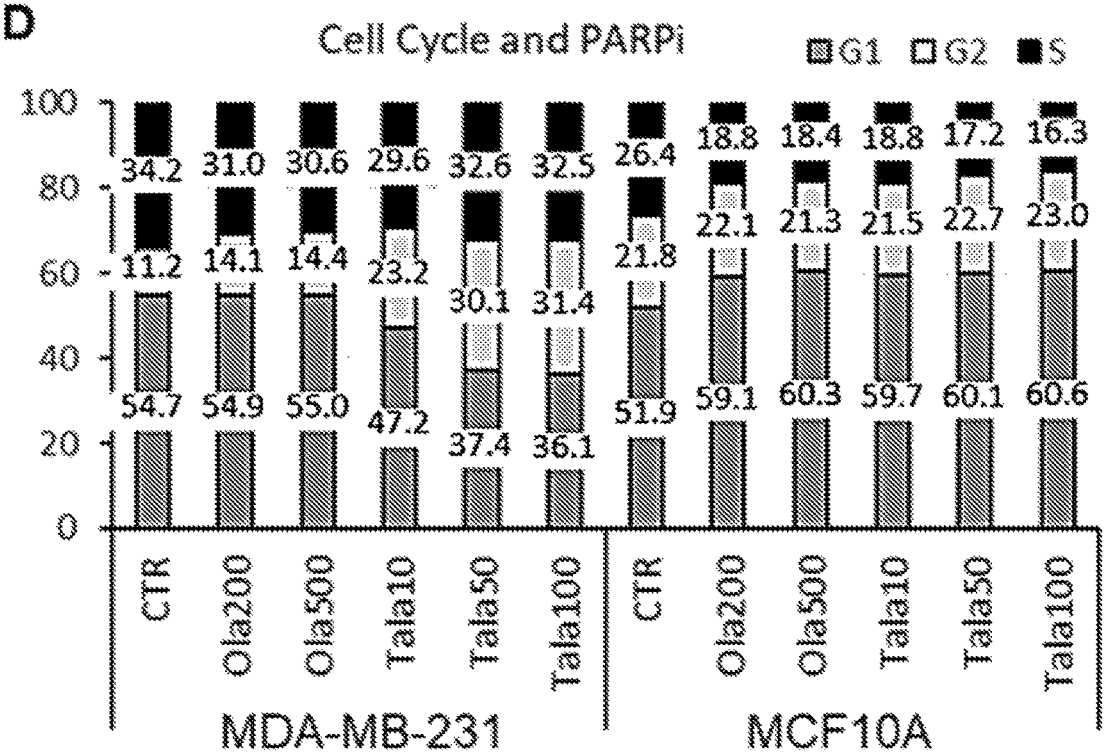

To determine the consequences of enhanced induction of DNA damage in p53mt cells by the FdUrd-PARPi combination, we examined whether PARPi and uridine analogues cooperate in the cytotoxicity responses. PARPi olaparib exhibited comparable IC50 values for MDA-MB-231 (17.63 μM) and MCF10A (14.45 μM) cell lines (FIG. 12A); both lines carry wild-type BRCA1/2 genes. These values significantly exceeded IC50 for BRCA1-deficient cell lines (<1 μM), and the inhibitory EC50 (1-10 nM) for PARylation activity in vitro and in cell culture (FIG. 10, 50-100 nM). Cytotoxicity assays in combination with uridine analogues were done at 100-500 nM PARPi concentrations that inhibit PARylation activity (FIG. 10B-C), but do not affect growth of p53mt cells (FIG. 10D).

Figure 12:
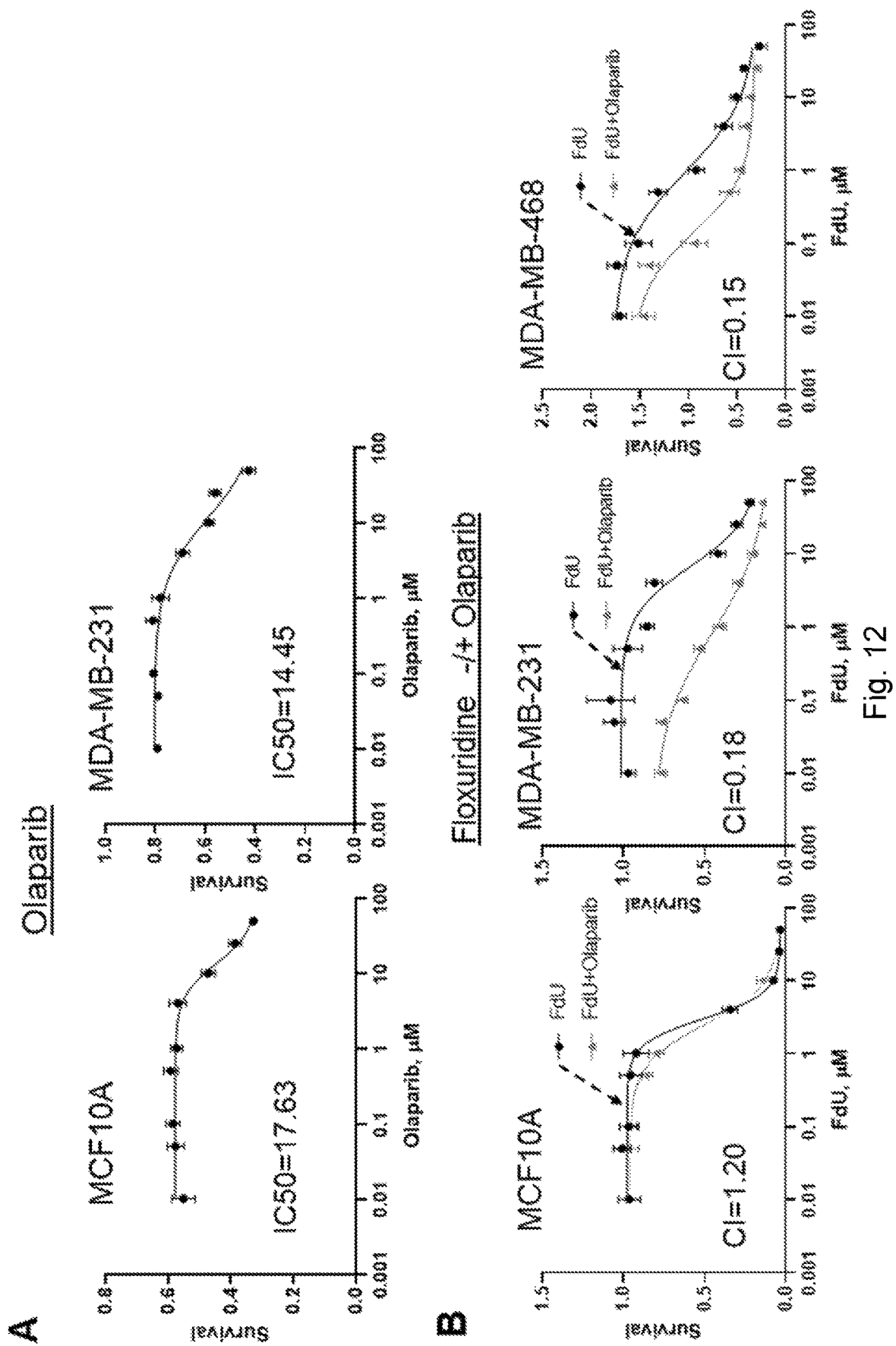
FIG. 12. PARP1-Inhibitor enhances cytotoxicity of deoxy-uridine analogues in p53-mutant tumor cells. (A) Cytotoxicity curves for PARP inhibitor (PARPi) olaparib. (B) Cytotoxicity curves for 5-fluoro-2'-deoxyuridine (floxuridine, FdUrd) alone and in presence of 0.5 µM olaparib. (C) PARPi olaparib (0.5 µM) does not enhance cytotoxicity of 5-fluoro-uracil (5FU) in p53mt cancer cells. (D) PARPi talazoparib (100 nM) enhances cytotoxicity of FdUrd in p53mt cancer cell lines (MDA-MB-231; MDA-MB-468). (E) Isobolograms for floxuridine (Y-axis) and talazoparib (X-axis) and mean combinatory index (CI-index). (F) Cytotoxicity of TAS102 (5-trifluoro-thymidine and tipiracil) is enhanced by PARPi talazoparib (100 nM) in p53-mutant cancer cell lines, CI<0.20. Assays were repeated at least two times in six replicates for cytotoxicity or in triplicates for caspase activity.
Figure 12:
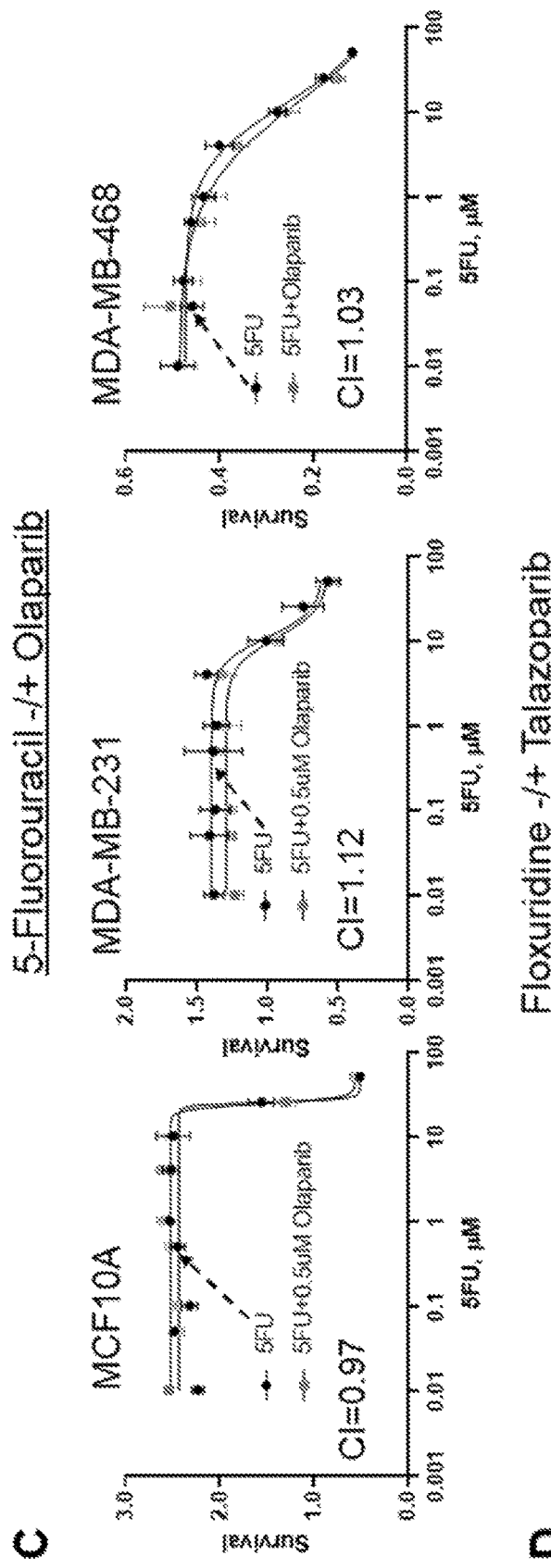
Figure 12:
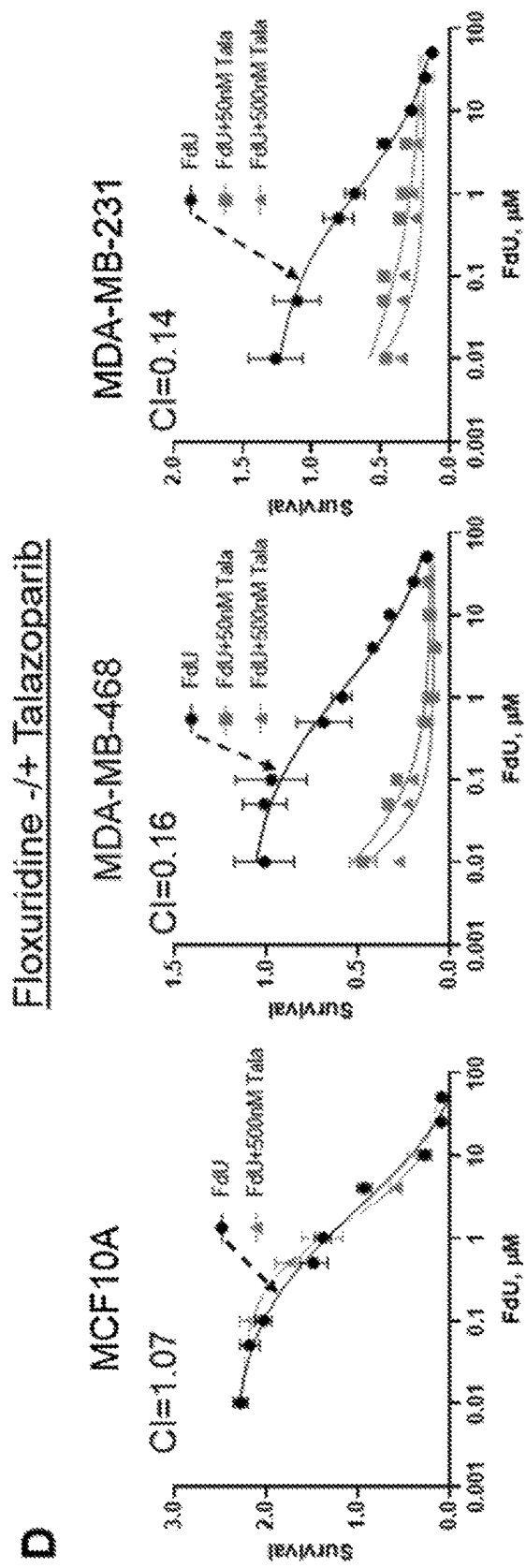
Figure 12:
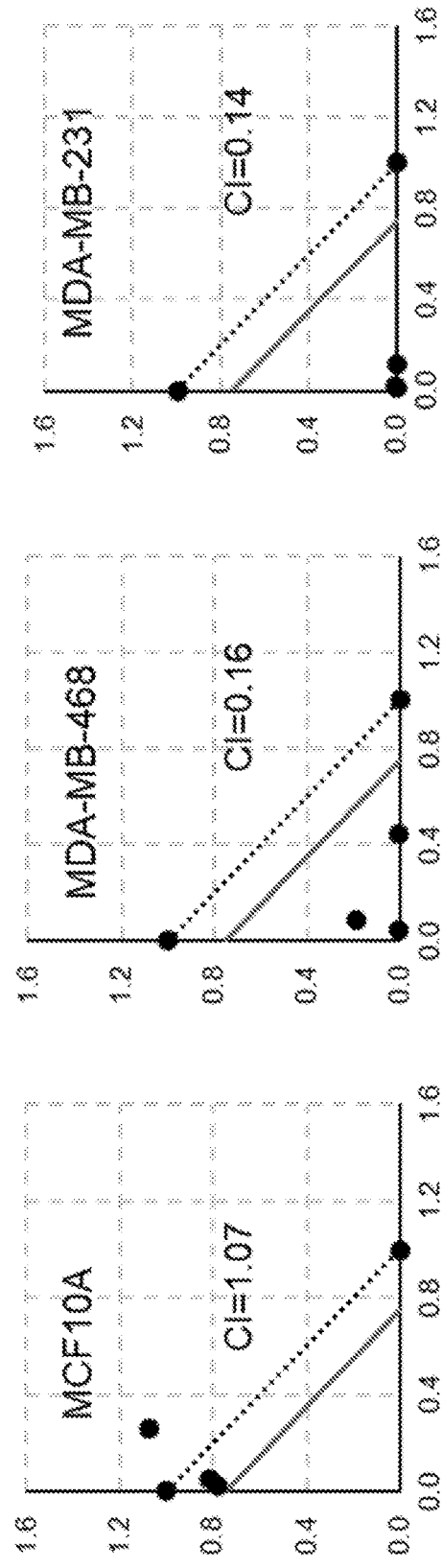
Figure 12:
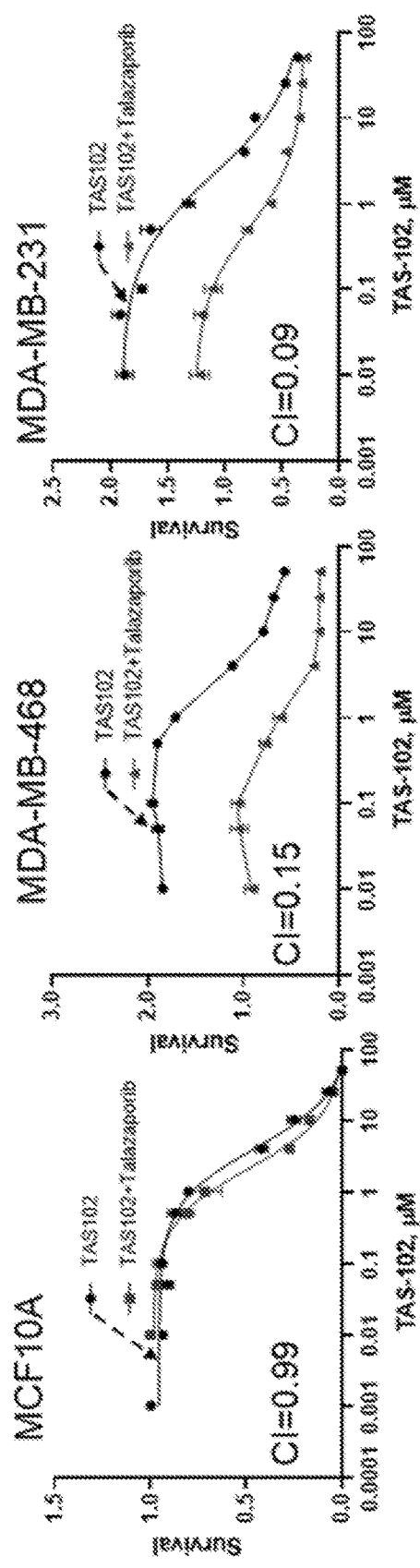

We found that p53wt MCF10A cells were more sensitive to FdUrd (floxuridine) alone compared to p53mt MDA-MB-231 cells, IC50=1.6 μM vs 5.5 μM, respectively. Importantly, PARPi olaparib sensitized p53mt cell lines to FdUrd by nearly 10-fold from 5.5 μM to 0.5 μM (FIG. 12B). The combination index (CI-index) was 0.18 for MDA-MB-231 and CI=0.15 for MDA-MB-468, indicating a synergistic interaction of FdUrd with PARPi. In contrast, the drugs did not cooperate in MCF10A cells (FIG. 6B, CI=1.20). Notably, 5-fluorouridine (5FU) did not cooperate with olaparib in any of the tested cell lines (FIG. 6C).

The synergism of FdUrd with PARPi was further validated using PARPi talazoparib. We found a strong cooperativity between FdUrd and talazoparib in p53mt cell lines (CI<0.2), while no cooperativity was observed in MCF10A cells (FIG. 12D, CI=1.07). Isobologram data indicated a strong cooperativity between FdUrd and PARPi in p53mt cells, based on the position of all experimental values below 0.75 cutoff line (FIG. 12E). Next, we examined whether PARPi cooperates with TAS102, a novel anticancer drug consisting of trifluoro-thymidine (TFT) and tipiracil. The assays showed a strong cooperative interaction between TAS102 and talazoparib in p53mt cell lines (CI<0.2), while cooperativity was not observed in p53wt MCF10A cell line (FIG. 12F; CI=0.99). Immunoblots showed that TAS102 induced γH2AX in MDA-MB-231 cells (FIG. 16B). Together, the data demonstrated that PARPi selectively sensitizes p53mt cancer cells to cytotoxic effects of deoxyuridine analogues, while reducing their toxicity in non-tumor p53wt cells.

Inhibition of PARP enhances anti-tumor activity of TAS102 in p53-deficient TNBC model.

Figure 17:
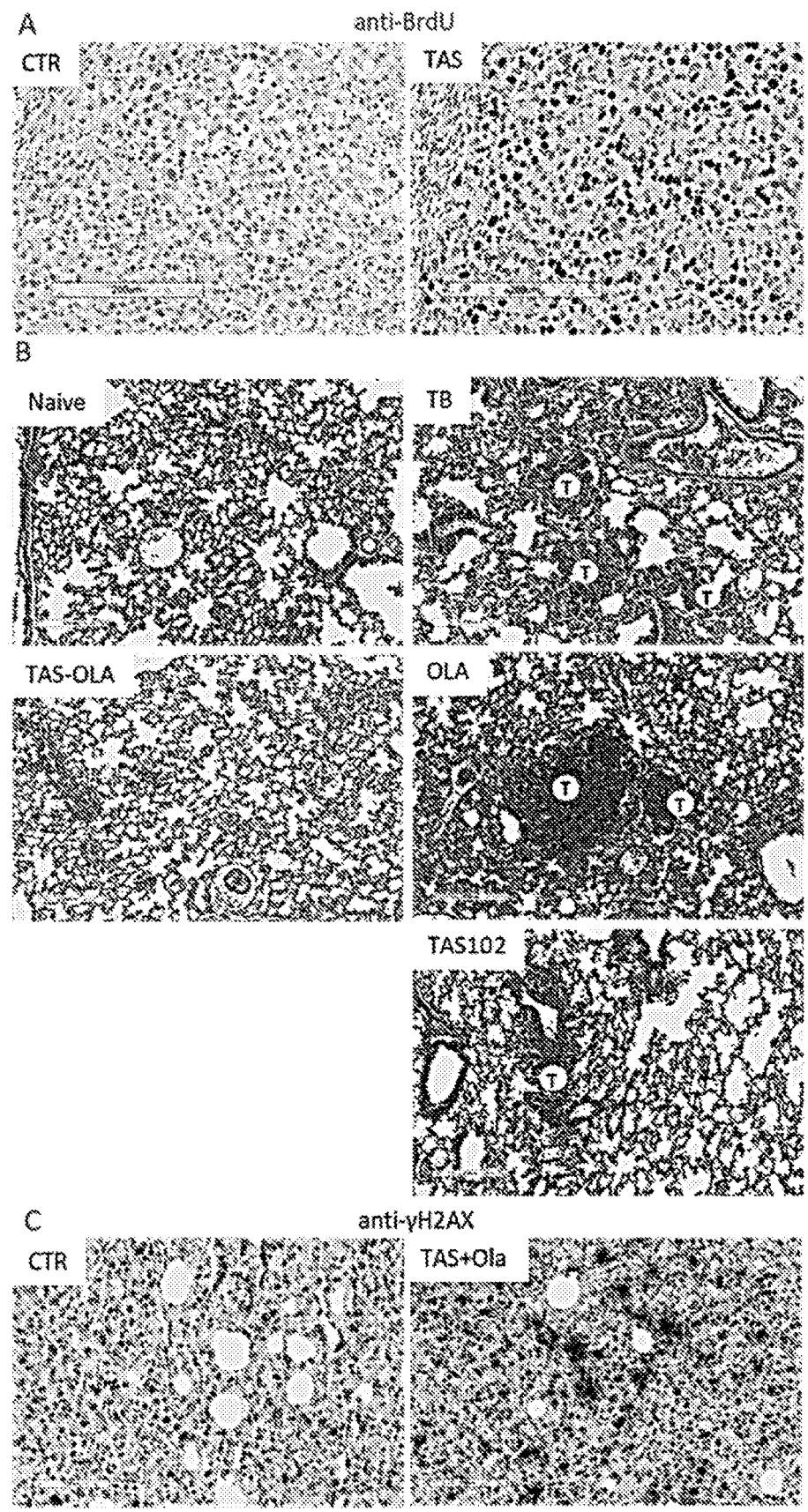
FIG. 17. Histology of TNBC tumor and mouse lungs from naïve and tumor-bearing mice. (A) Female SCID mice inoculated with breast cancer p53mt MDA-MB-231 tumors in a mammary fat pad were treated with TAS102, olaparib, or their combination. Incorporation of trifluorothymidine, TFT, (a component of TAS102) was detected using anti-BrdU antibodies in vehicle-control and TAS102-treated tumors. Images were taken at 100× magnification. (B) Lung sections stained by H&E from naïve, and tumor-bearing mice treated with olaparib, TAS102 or their combination. Images were taken at 100× magnification, bar 200 μm. (C) Primary tumor from vehicle-control and TAS102+Olaparib treated groups were stained for γH2AX, bar 100 μm.
Figure 18:
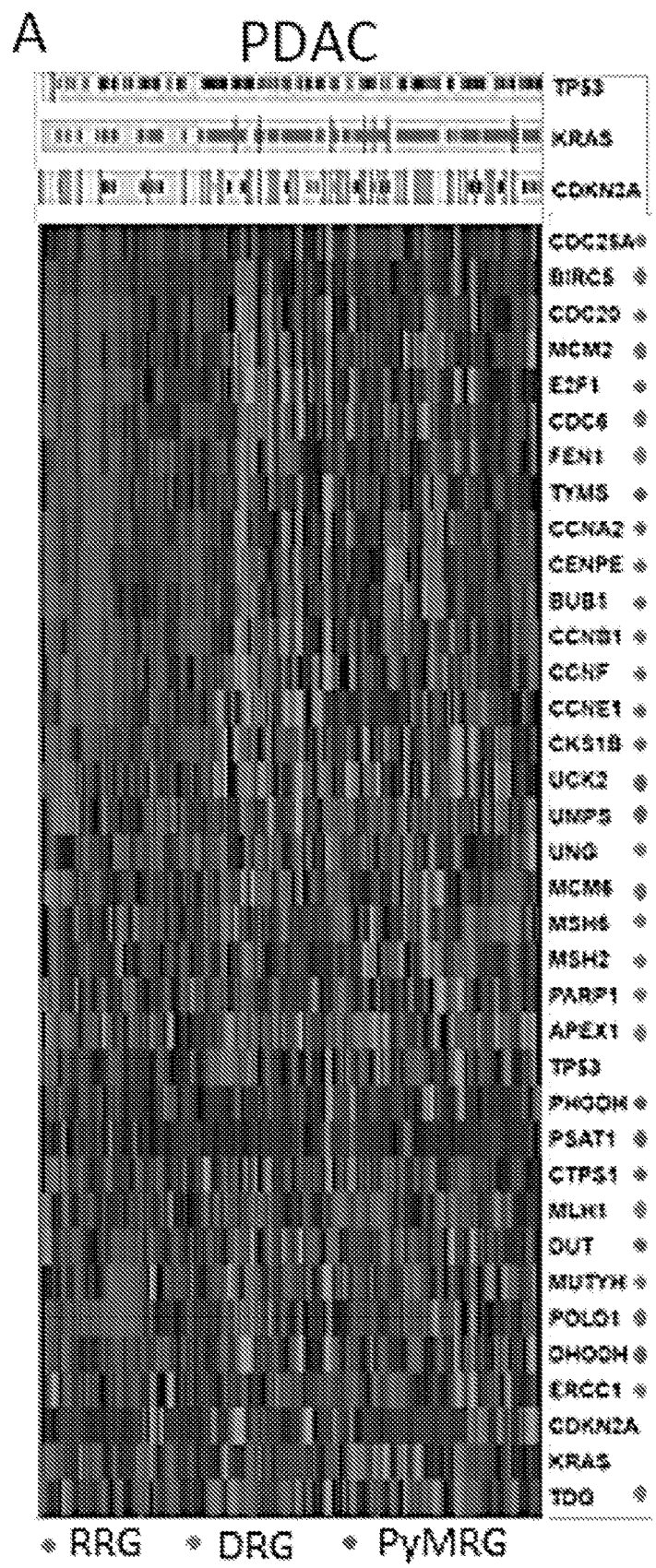
FIG. 18. DNA replication and DNA repair pathways in PDAC. (A-B) Clustering (unsupervised) of gene expression in PDAC (A), n=175, and breast cancer (B), n=482, using TCGA genomic data: replication-related genes (RRG), DNA repair genes (DRG), and Pyrimidine-metabolism related genes (PyMRG). (C) Co-expression data for selected genes in DNA repair and replication pathways were generated using PDAC TCGA data. (D) Kaplan-Meier survival curves for UNG in PDAC (n=177). Nagy et al., Scientific Reports, 2018; 8:9227).
Figure 18:
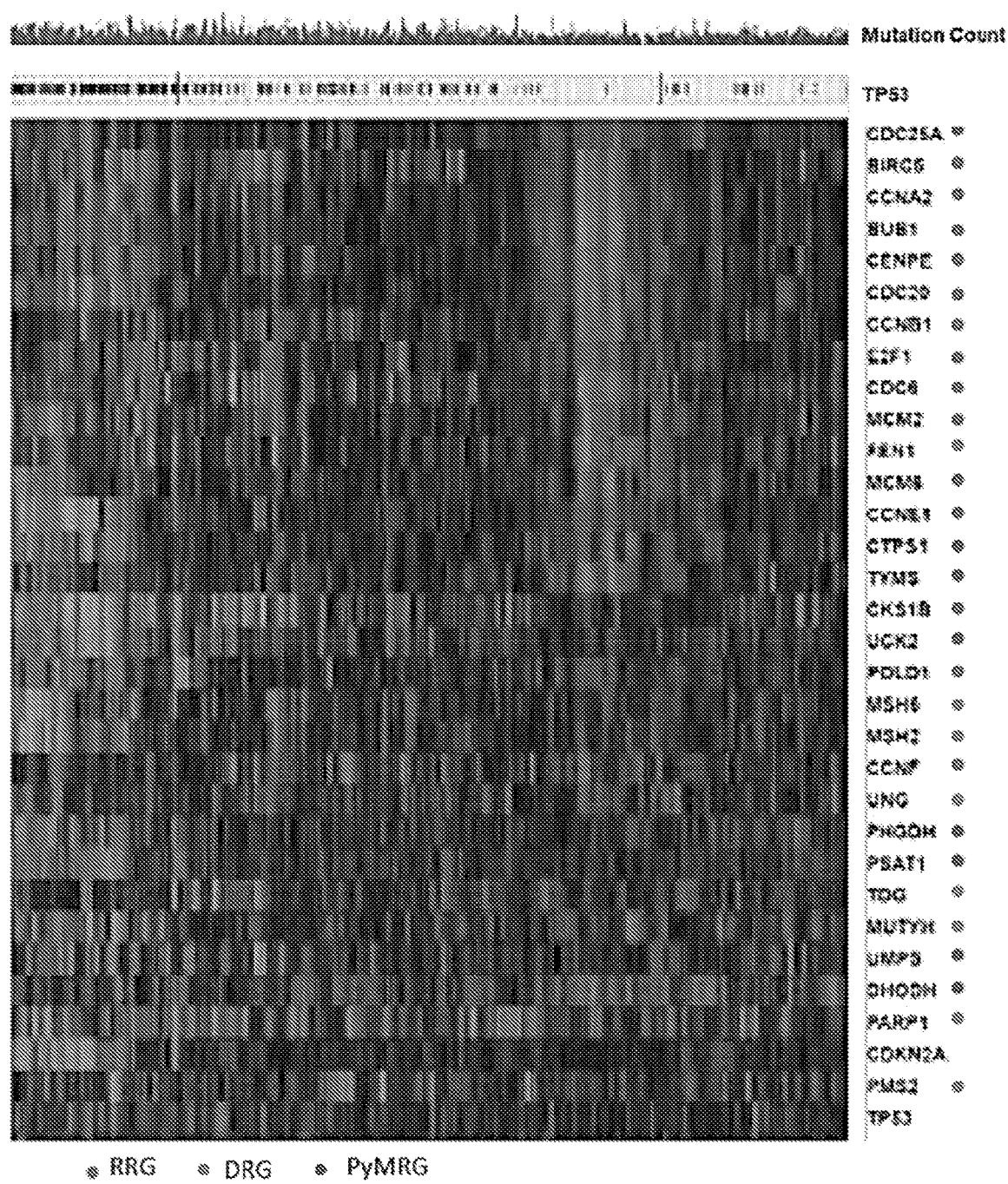
Figure 18:
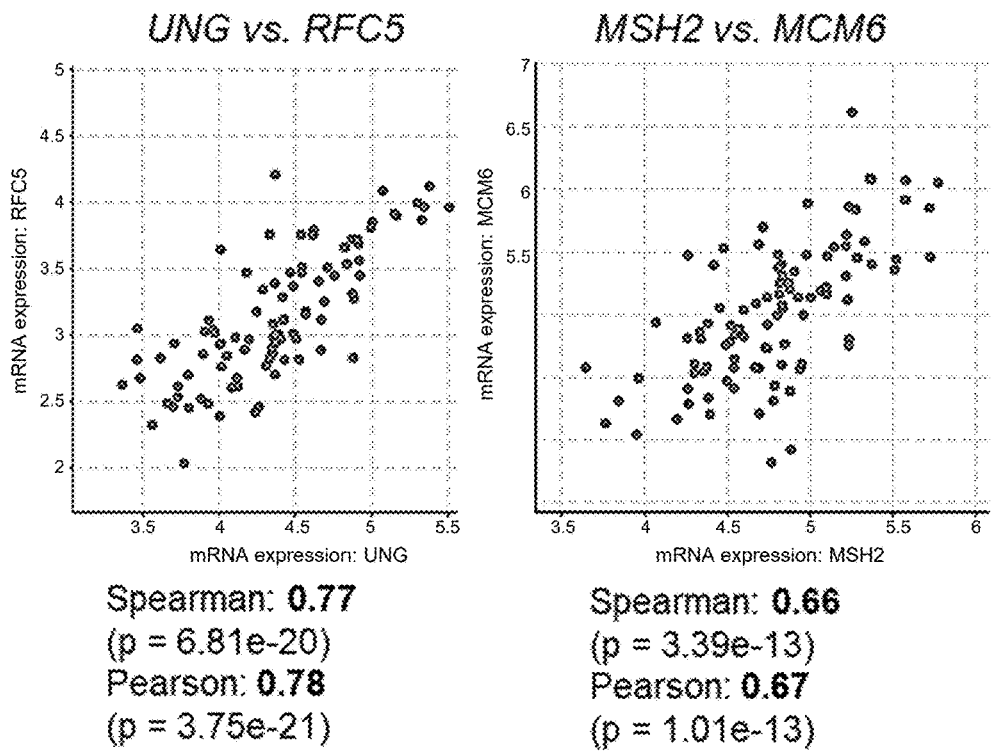
Figure 18:
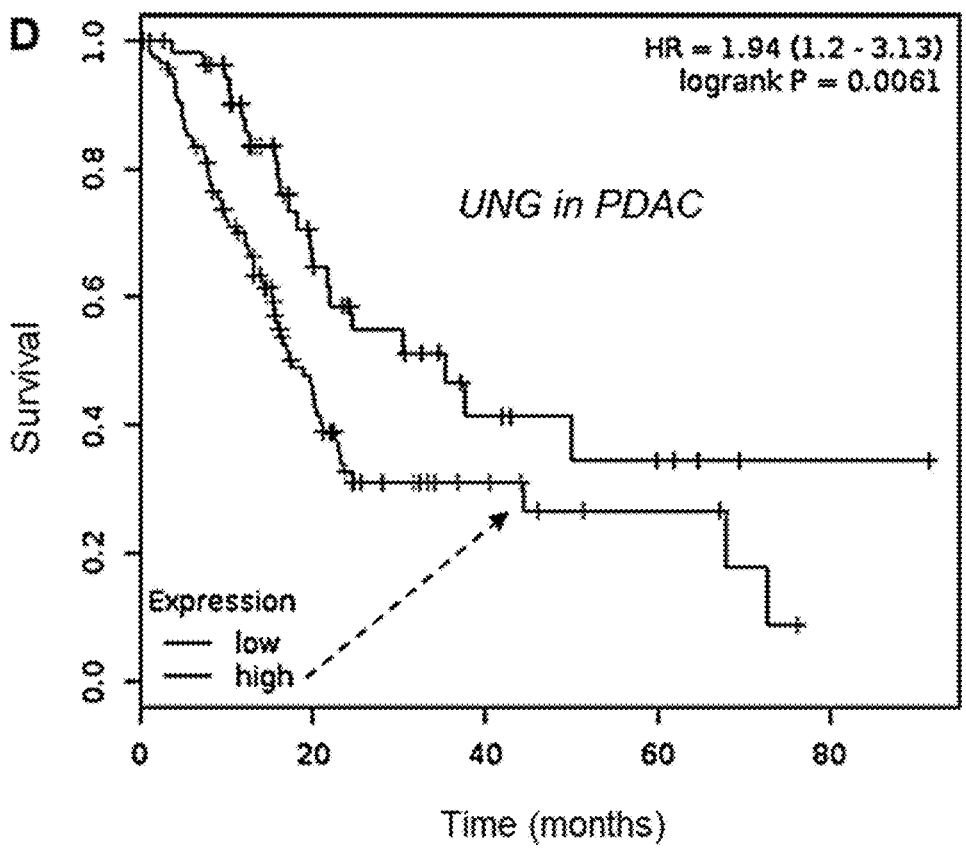
Figure 19:
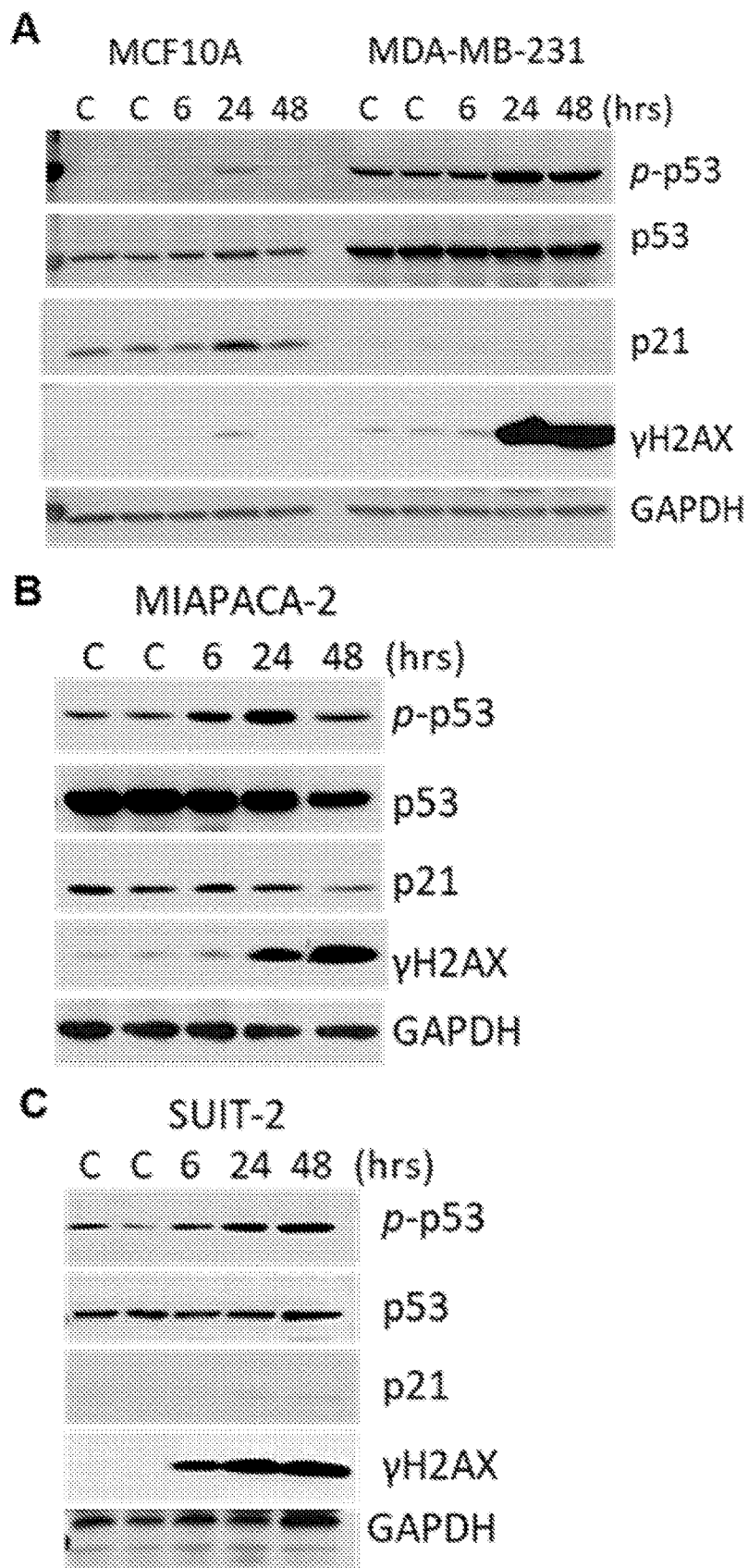
FIG. 19. Accumulation of DNA damage in response to deoxyurudine analogue in PDAC cells. (A) Non-tumor p53wt MCF10A cells and p53mt MDA-MB-231 breast cancer cells were treated with 5-fluoro-2'-deoxyuridine (FdUrd, 5 μM) for indicated time. Whole-cell lysates were probed with markers of p53 signaling and DNA damage marker. (B-C) Immunoblot analysis of pancreatic cancer cell lines with mutant p53, MIAPACA-2 p53-R248W and SUIT-2 p53-R273H. (D-E) PARP inhibitors induces the p53-p21 axis in p53wt MCF10A cells but not in p53 mutant cancer cell lines.
Figure 19:
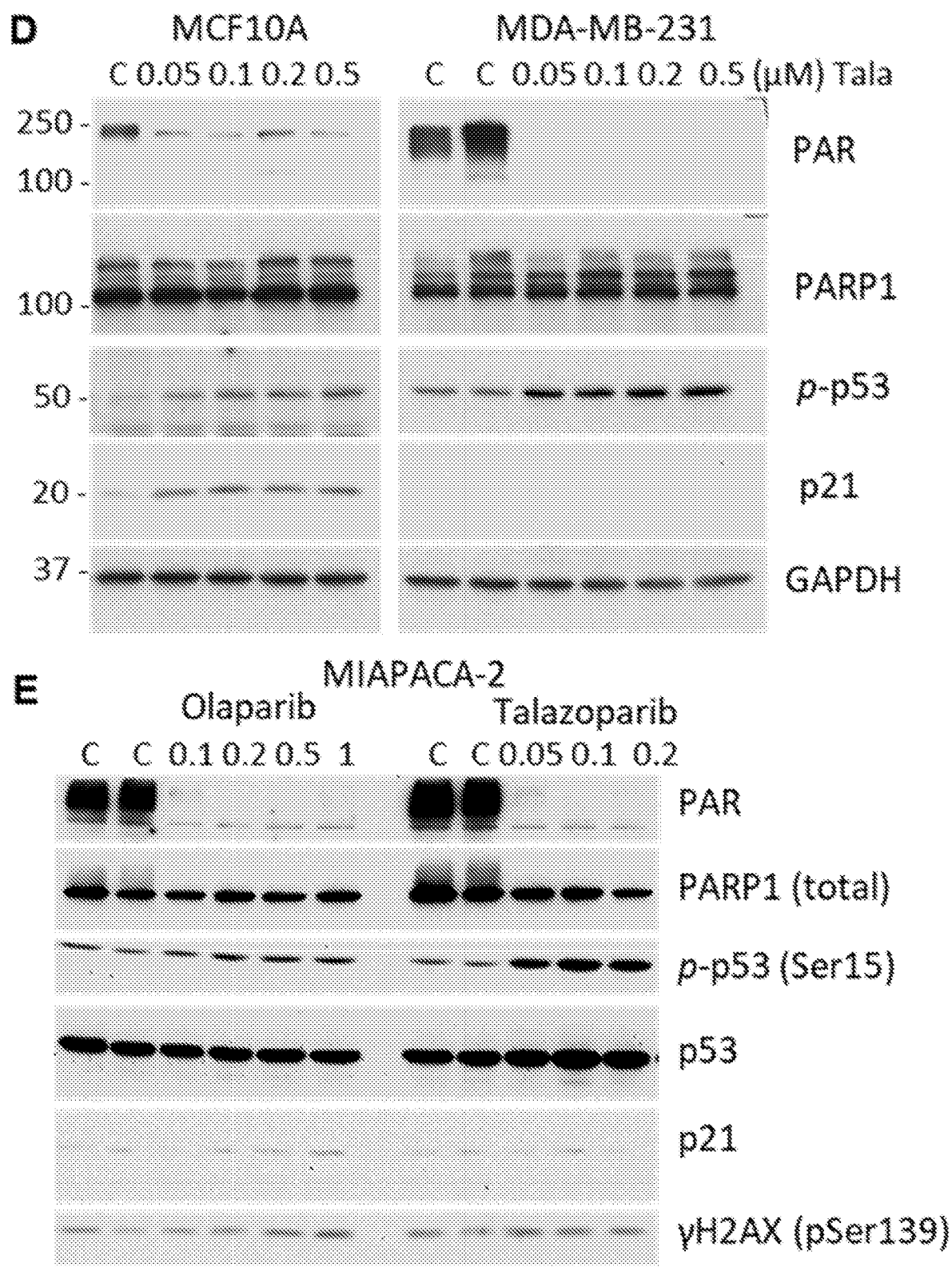
Figure 20:
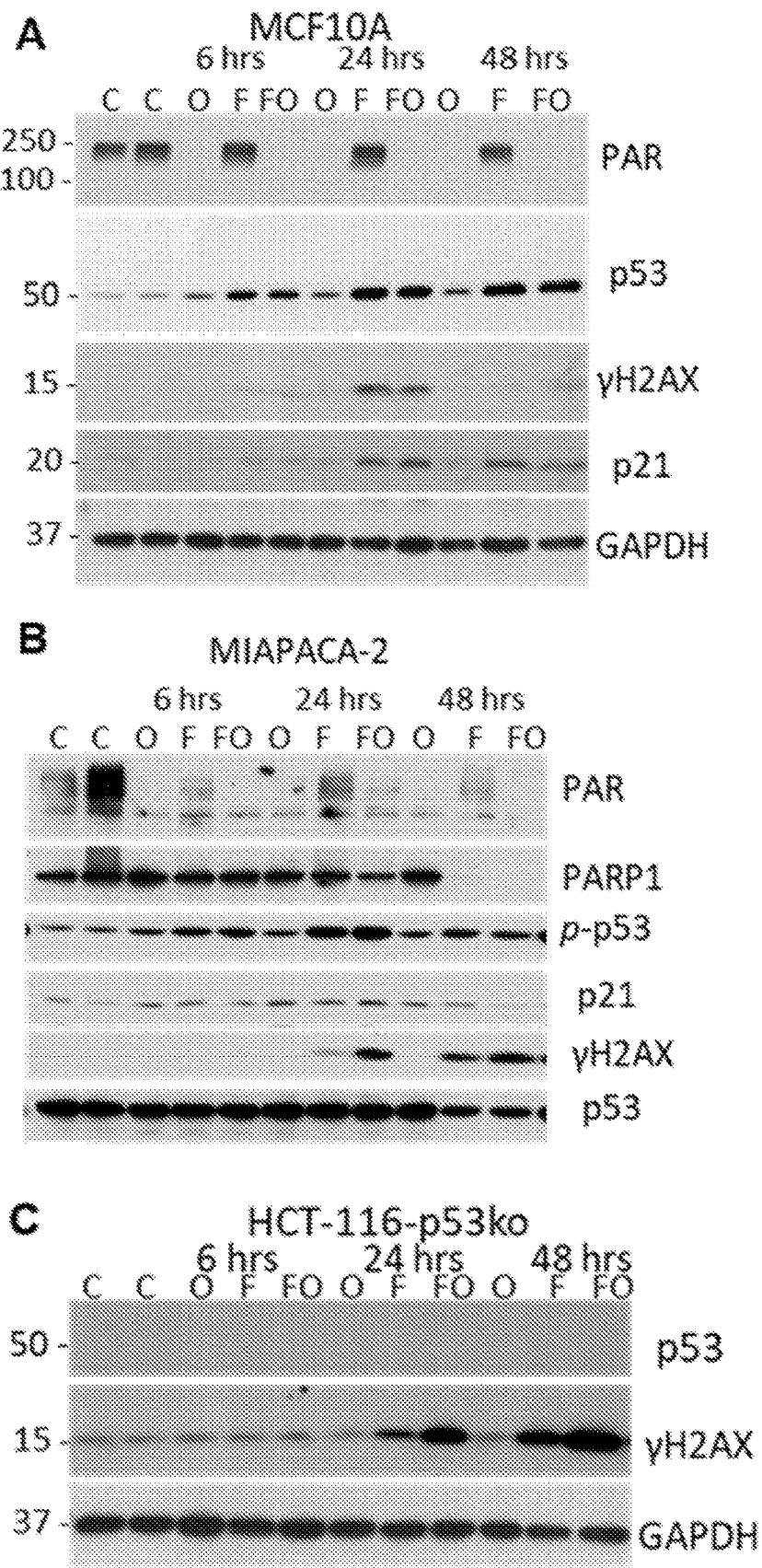
FIG. 20. PARP inhibitor enhances DNA damage induced by floxuridine and TAS102 in p53 mutant cancer cells. (A-D) Immunoblots of whole-cell extracts of p53wt (MCF10A), p53mt (MDA-MB-231; MIAPACA-2), and p53-deleted HCT116 cell lines treated with 0.5 μM olaparib (O), 5 μM floxuridine (5-fluoro-2'-deoxy-uridine, FdUrd, F), 5 μM TAS102, 100 nM talazoparib (T) or their combinations (FO or TO). (E) Schematic presentation of the model.
Figure 20:
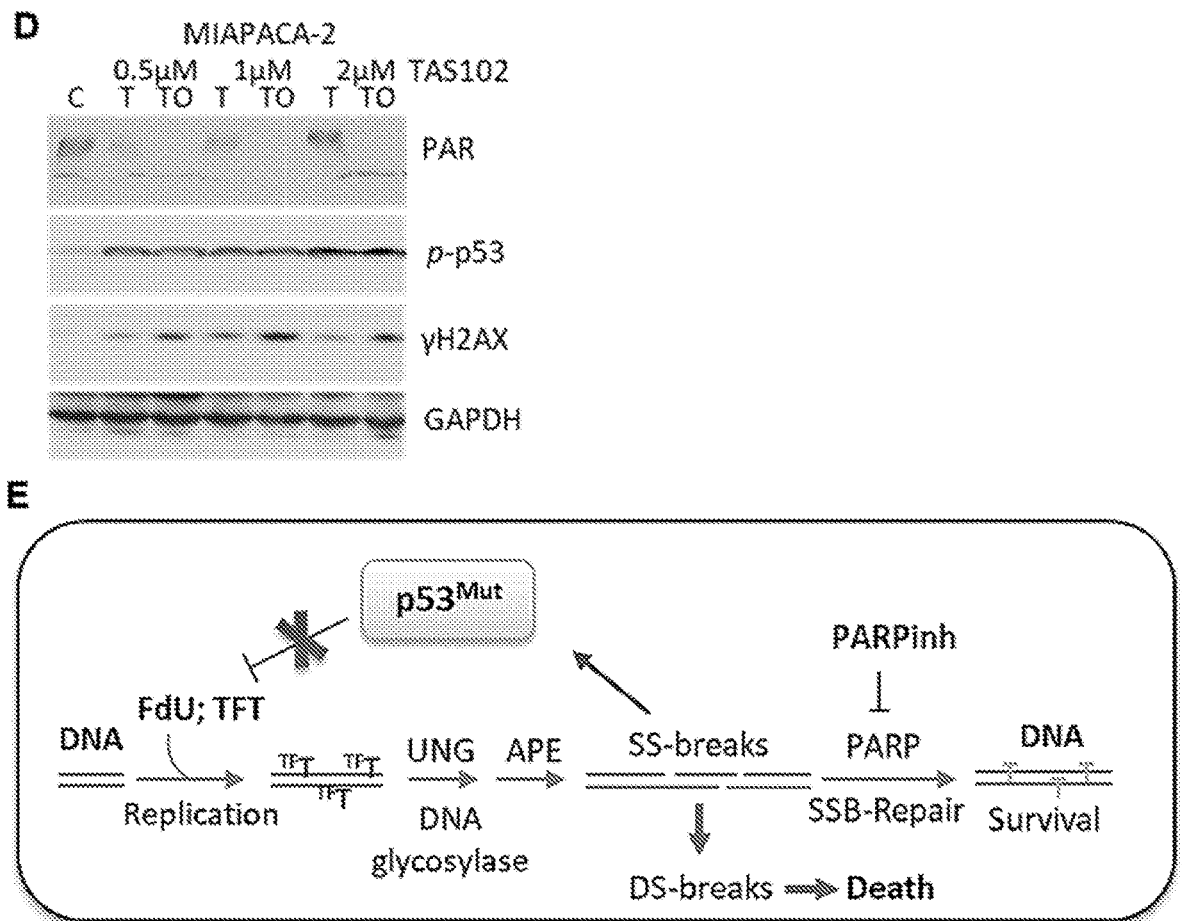
Figure 21:
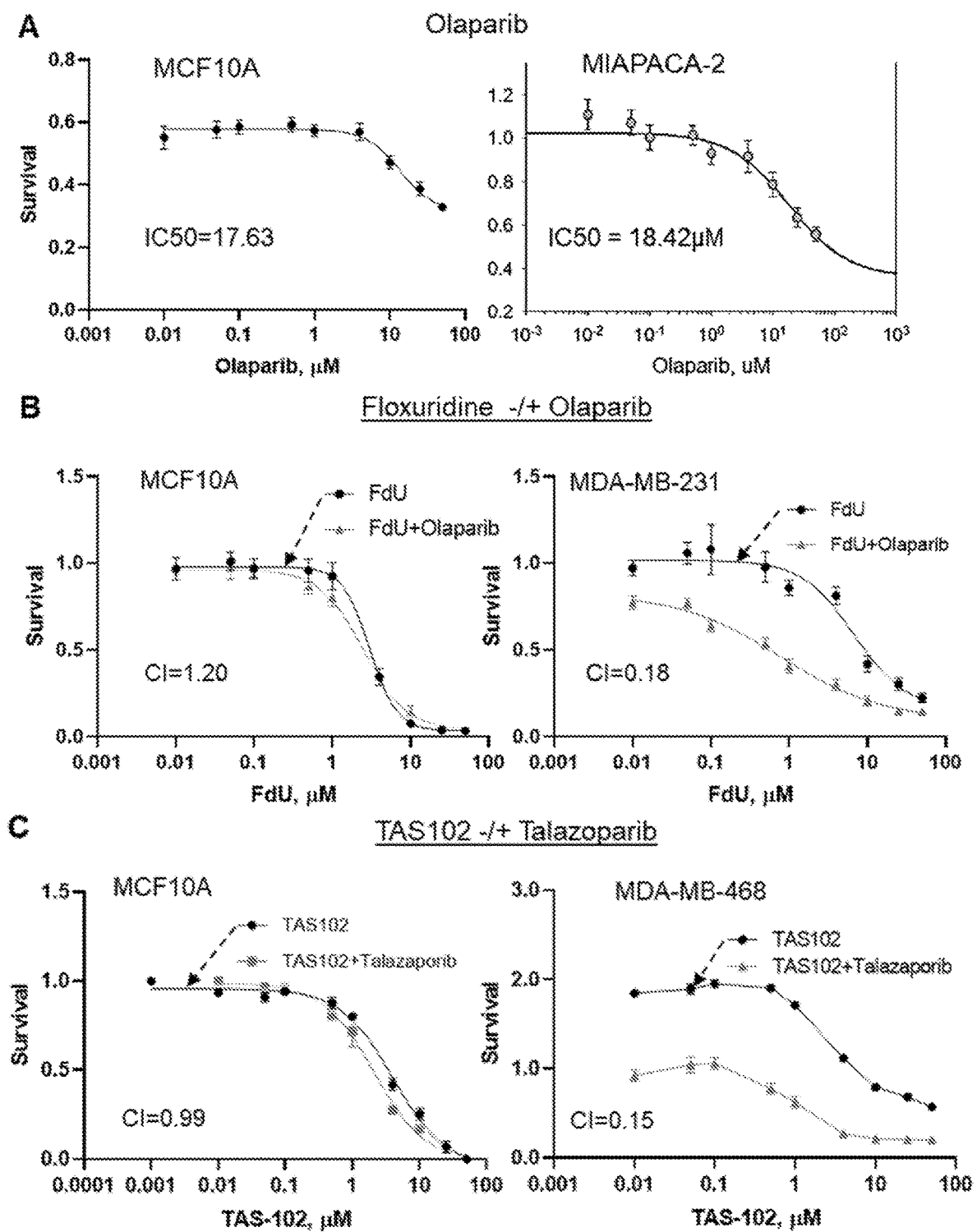
FIG. 21. PARP inhibitor enhances cytotoxicity of deoxyuridine analogues in p53 mutant cancer cells. (A) Cytotoxicity curves for PARP inhibitor (PARPi) olaparib. (B) Cytotoxicity curves for floxuridine (5-fluoro-2'-deoxy-uridine, FdU) alone and in presence of 0.3 μM olaparib. (C) PARPi talazoparib (100 nM) enhances cytotoxicity of TAS102 in p53mt cancer cell line MDA-MB-468 (CI=0.15) but not in p53wt MCF10A. (D) Cytotoxicity of TAS102 is enhanced by PARPi olaparib (300 nM) and talazoparib (100 nM) in p53mt MIAPACA-2 cell line, CI=0.21 and 0.14, respectively. Assays were repeated at least two times in six replicates. (E) Isobolograms for floxuridine (Y-axis) and talazoparib (X-axis) and mean combinatory index (CI-index).
Figure 21:
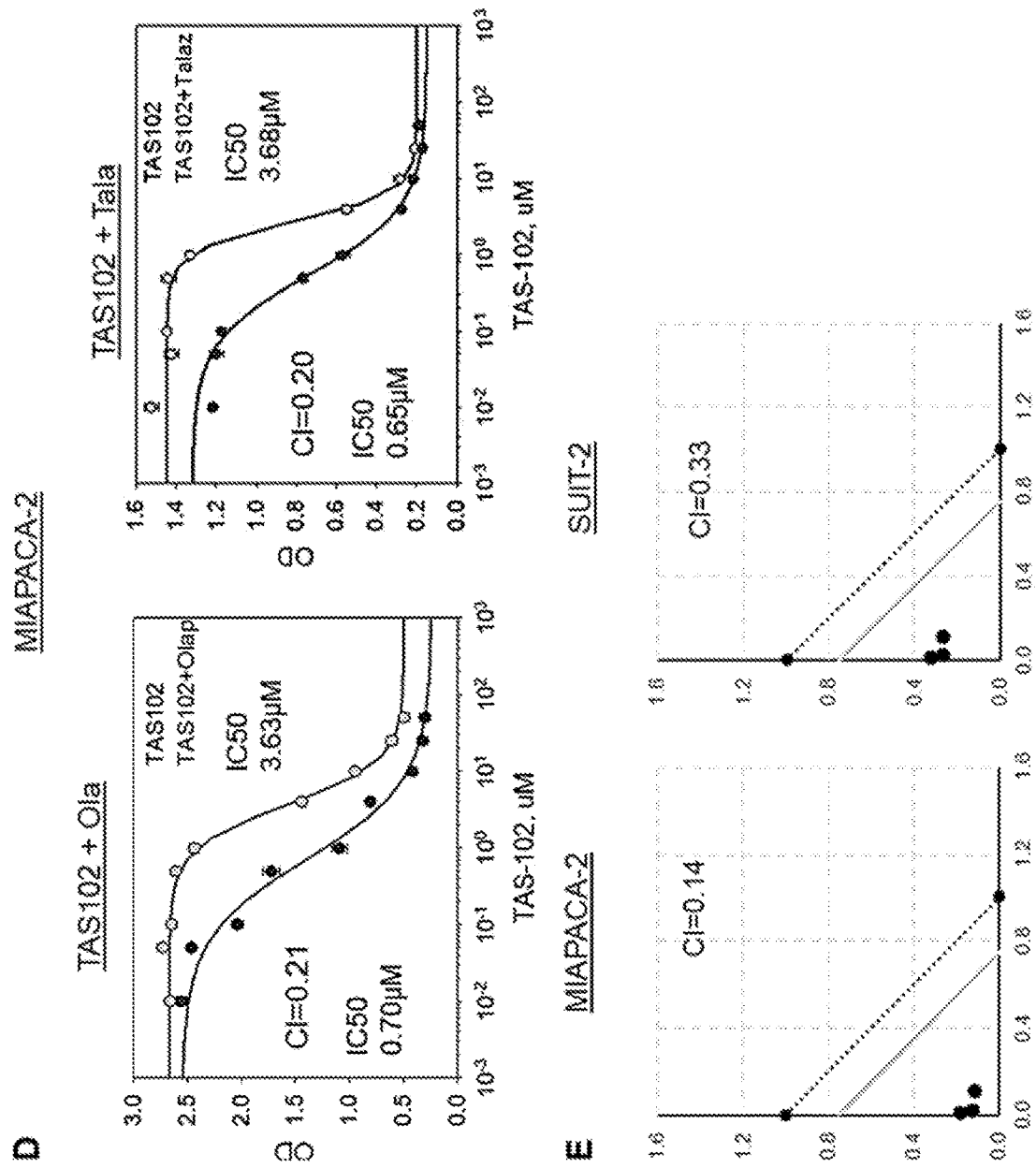
Figure 22:
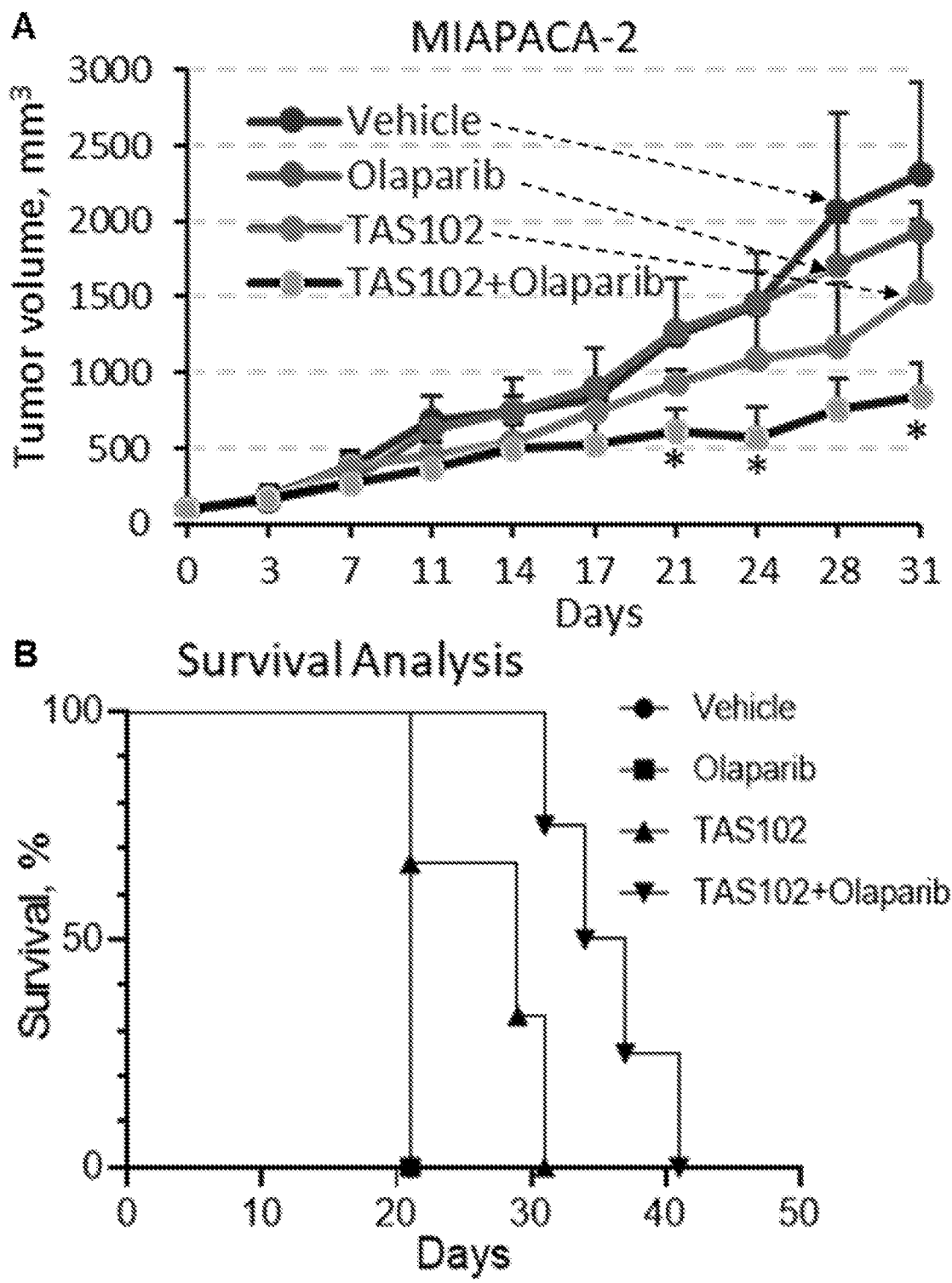
FIG. 22. The combination of TAS102 and PARPi olaparib effectively reduces the growth of pancreatic cancer xenografts. (A) Pancreatic cancer MIAPACA-2 cells were implanted sc into BALB/c 6-week old mice (4 mice per group). When tumor size reached 100 mm3, mice were treated by daily oral gavage with vehicle-control, olaparib (50 mg/kg), TAS102 (50 mg/kg), or TAS102+olaparib combination (50 mg/kg each drug) on schedule 5 days-on, 2 days-off. Tumor size was measured two times per week. Comparison was made using the log rank test. (*, P<0.05) (B) Survival was evaluated using Kaplan-Meier estimator based on time-to-arrive at 500 mm3 of tumor size. Median survival 21 days (vehicle, olaparib), 29 days (TAS102), 35.5 days (TAS102+olaparib). Comparison was made using the Log rank test (P<0.01). (C) Mouse weight was measured twice weekly. (D) Model of the cooperative interaction of deoxyuridine analogue (e.g. TAS102 containing trifluoromethyl-deoxyuridine (TFdU/TFT) and tipiracil) and PARP inhibitor (i.e. olaparib or talazoparib) in selective toxicity against p53 mutant cancer cells.
Figure 22:
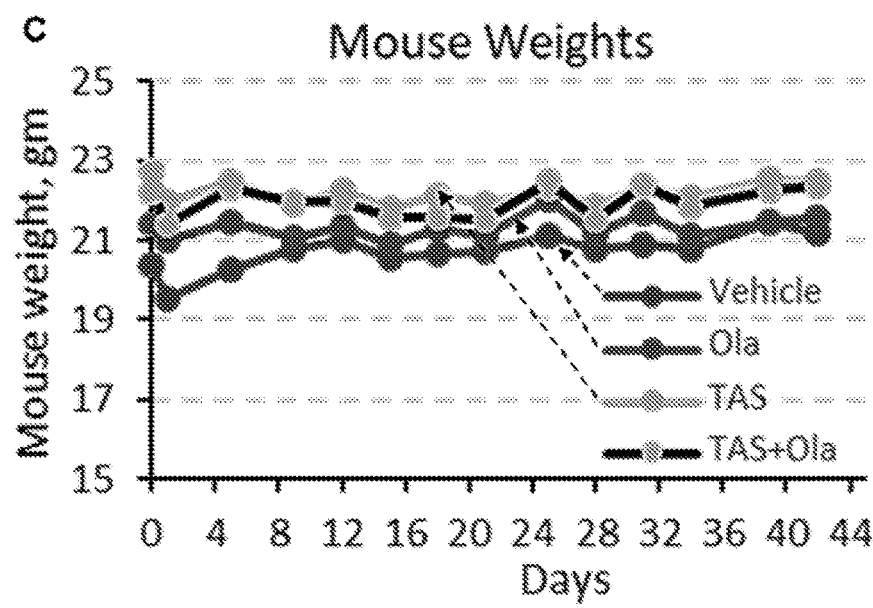
Figure 22:
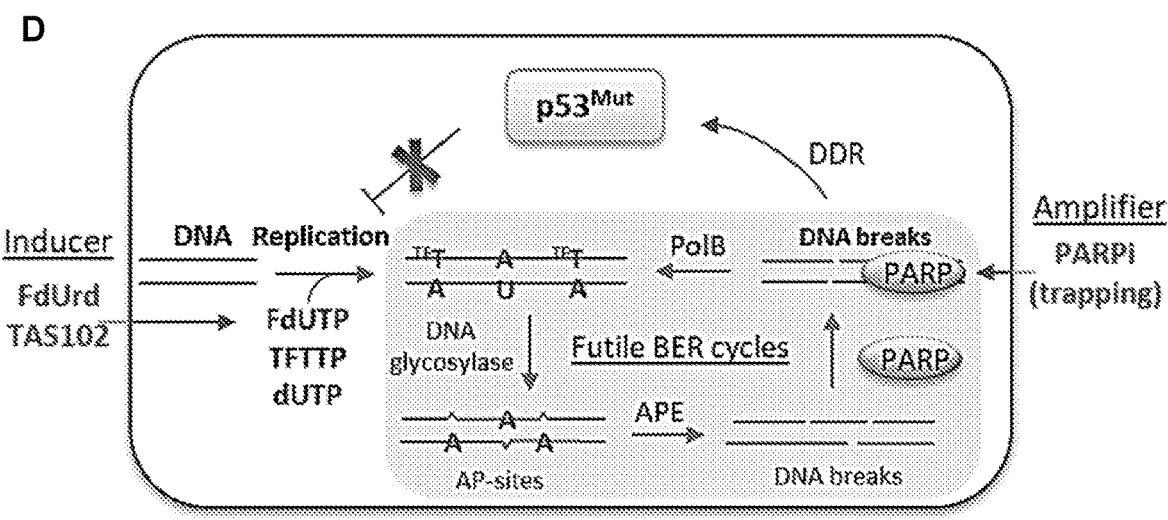

The efficacy of the TAS102/PARPi combination was examined in a mouse breast cancer model with MDA-MB-231 cells, representing TNBC. Cells were implanted into mammary gland of SCID mice, and treatments were initiated once the primary tumor reached 100 mm3. PARPi alone did not affect tumor growth compared to a vehicle-control group (FIG. 13A). This result was consistent with absence of genetic alterations in BRCA1/2 and other HR repair genes, based on genomic data. Treatment with TAS102 alone reduced tumor growth while mouse weight was not reduced, indicating that treatment was well-tolerated (FIG. 13A-B). Notably, the TAS102-olaparib combination further reduced tumor growth compared to TAS102 alone (FIG. 13A), while the drug combination was well-tolerated without significant changes in mouse weight (FIG. 13B). Evaluation of survival, based on time-to-arrive at 300 mm3 tumor volume, showed a statistically significant improvement (P<0.01) in the combination group compared to TAS102 alone (FIG. 13C). Immunohistochemistry data confirmed the uptake of TAS102 by tumor cells (FIG. 17A). Histological inspection showed pulmonary metastases in the control, olaparib-alone and TAS102-alone groups, while the combination-treated mice did not have metastases (FIG. 17B). These findings demonstrated that the drug combination was more effective in reduction of primary tumor growth and metastases to the lungs than each drug alone.

Discussion

Management of TNBC and advanced breast cancers is a significant clinical problem with limited therapeutic options. Although breast cancers commonly carry genetic alterations in p53, only a small number of therapeutic strategies target this genetic abnormality. In this disclosure, we identified a novel inducer-amplifier strategy for selectively targeting p53-deficient cancer (FIG. 13D). This novel strategy was validated in preclinical models using clinical drugs that have never been combined before. We found that p53mt TNBC-derived cells exhibit dysregulation in BER-mediated DNA repair, resulting in accumulation of DNA damage in response to deoxyuridine analogues. Further work showed that PARP inhibitors cooperate with deoxyuridine analogues to enhance DNA damage in p53mt cells, whereas wild-type p53 carriers respond with activation of p53-p21 signaling and cell-cycle arrest (FIG. 13D). Anticancer synergy of the drug combination was confirmed in preclinical cancer models, with no significant overall toxicity in mice.

Genomic data demonstrated high expression of replication-related genes in TNBC, which is consistent with expression of the periodic cell-cycle genes. Genomic data showed that BER and MMR genes are highly expressed in p53mt cancers, including TNBCs, while their genetic alterations are rather rare events. Furthermore, the BER/MMR expression levels tightly correlated with expression of replication-related genes. Conceivably, activation of DNA repair genes may reflect loss of p53 function, which is critical for the control of cell-cycle in response to DNA damage. On the other hand, p53 may directly regulate BER activity and promote cell death if DNA damage is unrepairable.

In this disclosure, we found that p53mt cancer cells exhibit dysregulation in BER repair, in part due to inability to interrupt DNA replication. In response to EdUrd pulse, p53mt cells proceeded in S phase and accumulated DNA damage, whereas p53wt cells responded with G1 arrest and repaired DNA lesion, based on the cell cycle data and γH2AX levels. Our data support a critical role of p21 CDK inhibitor, a p53 target, in these actions since p21-deficient p53wt cells exhibited the response of p53mt cancer cells, demonstrated by the EdUrd-pulse and γH2AX data in response to deoxyuridine analogues. This finding is consistent with p21 function as a negative regulator of PCNA-dependent DNA replication. Thus, our data indicate a major role of p21 in the control of DNA damage response by interrupting replication and allowing successful DNA repair, while p53 may also regulate DNA repair, including BER, through multiple direct and indirect mechanisms.

Figure 13:
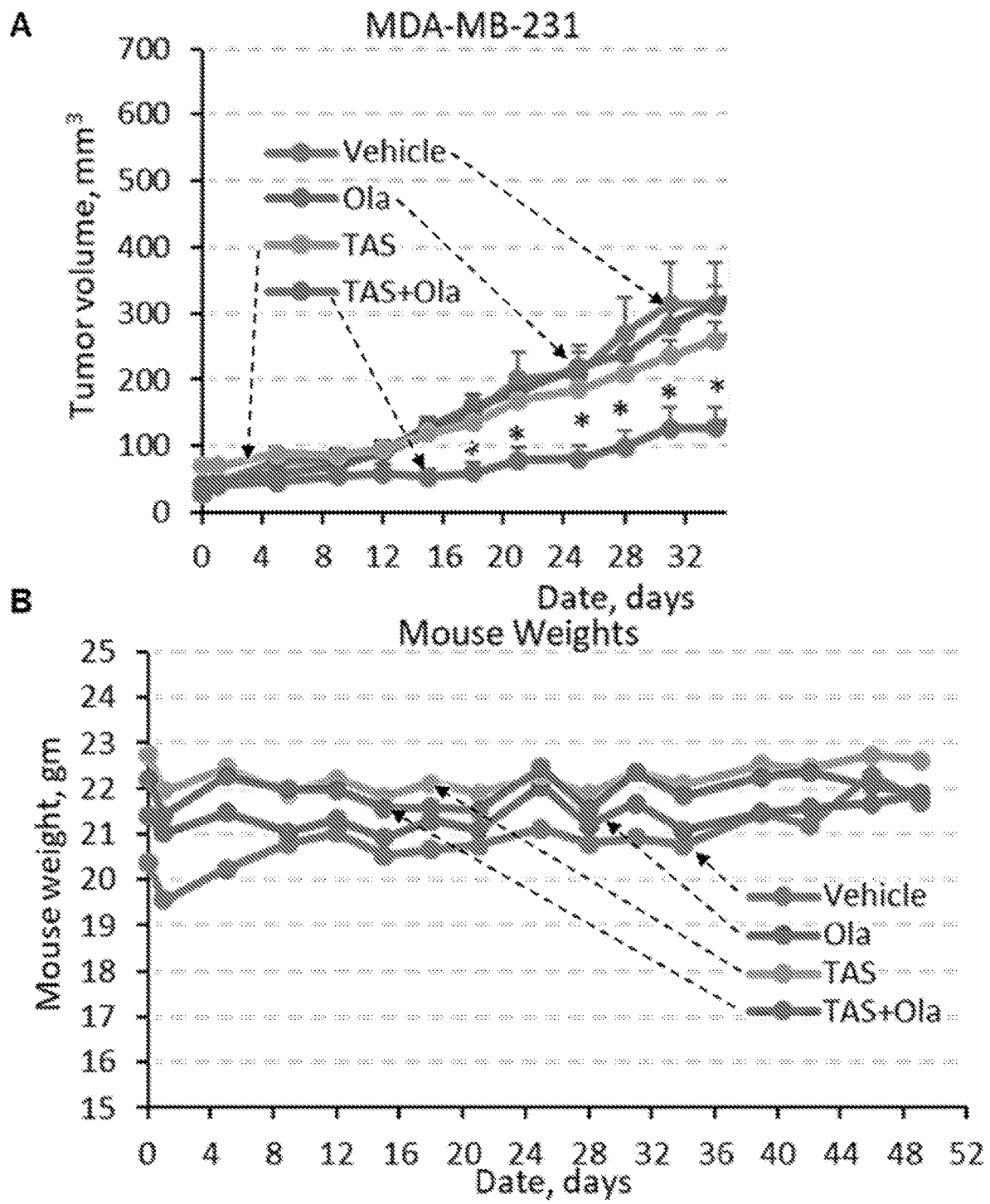
FIG. 13. Tumor growth and metastasis are reduced by systemic treatment with a combination of TAS102 and PARP1-inhibitor olaparib. (A) Breast cancer MDA-MB-231 cells were orthotopically implanted into female BALB/c mice. At tumor size 100 mm3, mice were randomly divided into four groups and treated by daily oral gavage with vehicle-control, olaparib alone (50 mg/kg), TAS102 alone (50 mg/kg), or TAS102+olaparib in combination (50 mg/kg each drug) on schedule 5 days-on, 2 days-off. Tumor size was measured two times per week. Comparison was made using the Log rank test (*, $P<0.05$). (B) Mouse weight was measured twice weekly. (C) Survival was evaluated using Kaplan-Meier estimator based on time-to-arrive at 300 mm3 of tumor size. Median survival 21 days (vehicle and olaparib), 25.5 days (TAS102), 32 days (TAS102+olaparib). Comparison was made using the Log rank test ($P<0.01$). (D) Model of the cooperative interaction of deoxyuridine analogue (e.g. TAS102 containing trifluoromethyl-deoxyuridine (TFT/TFdU) and tipiracil) and PARP inhibitor (i.e. olaparib or talazoparib) in selective damaging p53mt cancer cells.
Figure 13:
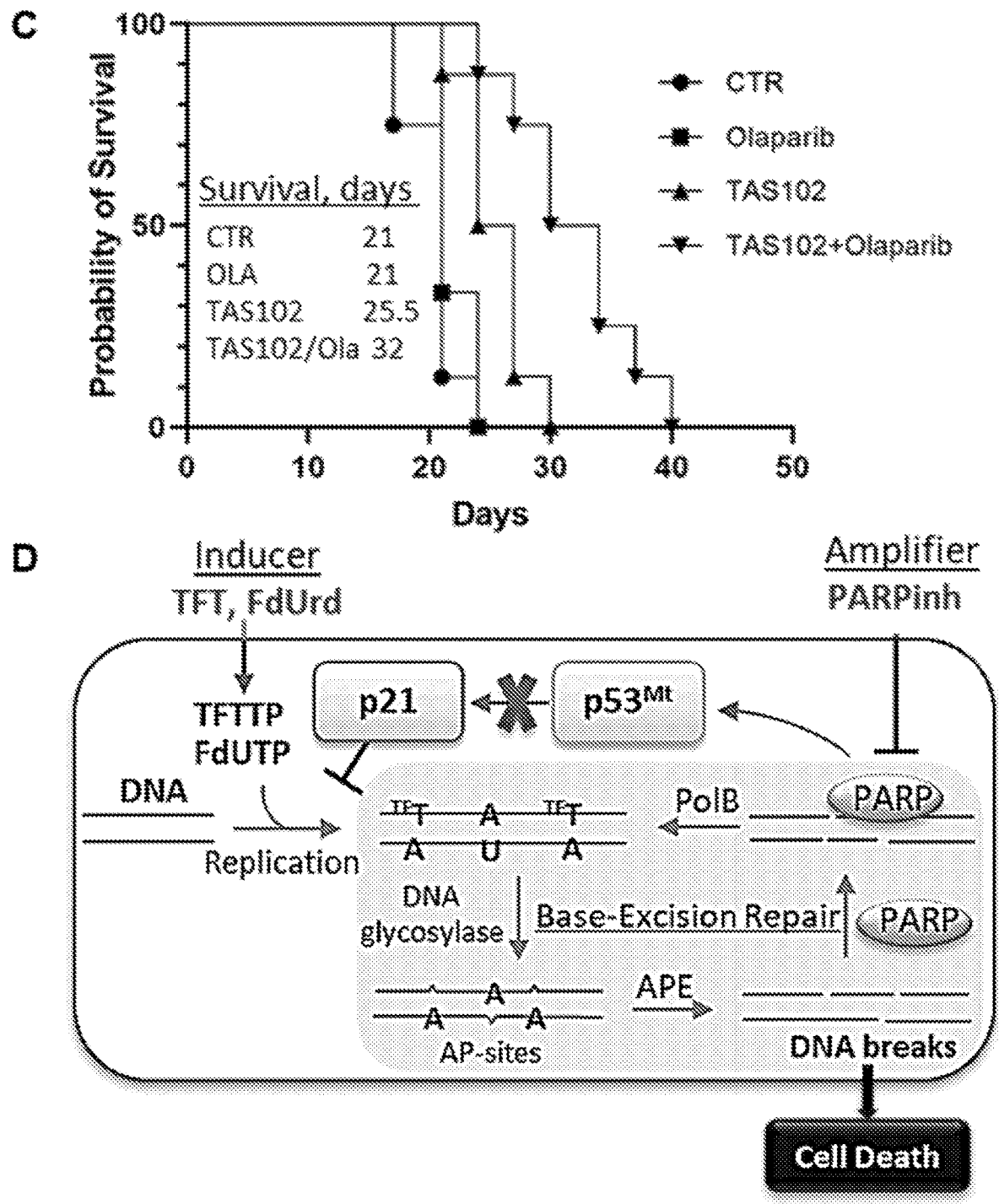

Our data demonstrate that fluorinated and ethynyl-deoxyuridine analogues selectively induced DNA damage in p53mt cancer cells. Fluorinated uridine antimetabolites (FdUrd and 5FU) have been in clinical practice for several decades and their pharmacology is well studied. The main mechanism of action for these analogues involves inhibition of thymidylate synthase (TS) by a common metabolite FdUMP, leading to a reduction of dTTP levels and promoting incorporation of dUTP and FdUTP into genome. The major difference between the two analogues is a preferential incorporation of 5FU into RNA while FdUrd is mainly incorporated into DNA. Genomic fluorouracil (FU) forms A-U pairs that subsequently are removed by DNA glycosylases (UNG, TDG, SMUG1), initiating BER (FIG. 13). The repair process leads to incorporation of U and FU into DNA by polβ and to a new round of BER, resulting in multiple futile repair cycles. Similarly to FdUrd, EdUrd and TFT (5-trifluoro-2'-deoxythymidine, a component of TAS102) also inhibit TS (0.38 nM for TFT) and are incorporated into DNA, although TFT shows a prolong retention in DNA. In p53wt normal cells, deoxyuridine analogues induce DDR and activate the p53-p21 axis halting DNA replication, while p53mt cells do not stop DNA replication leading to accumulation of DNA breaks (see above). This scenario was evident by a transient increase of γH2AX and G1 arrest in p53wt cells, and accumulation of γH2AX levels in p53mt cell lines. Further, p21 deletion was sufficient to confer p53mt-like phenotype in p53wt cells, underscoring importance of p21-mediated inhibition of DNA replication in the effective DNA repair.

PARP inhibitors olaparib and talazoparib enhanced DNA damage and cytotoxicity caused by deoxyuridine analogues in p53mt cell lines, while activating the p53-p21 axis and increasing G1 population in p53wt cells. The antitumor synergism was observed at amounts that inhibited PARP activity but were not toxic to cells. These PARP inhibitors trap PARP protein at single-strand DNA breaks, causing replication fork stalling or collapse, and leading to formation of one-ended DNA double-strand breaks (DSBs). HR-deficient cancer cells, i.e. BRCA1/2 mutant, are incapable of faithfully repairing such DNA lesions, resulting in cancer cell death. Thus, the mechanistic explanation of synergistic toxicity of PARPi and deoxyuridine analogues in p53mt cancer cells is likely associated with accumulation of DNA DSBs due to PARP-trapping activity.

The present work illustrates a novel concept that utilizes this inducer-amplifier strategy to achieve selective synthetic damage to cancer cells (FIG. 13D), while limiting the impact on non-tumor tissues. Clinical application of PARP inhibitors (olaparib and talazoparib) as a monotherapy is limited to HR-deficient cancers representing a small proportion (<5%) of all breast cancer cases. A novel drug regimen combining PARP inhibitors and deoxyuridine agents, i.e. TAS102 or FdUrd, expands clinical utility of these therapeutic agents to p53-deficient breast cancers that account for the majority of TNBC and nearly half of all BC cases. This therapy can improve survival rates and outcomes in patients with metastatic disease.

Example 3

This example describes the effect of a combinational therapy comprising a dU analog and a PARPi on the growth of p53-deficient pancreatic cancer.

The results are described in FIGS. 19-22. FIG. 19A-E shows the accumulation of DNA damage in response to deoxyurudine analogue in PDAC cells. PARP inhibitors induces the p53-p21 axis in p53wt MCF10A cells but not in p53 mutant cancer cell lines. FIG. 20A-E shows that PARP inhibitor enhances DNA damage induced by floxuridine and TAS102 in p53 mutant cancer cells. FIG. 21A-E shows that PARP inhibitor enhances cytotoxicity of deoxyuridine analogues in p53 mutant cancer cells, and FIG. 22A-D shows that the combination of TAS102 and PARPi olaparib effectively reduces the growth of pancreatic cancer xenografts.

Methods

Cell lines and culture conditions. Human non-tumor breast epithelial MCF10A (RRID: CVCL_0598), pancreatic cancer cell lines MIAPACA-2 (RRID:CVCL_0428) and SUIT-2 (RRID:CVCL_3172), metastatic breast cancer MDA-MB-231 (RRID:CVCL_0062) and MDA-MB-468 (RRID: CVCL_0419), and human embryonic fibroblast WI-38 (RRID:CVCL_0579) cell lines were obtained from American Type Culture Collection (ATCC, Manassass, VA, USA), and cultured as recommended by ATCC. All human cell lines were authenticated using short tandem repeat profiling by ATCC or the Roswell Park Core within the last three years. The cells were routinely screened for mycoplasma, and all studies made use of mycoplasma-free cells. Cell cultures were maintained in media supplemented with 10% heat-inactivated fetal bovine serum (FBS) and penicillin/streptomycin at 37° C. with 5-10% CO2 in a humidified incubator.

Mice. Female SCID/CB17 mice (6-7-week-old) were obtained from a colony of SCID/CB17 mice bred and maintained at the Animal Facility of the Roswell Park Comprehensive Cancer Center (RP). Animals were kept in microinsulator units and provided with food and water ad libitum according to a protocol and guidelines approved by the Institute Animal Care and Use Committee (IACUC). The facility is certified by the American Association for Accreditation of Laboratory Animal Care (AAALAC) and in accordance with current regulation and standards of the US Department of Agriculture and the US Department of Health and Human Services.

Mice were inoculated into subcutaneously in the flank with exponentially growing MIAPACA-2 tumor cells ($1\times10^6$/mouse). Tumor growth was monitored by measuring tumor diameters with electronic calipers twice/week. Volumes were calculated using the formula (length)×(width)/2. Once tumor volume reached 100 mm³, mice were randomly divided into four groups: vehicle-control, olaparib, TAS-102, and TAS-102+olaparib (n=4 mice/group). PARP inhibitor olaparib and TAS-102 were dissolved in 12% HPCD, (2-Hydroxypropyl)-β-cyclodextrin, in Dulbecco's Phosphate Buffered Saline (DPBS). Drugs were given at 50 mg/kg by oral gavage on schedule 5-days-on and 2-days-off. At the endpoint, mice were euthanized and subjected to necropsy and organ collection. Tumor tissues were collected for RNA and protein analyses by snap-freezing in liquid nitrogen. Blood was collected for CBC by cardiac puncture.

Complete Blood Counts: At the endpoint, blood was collected by cardiac puncture into EDTA solution to prevent coagulation and then diluted 1:10 with DPBS. Analysis was performed using the HemaTrue Analyzer and HeskaView Integrated Software version 2.5.2.

Cytotoxicity Assay: Cells were plated at a density of 5,000 cells/well in a 96 well-plate and then treated with the appropriate drugs at varying concentrations for 24 hours. Media was replenished with media with or without PARP inhibitors and cell were incubated for 96 hours. Cells were stained with 1% Methylene Blue for 30 minutes, rinsed with water, dried and then solubilized in 5% SDS in PBS, and read at 650 nm. $IC_{50}$ values were generated using GraphPad Prism8 (Version 8.4.2).

Immunohistochemistry (IHC): Tumors and organ tissues were fixed in 10% (v/v) formalin, before embedding in paraffin by the Pathology Core. H&E and other stains were carried out by the Pathology Core as described in [53]. Details of antibodies and reagents, and expanded methodology for immunohistochemistry, blood vessel and Ki-67 index evaluation, and statistical analysis can be found in the Supplementary Information.

Immunoblotting: Tumor cells were seeded in a 6-well plate at 300,000 cells/well and treated with various reagents. Whole-cell lysates were prepared using NP40 lysis buffer containing PMSF, Na-Orthovanadate, and protease inhibitor cocktail. Snap-frozen tumor tissues were ground and suspended in NP40 lysis buffer. Protein concentrations in lysates were quantitated and 15 µg of protein/lane were resolved on a 10% SDS-PAGE gel. Proteins were transferred onto a nitrocellulose membrane in 10% Methanol-SDS buffer and probed with appropriate antibodies. ECL reagent was used to visualize immune-complexes on radiographic films.

Flow cytometry: All samples were analyzed on an LSR-Fortessa Cytometer (BD Biosciences) running FACSDiva (Version 6.1.3), and the data were processed using FCS Express 7 (Version 7.04.0016). For the EdUrd pulse experiments, 300,000 cells per well were seeded in a 6-well plate, and the following day media was replaced with base media containing 5% dialyzed FBS. Cells were then incubated with 10 µM EdUrd for two hours, while untreated cells served as the negative control. Following the two-hour pulse, cells were washed twice with DPBS and the media was replenished. Collection of cells began at t=0 hr up to t=72 hr post EdUrd-pulse. Cells were collected using standard trypsinization, washed in 1% BSA in DPBS, and fixed in 4% paraformaldehyde for 15 minutes. Cells underwent two more washes in 1% BSA/DPBS before being permeabilized in 1× saponin buffer. To label the incorporated EdU, cells were subjected to 'click-it' reaction with $Cu(II)SO_4$, Tris-pH 8.5, THTPA, ascorbic acid, and either Cy3 azide or AFDye 488 azide for 30 minutes. DNA content was labeled with either Hoechst 33342 or Propidium Iodide containing 1 µg/mL of RNAse A. All samples were subsequently washed in 1% BSA/DPBS, resuspended in 1× saponin buffer, and transferred to polystyrene tubes. Experiments were repeated three times and representative histograms and dot-plots shown. For cell cycle analysis, cells were seeded at 300,000 cells/well in 6-well plates and then treated with various amounts of olaparib and talazoparib for 24 hours. Collected cells were fixed for 2 hrs in ice-cold 70% ethanol and stained for 2 hrs at 4° C. in Krishan DNA Buffer (propidium iodide, sodium citrate, RNase A, NP40, and 0.1 mM HCl). Samples were sorted using a BD LSRFortessa cytometer running FACSDiva (Version 6.1.3), and the data were analyzed using ModFit Lt software (Version 5.0.9). Experiments were repeated twice with representative histograms shown.

Metadata analysis: Heat-maps of gene expression profiles and co-expression graphs were generated using pancreatic cancer TCGA data and the cBioPortal for Cancer Genomics online tool cbioportal.org. Gene lists for cell-cycle related genes are generated using Cyclebase_3.0 database cyclebase.org. DNA repair gene lists were derived from KEGG database genome.jp/kegg.

Statistics: Statistical significance of data comparisons were determined using the Student's unpaired t-test with a two-tailed distribution. Statistical significance was achieved when $P<0.05$. Survival was evaluated using the Kaplan-Meier estimator with the log rank test, based on time-to-arrive at a tumor volume of 1 $cm^3$ using GraphPad Prism 7.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of treating cancer in an individual, wherein the cancer is a tumor or blood cancer comprising cancer cells, the method comprising obtaining a sample of the cancer cells from the individual to determine if the cancer cells are p53 deficient, determining the cancer cells to be p53 deficient, and administering to the individual a combination consisting of a poly (ADP-ribose) polymerase inhibitor (PARPi) that is one of talazoparib or Olaparib, and TAS-102.

2. The method of claim 1, wherein the PARPi is the talazoparib.

3. The method of claim 1, wherein the PARPi is the Olaparib.

4. The method of claim 1, wherein the p53-deficient cancer cells are triple-negative breast cancer cells.

5. The method of claim 1, wherein the p53-deficient cancer cells are colon cancer cells.

6. The method of claim 1, wherein the p53-deficient cancer cells are pancreatic cancer cells.

7. The method of claim 1, wherein the treatment of the individual results from the synergistic effect of the PARP inhibitor and the TAS-102.

* * * * *